US012544362B2

United States Patent
Peters

(10) Patent No.: US 12,544,362 B2
(45) Date of Patent: Feb. 10, 2026

(54) METHODS OF TREATING ACUTE RESPIRATORY DISTRESS SYNDROME WITH ACTIVATORS OF TIE-2

(71) Applicant: EyePoint Pharmaceuticals, Inc., Watertown, MA (US)

(72) Inventor: Kevin Peters, Cincinnati, OH (US)

(73) Assignee: EYEPOINT PHARMACEUTICALS, INC., Watertown, MA (US)

(*) Notice: Subject to any disclaimer, the term of this patent is extended or adjusted under 35 U.S.C. 154(b) by 586 days.

(21) Appl. No.: 17/999,145

(22) PCT Filed: May 20, 2021

(86) PCT No.: PCT/US2021/033495
§ 371 (c)(1),
(2) Date: Nov. 17, 2022

(87) PCT Pub. No.: WO2021/236985
PCT Pub. Date: Nov. 25, 2021

(65) Prior Publication Data
US 2024/0299367 A1 Sep. 12, 2024

Related U.S. Application Data

(60) Provisional application No. 63/028,317, filed on May 21, 2020.

(51) Int. Cl.
*A61K 31/427* (2006.01)
*A61K 9/00* (2006.01)
(Continued)

(52) U.S. Cl.
CPC .......... *A61K 31/427* (2013.01); *A61K 9/0019* (2013.01); *A61K 9/0073* (2013.01); *A61K 31/426* (2013.01); *A61P 11/00* (2018.01)

(58) Field of Classification Search
CPC ... A61P 11/00; A61K 2300/00; A61K 31/426; A61K 31/427; A61K 31/433;
(Continued)

(56) References Cited

U.S. PATENT DOCUMENTS

2007/0065433 A1 3/2007 Mollnes et al.
2014/0179693 A1 6/2014 Shalwitz et al.
(Continued)

FOREIGN PATENT DOCUMENTS

JP 2012515169 A 7/2012
RU 2195958 C1 1/2003
(Continued)

OTHER PUBLICATIONS

Anonymous, "Razuprotafib," MedChemExpress, accessed at https://web.archive.org/web/20210432171151/https://www.medchemexpress.com/razuprotafib.html, accessed on May 17, 2024.
(Continued)

*Primary Examiner* — Savitha M Rao
(74) *Attorney, Agent, or Firm* — Sterne, Kessler, Goldstein & Fox P.L.L.C.

(57) ABSTRACT

Disclosed herein are methods for treating acute respiratory distress syndrome, lung injury, respiratory failure, and associated conditions using activators of Tie-2 and inhibitors of HPTPβ. The methods include reducing vascular leak and permeability, reducing edema, reducing inflammation, and increasing oxygen exchange capacity in the lungs.

18 Claims, 18 Drawing Sheets

(51) Int. Cl.
*A61K 31/426* (2006.01)
*A61P 11/00* (2006.01)

(58) Field of Classification Search
CPC .... A61K 31/706; A61K 47/02; A61K 9/0019; A61K 9/0073; A61K 9/08
See application file for complete search history.

(56) References Cited

U.S. PATENT DOCUMENTS

| | | |
|---|---|---|
| 2016/0058828 A1 | 3/2016 | Dumont et al. |
| 2019/0183926 A1 | 6/2019 | Potenziano et al. |
| 2020/0352914 A1* | 11/2020 | Peters .................. A61K 31/427 |

FOREIGN PATENT DOCUMENTS

| | | | |
|---|---|---|---|
| WO | WO-2005034929 A1 | 4/2005 | |
| WO | WO-2007084136 A2 | 7/2007 | |
| WO | WO-2010081172 A1 | 7/2010 | |

OTHER PUBLICATIONS

David, S., et al., "Effects of a synthetic PEG-ylated Tie-2 agonist peptide on endotoxemic lung injury and mortality," Am J Physiol Lung Cell Mol Physiol 300(6):L851-L862, American Physiological Society, United States (Jun. 2011).
Liu, P., et al., "New Soluble Angiopoietin Analog of C4BP-ANG1 Prevents Pathological Vascular Leakage" Biotechnol Bioeng 118(1):423-432, Wiley-VCH Verlag, Germany (Jan. 2021).
Schmaier, A.A., et al., "Tie2 activation protects against prothrombotic endothelial dysfunction in COVID-19," JCI Insight 6(20):e151527, The American Society for Clinical Investigation, United States (Oct. 2021).
Am J Trop Med Hyg, 2015, vol. 93, No. 4, Suppl., p. 76, K. Barker, et. al.
International Search Report and Written Opinion for International Application No. PCT/US2021/033495, International Searching Authority, United States, mailed on Oct. 19, 2021, 12 pages.
Wang, X., et al., "Sustained improvement of gas exchange and lung mechanics by vaporized perfluorocarbon inhalation in piglet acute lung injury model," Clin. Respir. J. 8(2):160-166, Wiley, United States (2013).

* cited by examiner

METHODS OF TREATING ACUTE RESPIRATORY DISTRESS SYNDROME WITH ACTIVATORS OF TIE-2

CROSS-REFERENCE

This application claims the benefit of U.S. Provisional Patent Application Ser. No. 63/028,317 filed May 21, 2020, the contents of which are incorporated herein by reference.

BACKGROUND

Acute respiratory distress syndrome (ARDS) is a severe lung injury condition characterized by disruption of lung endothelial homeostasis, bilateral pulmonary infiltrates, and hypoxemia. A breach occurs in the microvascular barrier that separates blood cells from airspace. The resulting inflammatory infiltrates and lung edema drastically attenuate gas exchange, and lead to multiorgan failure and death. A common cause of ARDS is sepsis, in which a dysfunctional immune response to an infection triggers systemic inflammation and organ damage.

SUMMARY

In some embodiments, the invention provides a method of treating a lung condition in a subject in need thereof, the method comprising administering to the subject a therapeutically-effective amount of a Tie-2 activator, wherein the administering increases an oxygenation index in the subject by about 1 to about 20 as compared to absence of administration.

In some embodiments, the invention provides a method of treating acute respiratory distress syndrome in a subject in need thereof, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-CoV-2, wherein the administration treats acute respiratory distress syndrome in the subject.

In some embodiments, the invention provides a method of treating a COVID-19 in a subject in need thereof, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-COV-2, wherein the administration treats acute respiratory distress syndrome in the subject.

In some embodiments, the invention provides a method of treating acute respiratory distress syndrome in a subject having COVID-19, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-CoV-2, wherein the administration treats acute respiratory distress syndrome in the subject.

INCORPORATION BY REFERENCE

Each patent, publication, and non-patent literature cited in the application is hereby incorporated by reference in its entirety as if each was incorporated by reference individually.

DETAILED DESCRIPTION

Figure 1:
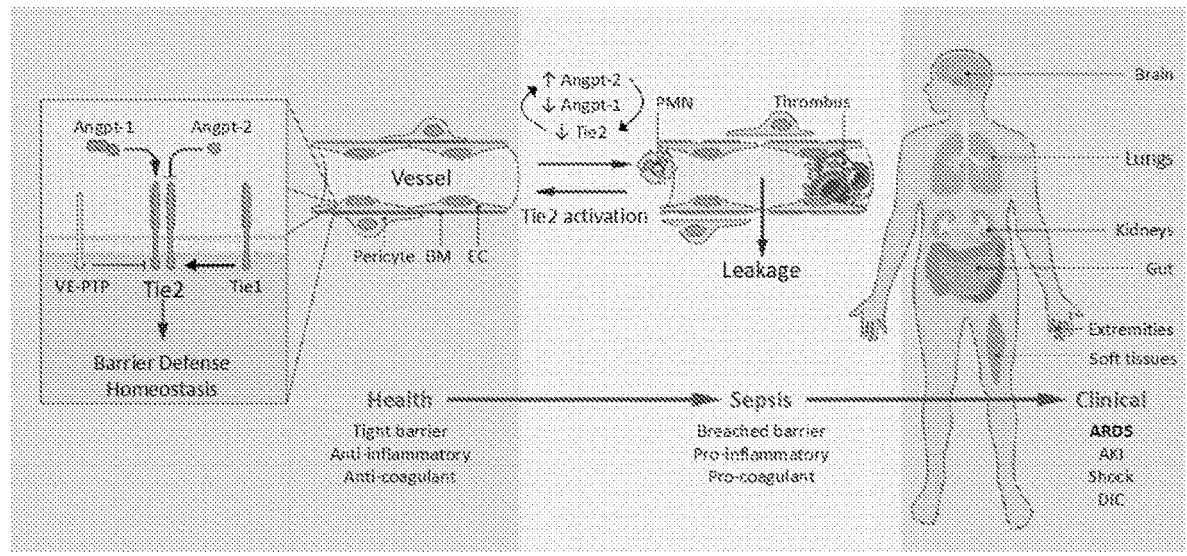
FIG. 1 illustrates Tie-2 signaling effects in health, sepsis, and ARDS.

Described herein are therapies using a Tie-2 activator for treatment of, for example, ARDS, acute lung injury (ALI), chronic lung injury, lung inflammation, lung hypoxemia, and respiratory failure. A Tie-2 activator of the disclosure can activate Tie-2 signaling by promoting protein phosphorylation, such as phosphorylation of Tie-2. Such activation can play a pivotal role in the defense against microvascular breach in ARDS or COVID-19.

ARDS and Respiratory Failure

ARDS is an acute inflammatory syndrome characterized by increased permeability of the alveolar-capillary membrane. Clinically, ARDS can present as acute onset bilateral lung infiltrates accompanied by severe hypoxemia. Among the general population, the most common cause of ARDS is sepsis. Pneumonia and/or aspiration of orogastric contents is the second leading cause, followed by trauma and burns. Other causes include pancreatitis, smoke inhalation, circulatory shock in the absence of sepsis, blood transfusions (transfusion-related acute lung injury or TRALI), cardiothoracic surgery, chest or lung contusions, bone fractures, and drug toxicity. Symptoms of ARDS include severe shortness of breath, muscle fatigue, general body weakness, hypotension, discolored skin or nails, dry and hacking cough, fever, headache, elevated heart rate, and altered mental state.

Non-limiting examples of conditions associated with ARDS include ALI, chronic lung injury, sepsis, septic shock, pneumonia, lung inflammation, fluid accumulation in the lung, lung edema, hypotension, and bronchitis. Sepsis is characterized by an extreme immune response to an infection that results in injury to tissues and organs, such as the lungs, abdominal organs, and urinary tract. Under normal conditions, the immune system triggers release of cytokines and other immunomodulators into the bloodstream to combat an infection. Sepsis occurs when the immune response becomes dysregulated and causes systemic inflammation and excessive activation of immune cells, for example, during chronic infections. Non-limiting examples of symptoms of sepsis include fever, low body temperature, hypotension, elevated heart rate, elevated breathing rate, elevated blood sugar, metabolic acidosis, low blood volume, heart failure, anaphylaxis, adrenal insufficiency, pulmonary embolism, edema, reduced urination, and altered mental state.

ARDS, sepsis, and pneumonia can be caused by pathogenic infections, such as from bacteria, viruses, or parasites. These infections can specifically target the lungs, causing lung injury and ARDS. Non-limiting examples of pathogenic viruses include coronavirus, influenza, rhinovirus, hantavirus, Nipah virus, Hendra virus, and human immunodeficiency virus (HIV). Non-limiting examples of conditions that cause or are associated with ARDS include hantavirus pulmonary syndrome (HPS), severe acute respiratory syndrome (SARS), Middle East respiratory syndrome (MERS), and the 2019 novel coronavirus disease (COVID-19).

Coronaviruses are a group of related viruses that infect the respiratory tract. Non-limiting examples of coronavirus include SARS-COV (SARS-COV-1), SARS-COV, HCoV-NL63, HCoV-HKU1, MERS-COV, and SARS-COV-2 (2019-nCOV).

Human influenza A and B viruses cause seasonal epidemics of the flu disease. Influenza A viruses are known to cause flu pandemics. Influenza A viruses are divided into subtypes based on two proteins on the surface of the virus: hemagglutinin (H) and neuraminidase (N). Eighteen different hemagglutinin subtypes and eleven different neuraminidase subtypes (H1 through H18 and N1 through N11, respectively) exist. Subtypes of influenza A viruses that routinely circulate in humans include: A(H1N1) and A(H3N2). Non-limiting examples of pathogenic influenza viruses include swine influenza, avian influenza, equine influenza, canine influenza, H1N1, H1N1/09, H1N2, H2N2, H3N2, H3N8, H5N1, H7N2, H7N3, H7N3, H7N7, H7N9, H9N2, and H10N7.

Rhinoviruses are the most common viral infectious agent in humans and are the predominant causes of the common cold. Three species of rhinovirus (A, B, and C) exist and differ based on surface proteins (serotypes).

Current therapies for ARDS only manage the underlying causes or symptoms of ARDS, such as antibiotics to treat the infection, corticosteroids that reduce inflammation, bronchodilators to expand airways, and diuretics to reduce fluid accumulation in the lungs. The cornerstone of ARDS management is supportive care and mechanical respiratory support. Supportive care is designed to reduce further harm as the lung recovers from ARDS. For example, a low tidal volume ventilator strategy reduces the likelihood of ventilator-induced lung injury and a conservative fluid strategy maintains drier lungs, to result in better oxygenation and clinical outcomes. However, substantive improvements in outcomes for ARDS patients hinge on therapies that directly treat the pathophysiology of ARDS. Such targeted therapies can reduce the long-term disease burden by attenuating the later fibroproliferative phase and more fully restoring normal lung function.

COVID-19

COVID-19 is a rapidly progressive respiratory infection by coronavirus, SARS-COV-2, that leads to ARDS and respiratory failure. Individuals with pre-existing conditions have an increased risk of complications associated with COVID-19. Non-limiting examples of these pre-existing conditions include heart failure, diabetes, hypertension, coronary heart disease, asthma, chronic liver disease, chronic obstructive pulmonary disease (COPD), and chronic kidney disease (CKD). For example, CKD patients afflicted with COVID-19 have an increased risk of acute kidney injury.

In conditions associated with chronic endothelial dysfunction and vascular injury such as diabetes and hypertension, VE-PTP expression is increased and Tie-2 activation is decreased. This biological state can explain the predisposition of diabetes and hypertension patients for increased severity of COVID-19. Moreover, VE-PTP expression is increased and Tie-2 activation is decreased by hypoxia, and thus, further contributes to endothelial dysfunction and multiorgan failure that occurs in COVID-19 patients with severe respiratory failure.

Angiotensin-converting enzyme 2 (ACE2), a functional receptor for SARS-COV-2, is expressed in the pulmonary epithelium and endothelium. This phenomenon suggests that the pulmonary vasculature is a direct target in the development of COVID-19 pulmonary pathology. SARS-COV-2 can also infect and replicate in human capillary organoids. In some cases, lymphocytic endotheliitis can occur in the lung, heart, kidney, and liver of COVID-19 patients. COVID-19-endotheliitis can be the cause of systemic impaired microcirculatory function in different vascular beds and the clinical sequelae in patients with COVID-19.

Viral inclusion bodies and viral elements can be found in the endothelial lining of the heart, liver, kidney, intestine, and lungs of COVID-19 patients. These endothelial cells have an accumulation of inflammatory cells and show evidence of endothelial and inflammatory cell death. Together, these findings suggest that SARS-COV-2 infection facilitates the induction of endotheliitis in several organs as a direct consequence of viral involvement and the host inflammatory response.

Additionally, the induction of apoptosis and pyroptosis can have an important role in endothelial cell injury in patients with COVID-19. This strategy could be particularly relevant for vulnerable patients with pre-existing endothelial dysfunction, which is associated with male sex, smoking, hypertension, diabetes, obesity, and established cardiovascular disease, all of which are associated with adverse outcomes in COVID-19. Thus, restoring Tie-2 activation in the pulmonary vasculature represents a promising host-directed approach to treating COVID-19 associated pulmonary pathologies. Described herein are Tie-2 activators useful for reducing severity of COVID-19.

Tie-2 Activation and Stabilization of the Pulmonary Endothelium

Among all organs in the body, the lung contains the highest fraction of endothelial cells and the largest cross-sectional area of vasculature. Thus, the lung is a prime target for therapeutic Tie-2 modulation. Tie-2 (tyrosine kinase with immunoglobulin and epidermal growth factor homology domains 2) is a membrane receptor tyrosine kinase expressed primarily in vascular endothelial cells and a subset of hematopoietic stem cells (HSCs) and macrophages. The Tie-2 receptor is largely endothelial-specific and essential for vascular maturation. Phosphorylation of Tie-2 leads to Tie-2 activation. Upstream factors regulate Tie-2 phosphorylation, which influences downstream signaling pathways. Non-limiting examples of factors regulating Tie-2 include angiopoietin 1 (Ang-1 or Angpt-1), angiopoietin 2 (Ang-2 or Angpt-2), and human protein tyrosine phosphatase beta (often abbreviated as HPTPβ or HPTP-beta).

Ang-1 is an agonist of Tie-2, and binding of Ang-1 to Tie-2 promotes receptor phosphorylation. Ang-2 is a Tie-2 ligand that acts in a context-dependent antagonistic or agonistic manner. Binding of Ang-1 to Tie-2 increases the level of endogenous Tie-2 receptor phosphorylation. This binding initiates a signaling cascade that can induce distinctive vascular remodeling through highly organized angiogenesis and tightening of the endothelial cell junctions (endothelium cell proximity). Such signaling pathways include downstream PI3K/Akt signaling, eNOS signaling, Rac1 signaling, survivin signaling, NF-κB signaling, and the Ras/Raf/MEK/ERK pathway. Rac1 signaling mediates stabilization of cell junctions. Survivin can improve endothelial cell survival. Ang-1-Tie-2 signaling can inhibit NF-κB signaling, which modulates inflammation. Within the vascular endothelium, Ang-1-Tie-2 signaling promotes endothelial cell proximity. In the haematopoietic stem cell (HSC) microenvironment, Ang-1-Tie-2 signaling contributes in a paracrine manner to the long-term repopulation of HSCs.

Under physiological conditions, the duration of Tie-2 phosphorylation is regulated by HPTPβ, which removes the phosphate group from the Tie-2 receptor. Inhibiting HPTPβ substantially increases Tie-2 phosphorylation levels and restores proper cell proximity. A compound of the disclosure can activate Tie-2 downstream signaling by inhibiting HPTPβ/VE-PTP.

HPTPβ and vascular endothelial protein tyrosine phosphatase (VE-PTP; the mouse orthologue of HPTPβ) are expressed in vascular endothelial cells throughout development and in the adult vasculature. HPTPβ plays a functional role in endothelial cell proliferation, endothelial cell viability, endothelial cell differentiation, endothelial cell permeability, vasculogenesis, and angiogenesis. HPTPβ also modulates interactions with inflammatory and endothelial support cells, such as pericytes, podocytes, and smooth muscle cells. HPTPβ maintains the integrity of the endothelial barrier by regulating the phosphorylation of proteins within endothelial cell junctions, including Tie-2, the adherens junction components, VE-cadherin, plakoglobin, and vascular endothelial growth factor receptor 2 (VEGFR2). The expression of HPTPβ is upregulated by hypoxia, diabetes, and renin-induced hypertension, which results in reduced Tie-2 signaling and the loss of endothelial cell barrier integrity. Thus, Tie-2 suppression promulgates vascular leakage in the lung.

In a case of vascular leak, endothelial cells that line blood vessels separate, allowing leakage of fluid from the circulatory system to the interstitial space. Symptoms of vascular leak include hemoconcentration, hypotension, hypoalbuminemia, partial or generalized edema, monoclonal gammopathy of undetermined significance (MGUS), fatigue, and syncope. Arteries, veins, and capillaries are susceptible to the increase in vascular permeability that leads to vascular leak in the lungs.

Targeting HPTPβ can activate Tie-2 and restore downstream signaling in pulmonary endothelial cells. As illustrated in FIG. 1, Tie-2 modulation can play a critical role in regulating the host vascular response in ARDS and associated etiologies. For example, Tie-2 activation is disrupted in sepsis, and ARDS is a consequence of elevated levels of Ang-2 and reduced TIE2 gene expression. Circulating Ang-2 is also associated with severity of chronic renal failure. Furthermore, intact Tie-2 signaling promotes endothelial cell integrity during inflammation. Loss of Tie-2 signaling in the inflamed vasculature shifts from the normally anti-coagulant surface to a pro-coagulant phenotype. Conversely, Tie-2 activation can reduce both spontaneous and injury-induced fibrin formation in models of sepsis. Suppression of Ang-2 expression can enhance total levels of Tie-2 and reduced Tie-2 signaling can downregulate Ang-2 biosynthesis. Thus, an initial release of Ang-2 from activated endothelial cells can trigger suppression of Tie-2 signaling and downregulate Ang-2 biosynthesis, thereby further attenuating Tie-2 signaling. HPTPβ/VE-PTP inhibition can activate Tie-2 signaling, thereby maintaining endothelial barrier defense and homeostasis. Thus, Tie-2 activation can therefore be a treatment mechanism for ARDS, and systemic inflammatory conditions such as acute kidney injury (AKI), septic shock, and disseminated intravascular coagulation (DIC).

Vascular inflammation is also potentiated by this high Ang-2/low Tie-2 feed-forward loop, as phosphorylated Tie-2 can restrain the canonical inflammatory transcription factor, NF-κB. Loss of protective Tie-2 signaling leads to NF-κB's nuclear translocation and the transcription of adhesion molecules for leukocytes. Conversely, Tie-2 stimulation can reduce lung inflammation during endotoxic shock. Tie-2 signaling can also restore homeostasis in the vessel wall by stabilizing pericytes and vascular smooth muscle cells. This effect is achieved by restoring the production of the vasodilator, nitric oxide (NO), from endothelial nitric oxide synthase (eNOS). NO reduces transient blood pressure.

Circulating Ang-2 concentrations can reflect severity of disease and progression over time toward death or convalescence. Circulating and bronchoalveolar lavage (BAL) levels of Ang-2 are elevated in patients with ALI and ARDS. Circulating Ang-2 can also be elevated in future non-survivors of ALI/ARDS among surgical patients, quantitatively associated with extravascular lung water content and fluid balance in both septic and non-septic ALI/ARDS, and total body fluid overload in septic shock patients. A declining Ang-1 level and a rising Ang-2 level can be associated with mortality in the ICU from severe sepsis. Ang-2 levels can be an effective metric for predicting ARDS mortality. Further, genetic variants in ANG2 can be associated with increased risk of ARDS. Targeting dysfunctional Tie-2 signaling provides a promising approach for ARDS treatment.

Figure 2:
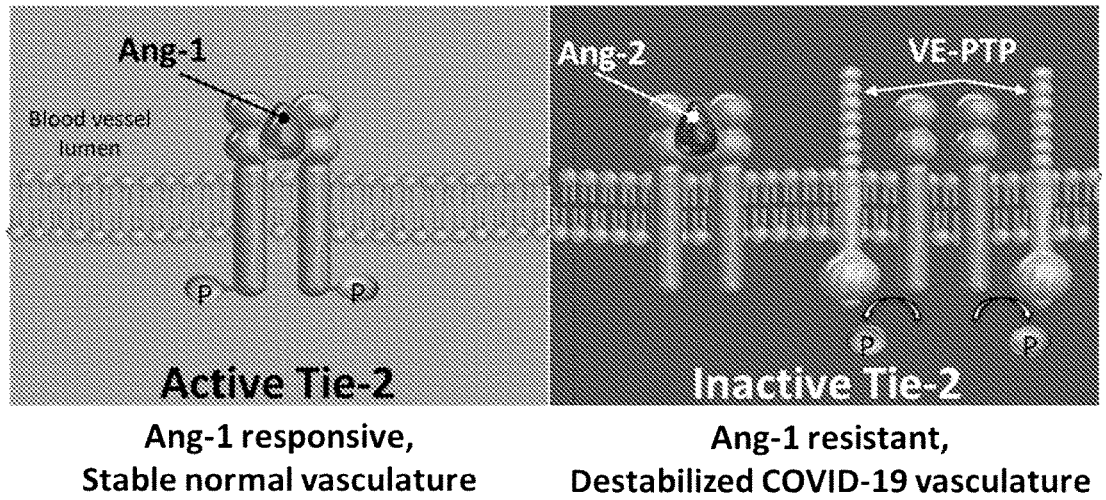
FIG. 2 illustrates Tie-2, Ang-1, Ang-2, and VE-PTP signaling effects in COVID-19.

As illustrated in FIG. 2, in stable normal vasculature, Ang-1 is responsive and is able to activate Tie-2. Conversely, in the destabilized COVID-19 (or ALI/ARDS) vasculature, Ang-1 activity is compromised or resistant and is therefore unable to activate Tie-2. Ang-2 levels and activity are elevated relative to Ang-1, and further inactivation of Tie-2 signaling occurs. Enhanced Tie-2 signaling can then modulate the hypoxic pulmonary vasoconstriction associated with ARDS and induce a salutary effect on oxygenation index.

Tie-2 activation by a compound disclosed herein can counteract diverse forms of lung injury, including ALI or chronic lung injury. For example, Tie-2 signaling can defend barrier function, attenuate inflammation, restore homeostasis in the vessel wall, promote lymphatic integrity, counteract thrombogenicity, reduce lung injury caused by hyperoxia, reduce lipopolysaccharide induction, and treat abdominal sepsis caused by cecal ligation and puncture (CLP), systemic anthrax toxin, phosgene, and treat pulmonary hypertension caused by monocrotaline, serotonin, or IL-6. Tie-2 activation in ARDS can restore vascular barriers, blunt inflammation, reduce pulmonary vascular resistance, and attenuate thrombosis, thereby improving ventilation/perfusion mismatch (V/Q ratio) and promoting lymphatic function for the clearance of lung edema. Each of these effects can improve the physiology and outcomes of patients with ARDS.

A primary mechanism of Tie-2 activation for the treatment of lung injury can be defense against vascular hyperpermeability. During inflammation, vascular leakage can arise due to reduced Tie-2 signaling, which switches the balance of intra-endothelial GTPases that regulate endothelial structure and junctions. As a result, endothelial structures contract and junctions lose the barrier effector protein, VE-cadherin. Thus, genetic or biological manipulation that activates Tie-2 signaling, for example, via excess Ang-1, Ang-1 activation, Ang-2 inhibition, or VE-PTP inhibition, can have protective effects on microvascular barrier function.

In some embodiments, activation of Tie-2 or inhibition of HPTPβ with a compound of the disclosure promotes activation of eNOS in endothelial cells, which in turn activates guanylate cyclase in smooth muscle cells, producing cyclic guanosine monophosphate (cGMP). cGMP can relax smooth muscle cells, resulting in vasodilation. In some embodiments, a Tie-2 activator or a HPTPβ inhibitor increases a concentration of NO and promotes vascular density by reducing vascular leak.

Host responses to primary lung injury include the release of cytokines, such as IFN-αβ, IFN-γ, granulocyte-colony stimulating factor (G-CSF), monocyte chemoattractant protein (MCP1), macrophage inflammatory protein 1 alpha (MIP1A), platelet derived growth factor (PDGF), TNFα, IL-6, IL-7, and IL-8. IFN-αβ and IFN-γ induce inflammatory cell infiltration and cause airway and alveolar epithelial cell apoptosis via Fas/FasL-dependent or TRAIL-DR5-dependent mechanisms. Additionally, TNF released by immunomodulators promotes the apoptosis of both lung epithelial cells and endothelial cells. Apoptosis of epithelial and endothelial cells compromises lung microvascular and alveolar epithelial cell barrier. Disruption of the epithelial barrier causes vascular leakage and alveolar edema, ultimately resulting in hypoxia. Cytokines also attract leukocytes to the injured lung and provoke activation of the leukocytes. Activated leukocytes secrete an array of molecules that secondarily damage the alveolar epithelium and capillary endothelium. Endothelial damage leads to disruption of the microvascular barrier and vascular leakage. Escape of protein-rich fluid from the vascular space into the interstitium leads to an unfavorable oncotic gradient that drives further accumulation of water in the alveolar space. The capacity of lymphatic vessels to clear the fluid in the alveolar space is then overwhelmed. Filling of alveoli with proteinaceous fluid and debris from dead cells impairs gas exchange, and results in hypoxic alveoli. As a result, blood is physiologically shunted around hypoxic alveoli. At this stage, ventilation is inefficient due to higher dead-space fraction. If left untreated, the lungs become less compliant, and thus requires greater positive pressure to ventilate, thereby increasing the risk of ventilator-induced lung injury. Pulmonary hypertension can often develop via a combination of hypoxic pulmonary vasoconstriction, elevated airway pressures needed for ventilation, and the effect of vasopressor agents.

Assessment of ARDS

Treatment of ARDS and/or COVID-19, or restoration of respiratory function by a compound described herein can be assessed by, for example, the Berlin criteria, oxygenation index, Acute Lung Injury Score, pulmonary dead-space fraction, chest radiograph assessment, quantification of ventilator free-days, duration of assisted ventilation, occurrence of infections, Sequential Organ Failure Assessment, COVID-19 Ordinal Scale, or occurrence of thromboembolic events in a subject following administration of a therapy described herein to the subject. The Berlin criteria (Berlin definition) are a diagnostic characterization of ARDS. The Berlin criteria exclude the utilization of pulmonary artery catheter to measure pulmonary wedge pressure. The Berlin criteria classify ARDS as follows: $PaO_2/FiO_2$ ratio of ≤300 and >200 is mild ARDS; $PaO_2/FiO_2$ ratio of 100-200 is moderate ARDS; and $PaO_2/FiO_2$ ratio of <100 is severe ARDS. ARDS can also be characterized by acute hypoxemia ($PaO_2/FiO_2$ ratio less than 200 mm Hg) with bilateral infiltrates seen on chest X-ray and no evidence of left atrial hypertension. ALI has a similar criterium to ARDS, but with a lesser degree of hypoxemia ($PaO_2/FiO_2$ ratio <300 mm Hg). ALI is defined as an acute inflammatory syndrome accompanied with increased permeability of the alveolar-capillary membrane. The cutoff value to differentiate ALI and ARDS is 200 mm Hg.

To supply adequate oxygen to the blood, subjects having respiratory failure can undergo oxygen supplementation using a mechanical ventilator or respirator. The two main types of mechanical ventilation are non-invasive ventilation and invasive ventilation. Non-invasive ventilation provides ventilatory support to a subject through a tightly fitted facial or nasal mask. Invasive ventilation provides ventilatory support to a subject through a tube inserted into the windpipe through the mouth or the nose or a hole made in the windpipe through the front of the throat. Lung-protective ventilation strategies include low tidal volume/low plateau pressure and alveolar recruitment/positive end-expiratory pressure (PEEP) titration. These strategies aim to reduce strain and stress at the alveolar level: the former by avoiding overdistention at end-inspiration; and the latter by achieving and maintaining an open lung at end-expiration.

PEEP is a measure of the pressure in the lungs (alveolar pressure) at the end of expiration. Extrinsic PEEP is PEEP applied by a ventilator. Intrinsic PEEP is caused by an incomplete exhalation. A low level of applied PEEP (e.g., 4 to 5 cm H$_2$O) can be used in most mechanically ventilated patients to mitigate end-expiratory alveolar collapse. A high level of applied PEEP (>5 cm H$_2$O) can be used to improve hypoxemia or reduce ventilator-associated lung injury, for example, in patients with ARDS, ALI, or other types of hypoxemic respiratory failure. The minimum level of PEEP required for diagnosing ARDS is 5 cm H$_2$O. A Tie-2 activator described herein can reduce a PEEP required by a subject. In some embodiments, a Tie-2 activator described herein reduces a PEEP required by a subject by about 1 cm H$_2$O to about 20 cm H$_2$O, about 1 cm H$_2$O to about 10 cm H$_2$O, about 1 cm H$_2$O to about 5 cm H$_2$O, 5 cm H$_2$O to about 10 cm H$_2$O, or about 10 cm H$_2$O to about 20 cm H$_2$O. In some embodiments, a Tie-2 activator described herein reduces a PEEP required by a subject by about 1 cm H$_2$O, about 2 cm H$_2$O, about 3 cm H$_2$O, about 4 cm H$_2$O, about 5 cm H$_2$O, about 6 cm H$_2$O, about 7 cm H$_2$O, about 8 cm H$_2$O, about 9 cm H$_2$O, about 10 cm H$_2$O, about 11 cm H$_2$O, about 12 cm H$_2$O, about 13 cm H$_2$O, about 14 cm H$_2$O, about 15 cm H$_2$O, about 16 cm H$_2$O, about 17 cm H$_2$O, about 18 cm H$_2$O, about 19 cm H$_2$O, or about 20 cm H$_2$O.

Mean airway pressure (MAP) is the mean pressure applied during positive-pressure mechanical ventilation. A Tie-2 activator described herein can reduce a MAP required by a subject. In some embodiments, a Tie-2 activator described herein reduces a MAP required by a subject by about 1 cm H$_2$O to about 20 cm H$_2$O, about 1 cm H$_2$O to about 10 cm H$_2$O, about 1 cm H$_2$O to about 5 cm H$_2$O, about 5 cm H$_2$O to about 10 cm H$_2$O, or about 10 cm H$_2$O to about 20 cm H$_2$O. In some embodiments, a Tie-2 activator described herein reduces a MAP required by a subject by about 1 cm H$_2$O, about 2 cm H$_2$O, about 3 cm H$_2$O, about 4 cm H$_2$O, about 5 cm H$_2$O, about 6 cm H$_2$O, about 7 cm H$_2$O, about 8 cm H$_2$O, about 9 cm H$_2$O, about 10 cm H$_2$O, about 11 cm H$_2$O, about 12 cm H$_2$O, about 13 cm H$_2$O, about 14 cm H$_2$O, about 15 cm H$_2$O, about 16 cm H$_2$O, about 17 cm H$_2$O, about 18 cm H$_2$O, about 19 cm H$_2$O, or about 20 cm H$_2$O.

The ratio of the partial pressure of oxygen in arterial blood (PaO$_2$) to the inspired oxygen fraction (FiO$_2$) can be used to assess abnormalities in pulmonary gas exchange. FiO$_2$ is the molar or volumetric fraction of oxygen in the inhaled gas. For example, natural air contains 21% oxygen, equivalent to a FiO$_2$ of 0.21. Subjects experiencing difficulty breathing are supplemented with pressurized oxygen, a higher-than-atmospheric FiO$_2$, and thus, a FiO$_2$>0.21. The PaO$_2$/FiO$_2$ ratio can be used to determine severity of lung injury and the diagnosis of ARDS.

A Tie-2 activator described herein can increase the PaO$_2$/FiO$_2$ ratio of a subject. A change in PaO$_2$/FiO$_2$ ratio can be determined from baseline compared to 6, 24, 36, 48, 72 hours, or 7 days after administration of a therapy described herein. In some embodiments, a change in PaO$_2$/FiO$_2$ ratio is about 1 to about 400 or about 1 to about 100 as compared to absence of administration. In some embodiments, a change in PaO$_2$/FiO$_2$ ratio is about 50, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, about 290, about 300, about 310, about 320, about 330, about 340, about 350, about 360, about 370, about 380, about 390, about 400, about 410, about 420, about 430, about 440, or about 450.

In some embodiments, administration of a Tie-2 activator described herein to a subject can increase the PaO$_2$/FiO$_2$ ratio of the subject to about 100, about 110, about 120, about 130, about 140, about 150, about 160, about 170, about 180, about 190, about 200, about 210, about 220, about 230, about 240, about 250, about 260, about 270, about 280, about 290, about 300, about 310, about 320, about 330, about 340, about 350, about 360, about 370, about 380, about 390, about 400, about 410, about 420, about 430, about 440, about 450, about 460, about 470, about 480, about 490, about 500 about 510, about 520, about 530, about 540, about 550, about 560, about 570, about 580, about 590, or about 600. The PaO$_2$/FiO$_2$ ratio can be determined after administration of a therapy described herein, for example, at 6, 24, 36, 48, 72 hours, or 7 days after administration.

Oxygenation index (OI) is a measure of oxygen exchange efficiency of the lung, with higher scores indicating more severe lung dysfunction and higher risk of death. OI is calculated by: (FiO$_2$*mean airway pressure)/PaO$_2$. Similar to PaO$_2$/FiO$_2$ ratio, OI is a measure of oxygen exchange in the lung (lung function), but OI also incorporates airway pressures (and thus, lung compliance) in the measurement. Hence, changes in PEEP delivery without an intrinsic change in lung function do not change OI (unlike PaO$_2$/FiO$_2$ ratio, which can be modulated by changes in PEEP). OI can be interpreted as follows: 0 to 25=good outcome; 25 to 40=chance of death>40%; and >40=consider extracorporeal membrane oxygenation.

A Tie-2 activator described herein can reduce the OI of a subject. A change in OI can be determined from baseline compared to 6, 24, 36, 48, 72 hours, or 7 days after administration of a therapy described herein. In some embodiments, a change in OI is about 1 to about 5, about 1 to about 10, or about 1 to about 20. In some embodiments, a change in OI is about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, or greater than 50.

Acute Lung Injury Score (LIS) or the Murray Score is an assessment of ALI severity. The LIS is a composite 4-point scoring system that includes the PaO$_2$/FiO$_2$ ratio, PEEP, lung compliance, and the extent of infiltrates (alveolar consolidation) as determined by a chest X-ray of the subject. The scoring system varies from 0 to 4, with 4 being the greatest extent of lung injury. The total LIS is obtained by dividing the aggregate sum by the number of components used: chest radiograph, hypoxemia, PEEP, and respiratory system compliance. TABLE 1 illustrates components of the LIS and corresponding scores. LIS can be interpreted as follows: 0=no lung injury; 1-2.5=mild to moderate lung injury; and >2.5=severe lung injury. Respiratory system compliance is an assessment of the lung's ability to stretch and expand. This metric, as known as pulmonary compliance, includes the total compliance of both lungs and measures a change in volume of lungs for each unit increase in the trans-pulmonary pressure (when enough time is allowed for the system to reach equilibrium). Lung compliance can be calculated by: change in lung volume/change in transpulmonary pressure. A change in LIS can be assessed over 7 days, or on the last day of positive pressure ventilation prior to day 7 after administration of a therapy described herein. In some embodiments, a change in LIS is 1, 2, 3, or 4.

TABLE 1

| | Value | Score |
|---|---|---|
| 1. Chest radiograph score | | |
| No alveolar consolidation | | 0 |
| Alveolar consolidation confined to 1 quadrant | | 1 |
| Alveolar consolidation confined to 2 quadrants | | 2 |
| Alveolar consolidation confined to 3 quadrants | | 3 |
| Alveolar consolidation confined to 4 quadrants | | 4 |
| 2. Hypoxemia score | | |
| PaO$_2$/FiO$_2$ ratio | ≥300 | 0 |
| PaO$_2$/FiO$_2$ ratio | 225-299 | 1 |
| PaO$_2$/FiO$_2$ ratio | 175-224 | 2 |
| PaO$_2$/FiO$_2$ ratio | 100-174 | 3 |
| PaO$_2$/FiO$_2$ ratio | <100 | 4 |
| 3. PEEP score (when ventilated) | | |
| PEEP | ≤5 cm H$_2$O | 0 |
| PEEP | 6-8 cm H$_2$O | 1 |
| PEEP | 9-11 cm H$_2$O | 2 |
| PEEP | 12-14 cm H$_2$O | 3 |
| PEEP | ≥15 cm H$_2$O | 4 |
| 4. Respiratory system compliance score (when available) | | |
| Compliance | ≥80 mL/cm H$_2$O | 0 |
| Compliance | 60-79 mL/cm H$_2$O | 1 |
| Compliance | 40-59 mL/cm H$_2$O | 2 |
| Compliance | 20-39 mL/cm H$_2$O | 3 |
| Compliance | ≤19 mL/cm H$_2$O | 4 |

Pulmonary dead-space fraction is a risk factor of ARDS mortality. Pulmonary dead-space fraction (ratio of dead-space to tidal volume [$V_D/V_T$]) is the portion of tidal volume that does not participate in gas exchange and therefore consists of expired gas without carbon dioxide. PeCO$_2$ is the partial pressure of mean expired CO$_2$. The dead-space fraction is calculated as: (PaCO$_2$-PeCO$_2$)/PaCO$_2$. A change in pulmonary dead-space fraction can be assessed, for example, at Day 1, Day 2, Day 3, Day 4, Day 5, Day 6, or Day 7 post-treatment.

A radiograph assessment of pulmonary edema (RALE) evaluates the extent and density of alveolar opacities on chest radiographs to estimate the degree of pulmonary edema in ARDS. To calculate RALE score, each radiographic quadrant is scored for extent of consolidation (0-4) and density of opacification (1-3). The product of the consolidation and density scores for each of the four quadrants is summed. The RALE score ranges from 0 (best) to 48 (worst). RALE score can be measured at Day 1, Day 2, Day 3, Day 4, Day 5, Day 6, or Day 7 post-treatment.

Resolution of ARDS symptoms can be further assessed by improvement in lung function, for example, by reduced need for assisted ventilation. Quantification of ventilator free-days can be assessed, for example, over 7, 14, or 28 days. In some embodiments, quantification of ventilator free-days can be assessed over more than 28 days. The duration of assisted ventilation can also be assessed over 7, 14, or 28 days. In some embodiments, duration of assisted ventilation can be assessed over more than 28 days. For example, a percentage of subjects achieving pressure support ventilation for 2 hours can be assessed over 28 days. For example, the PEEP of assisted ventilation is 5 cm H$_2$O for 2 hours.

Occurrence of infection can be assessed over 7, 14, 21, or 28 days. Non-limiting examples of infections include superficial incisional/wound infections, deep incisional wound infections, organ/space infections, and ventilator associated pneumonia.

Sequential Organ Failure Assessment (SOFA) is a mortality prediction score that is based on the degree of dysfunction of six organ systems, one each for the respiratory, cardiovascular, hepatic, coagulation, renal, and neurological systems, each ranging from 0 to 4. SOFA score is the sum of the six scores, which ranges from 0 (best) to 24 (worst). SOFA score can be evaluated over 7 days post-treatment. For example, SOFA score can be assessed at 3 and 7 days.

The COVID-19 Ordinal Scale can be used to assess disease severity of COVID-19. For example, the COVID-19 Ordinal Scale published by the World Health Organization in February 2020 is summarized in TABLE 2. Virological evidence of infection can be obtained from nasopharyngeal or respiratory samples, blood, urine, or stool. Scores can also be based on additional factors, such as admission to critical care unit; need for supplemental oxygen, mechanical ventilation/oxygenation, extracorporeal membrane oxygenation (ECMO), or extracorporeal life support (ECLS); need for intravenous vasoactive medications; need for renal replacement therapy (RRT); death in critical care unit, death in hospital and at vital status (death) at 28 days; hospital-free days, ICU-free; and biological and immunological markers of illness.

TABLE 2

| Patient State | Descriptor | Score |
|---|---|---|
| Uninfected | No clinical or virological evidence of infection | 0 |
| Ambulatory | No limitation of activities | 1 |
| | Limitation of activities | 2 |
| Hospitalized - Mild Disease | Hospitalized, no oxygen therapy | 3 |
| | Oxygen by mask or nasal prongs | 4 |
| Hospitalized - Severe Disease | Non-invasive ventilation or high-flow oxygen | 5 |
| | Intubation and mechanical ventilation | 6 |
| | Ventilation and additional organ support: pressors, RRT, ECMO | 7 |
| Dead | Death | 8 |

Occurrence of thromboembolic events can be assessed over 60 days. Thromboembolic events can be measured by ultrasound of the deep venous system or CT-angiography of the chest.

Further assessments include determining a level of a biomarker in the plasma of a subject following administration of a therapy described herein to the subject. Non-limiting examples of plasma biomarkers include Ang-2, Ang-1, VEGF, Receptor for Advanced Glycation Endproducts (RAGE), IL-6, IL-8, soluble TNF-1 (sTNF-1), plasma protein C, lipoxin A4, resolvin D1, keratinocyte growth factor (KGF), soluble Tie2, c-reactive protein (CRP), and D-dimer. For example, a change in a level of a plasma biomarker can be determined from baseline compared to 6, 24, 36, 48, 72 hours, 7 days. In some embodiments, a change in a level of a plasma biomarker can be determined from baseline compared to Day 7 post-treatment.

In some embodiments, a change in a level of a biomarker is about 0.1 ng/ml to about 5 ng/mL, about 0.1 ng/ml to about 10 ng/ml, about 0.1 ng/ml to about 20 ng/mL, about 0.1 ng/ml to about 30 ng/mL, or about 0.1 ng/mL to about 50 ng/mL. In some embodiments, a change in a level of a biomarker is about 0.1 ng/ml, about 0.2 ng/mL, about 0.3 ng/mL, about 0.4 ng/ml, about 0.5 ng/mL, about 0.6 ng/mL, about 0.7 ng/ml, about 0.8 ng/ml, about 0.9 ng/ml, about 1 ng/mL, about 1.1 ng/ml, about 1.2 ng/ml, about 1.3 ng/mL, about 1.4 ng/ml, about 1.5 ng/ml, about 1.6 ng/mL, about 1.7 ng/ml, about 1.8 ng/ml, about 1.9 ng/mL, about 2 ng/ml, about 2.1 ng/mL, about 2.2 ng/mL, about 2.3 ng/ml, about 2.4 ng/ml, about 2.5 ng/ml, about 2.6 ng/ml, about 2.7 ng/ml, about 2.8 ng/mL, about 2.9 ng/ml, about 3 ng/ml, about 3.1 ng/ml, about 3.2 ng/ml, about 3.3 ng/ml, about 3.4 ng/ml, about 3.5 ng/ml, about 3.6 ng/ml, about 3.7 ng/ml, about 3.8 ng/ml, about 3.9 ng/ml, about 4 ng/ml, about 4.1 ng/ml, about 4.2 ng/ml, about 4.3 ng/ml, about 4.4 ng/ml, about 4.5 ng/mL, about 4.6 ng/ml, about 4.7 ng/ml, about 4.8 ng/ml, about 4.9 ng/mL, about 5 ng/mL, about 10 ng/ml, about 15 ng/ml, about 20 ng/ml, about 25 ng/mL, about 30 ng/mL, about 35 ng/mL, about 40 ng/mL, about 45 ng/ml, or about 50 ng/ml. In some embodiments, a change in a level of a biomarker is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100%.

A change in plasma Ang-2/Ang-1 ratio can be determined from baseline compared to 6, 24, 36, 48, 72 hours, or 7 days after administration of a therapy described herein. In some embodiments, a change in plasma Ang-2/Ang-1 ratio is about 1 to about 10, about 1 to about 20, about 1 to about 30, about 1 to about 40, about 1 to about 50, or about 1 to about 100. In some embodiments, a change in plasma Ang-2/Ang-1 ratio is about 5, about 10, about 15, about 20, about 25, about 30, about 35, about 40, about 45, about 50, about 55, about 60 about 65, about 70 about 75, about 80, about 85, about 90 about 95, or about 100.

Microalbuminuria can be an indicator of increased vascular permeability caused by systemic inflammatory response, for example, due to sepsis, ARDS, and renal damage. Thus, respiratory function can be assessed by a change in a level of urine microalbumin in a subject following administration of a therapy described herein to the subject. For example, a change in levels of urine microalbumin can be determined from baseline compared to 24, 36, 48, 72 hours, or 7 days following administration.

The protein concentration of alveolar edema fluid can be an indicator of lung injury progression. Higher total protein concentration in bronchoalveolar lavage (BAL) is associated with higher mortality in ARDS patients. Thus, respiratory function can also be assessed by a change in total protein levels, for example, in mini-bronchoalveolar lavage (mBAL) obtained from a subject, following administration of a therapy described herein to the subject. For example, a change in protein concentration in BAL can be determined from baseline compared to 24, 36, 48, 72 hours, or 7 days following administration.

ARDS and Respiratory Failure Models

The treatment of ARDS, lung injury, and respiratory failure can be assessed by measuring the effect of a compound disclosed herein on lung vascular leakage using in vitro or in vivo models. For example, inflammatory lung vascular leakage can be induced by the Gram-negative endotoxin, lipopolysaccharides (LPS), in cultured endothelial cells. Reduction in LPS-induced vascular leakage can be assessed using a compound described herein.

Treatment efficacy can also be assessed using inducible endothelial cell knockout mouse models for VE-PTP (Cdh5-Cre$^{ERT2}$: PTPR-$\beta^{lox/lox}$, hereafter iECKO-VE-PTP). Vascular leakage in mice models can be induced by inflammatory permeability triggers, such as histamine and VEGF. Additional non-limiting examples of disease models include LPS-induced pulmonary and renal injury, polymicrobial septic shock induced by cecal ligation and puncture (CLP), IL-8 induced leukocyte endothelial transmigration, and IL-2 induced cytokine storm. High doses of IL-2 can elevate Ang-2 levels. IL-2-induced vascular leak syndrome manifests as hypotension and can lead to shock and death.

Tie-2 Activators

Compounds disclosed herein can be effective as Tie-2 activators. The compounds can promote that activity, for example, by binding to or inhibiting HPTPβ. Such compounds can bind to HPTPβ, for example, by mimicking the binding mechanism of a native substrate, such as a phosphorylated compound. A compound can be a phosphate mimetic or bioisostere, for example, a sulfamic acid. The compound could also be derived from an amino acid building block or comprise an amino acid backbone for efficiency and economy of synthesis.

In some embodiments, a compound disclosed herein is a compound of the formula:

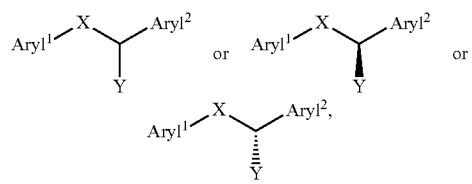

wherein: Aryl$^1$ is an aryl group which is substituted or unsubstituted; Aryl$^2$ is an aryl group which is substituted or unsubstituted; X is alkylene, alkenylene, alkynylene, an ether linkage, an amine linkage, an amide linkage, an ester linkage, a thioether linkage, a carbamate linkage, a carbonate linkage, a sulfone linkage, any of which is substituted or unsubstituted, or a chemical bond; and Y is H, aryl, heteroaryl, NH(aryl), NH(heteroaryl), NHSO$_2$R$^g$, or NHCOR$^g$, any of which is substituted or unsubstituted, or

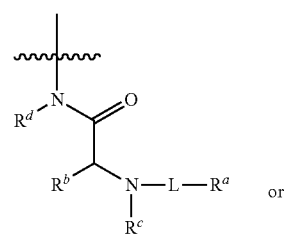

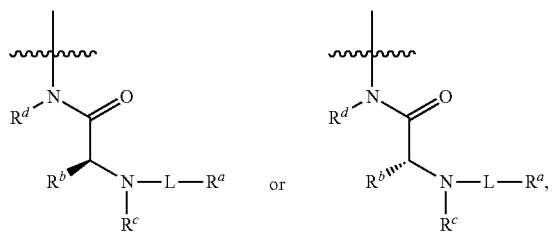

wherein:

L is alkylene, alkenylene, or alkynylene, any of which is substituted or unsubstituted, or together with the nitrogen atom to which L is bound forms an amide linkage, a carbamate linkage, or a sulfonamide linkage, or a chemical bond, or together with any of $R^a$, $R^b$, $R^c$, and $R^d$ forms a ring that is substituted or unsubstituted; $R^a$ is H, alkyl, alkenyl, alkynyl, aryl, arylalkyl, heterocyclyl, heterocyclylalkyl, heteroaryl, or heteroarylalkyl, any of which is substituted or unsubstituted, or together with any of L, $R^b$, $R^c$, and $R^d$ forms a ring that is substituted or unsubstituted; $R^b$ is H, alkyl, alkenyl, alkynyl, aryl, arylalkyl, heterocyclyl, heterocyclylalkyl, heteroaryl, or heteroarylalkyl, any of which is substituted or unsubstituted, or together with any of L, $R^a$, $R^c$, and $R^d$ forms a ring that is substituted or unsubstituted; $R^c$ is H or alkyl which is substituted or unsubstituted, or together with any of L, $R^a$, $R^b$, and $R^d$ forms a ring that is substituted or unsubstituted; $R^d$ is H or alkyl which is substituted or unsubstituted, or together with any of L, $R^a$, $R^b$, and $R^c$ forms a ring that is substituted or unsubstituted; and $R^g$ is H, alkyl, alkenyl, alkynyl, aryl, arylalkyl, heterocyclyl, heterocyclylalkyl, heteroaryl, or heteroarylalkyl, any of which is substituted or unsubstituted, or a pharmaceutically-acceptable salt, tautomer, or zwitterion thereof.

In some embodiments, $Aryl^1$ is substituted or unsubstituted phenyl, $Aryl^2$ is substituted or unsubstituted heteroaryl, and X is alkylene. In some embodiments, $Aryl^1$ is substituted phenyl, $Aryl^2$ is substituted heteroaryl, and X is methylene.

In some embodiments, a compound is of the formula:

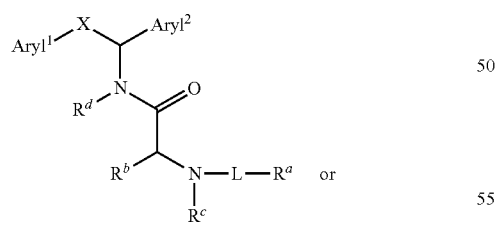

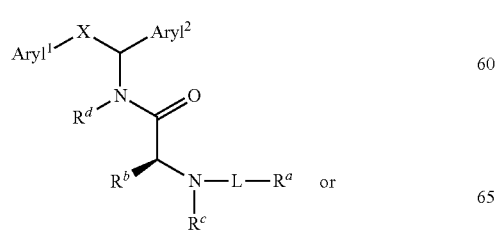

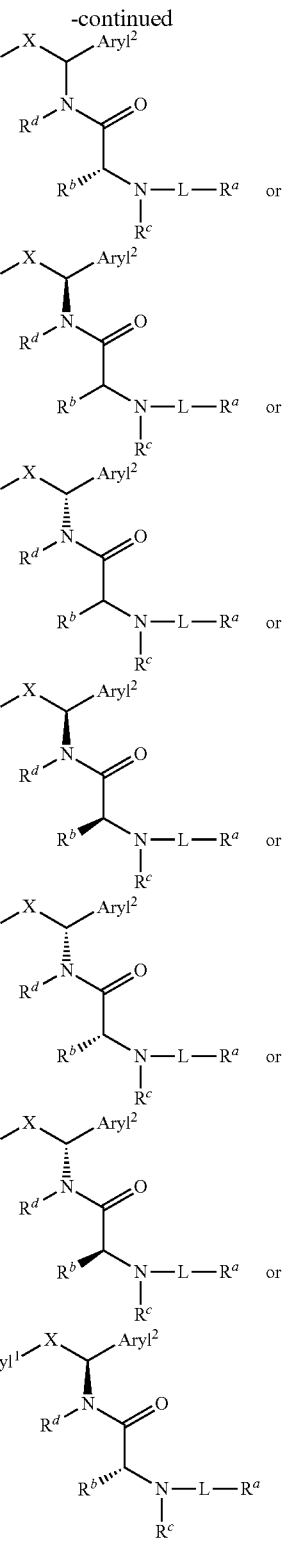

wherein $Aryl^1$ is para-substituted phenyl, $Aryl^2$ is substituted heteroaryl; X is methylene; L is alkylene, alkenylene, or alkynylene, any of which is substituted or unsubstituted, or together with the nitrogen atom to which L is bound forms an amide linkage, a carbamate linkage, or a sulfonamide linkage, or a chemical bond; $R^a$ is H, alkyl, alkenyl, alkynyl, aryl, arylalkyl, heterocyclyl, heterocyclylalkyl, heteroaryl, or heteroarylalkyl, any of which is substituted or unsubstituted; $R^b$ is H, alkyl, alkenyl, alkynyl, aryl, arylalkyl, heterocyclyl, heterocyclylalkyl, heteroaryl, or heteroarylalkyl, any of which is substituted or unsubstituted; $R^c$ is H or alkyl which is substituted or unsubstituted; and $R^d$ is H or alkyl which is substituted or unsubstituted.

In some embodiments, $Aryl^1$ is para-substituted phenyl; $Aryl^2$ is a substituted thiazole moiety; X is methylene; L together with the nitrogen atom to which L is bound forms a carbamate linkage; $R^a$ is alkyl, which is substituted or unsubstituted; $R^b$ is arylalkyl, which is substituted or unsubstituted; $R^c$ is H; and $R^d$ is H.

In some embodiments, $Aryl^2$ is:

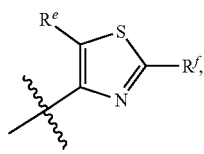

wherein $R^e$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted; and $R^f$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted.

In some embodiments, $R^e$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted; and $R^f$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted. In some embodiments, $R^e$ is H, OH, F, Cl, Br, I, alkyl, or an alkoxy group, any of which is substituted or unsubstituted and $R^f$ is alkyl, aryl, heterocyclyl, or heteroaryl, any of which is substituted or unsubstituted. In some embodiments, $Aryl^1$ is 4-phenylsulfamic acid; $R^a$ is alkyl, which is substituted or unsubstituted; $R^b$ is arylalkyl, which is substituted or unsubstituted; $R^e$ is H; and $R^f$ is heteroaryl. In some embodiments, $Aryl^1$ is 4-phenylsulfamic acid; $R^a$ is alkyl; which is substituted or unsubstituted; $R^b$ is arylalkyl, which is substituted or unsubstituted; $R^e$ is H; and $R^f$ is alkyl. In some embodiments, $Aryl^2$ is:

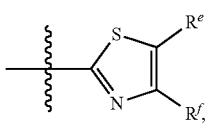

wherein $R^e$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted, $R^f$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted. In some embodiments, $R^e$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted; and $R^f$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted. In some embodiments, $R^e$ is H, OH, F, Cl, Br, I, alkyl, or an alkoxy group, any of which is substituted or unsubstituted; and $R^f$ is alkyl, aryl, heterocyclyl, or heteroaryl, any of which is substituted or unsubstituted. In some embodiments, $aryl^1$ is 4-phenylsulfamic acid; $R^a$ is alkyl, which is substituted or unsubstituted; $R^b$ is arylalkyl, which is substituted or unsubstituted; $R^e$ is H; and $R^f$ is heteroaryl.

In some embodiments, a substituted phenyl group is:

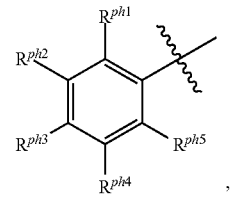

wherein:
each of $R^{ph1}$, $R^{ph2}$, $R^{ph3}$, $R^{ph4}$, and $R^{ph5}$ is independently H, OH, F, Cl, Br, I, CN, sulfamic acid, tosylate, mesylate, triflate, besylate, alkyl, alkenyl, alkynyl, an alkoxy group, a sulfhydryl group, a nitro group, an azido group, a sulfoxide group, a sulfone group, a sulfonamide group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl.

Illustrative compounds include the following:

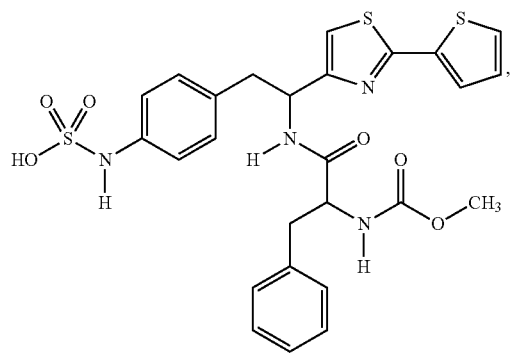

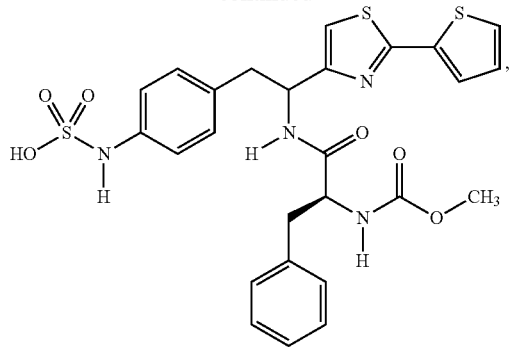
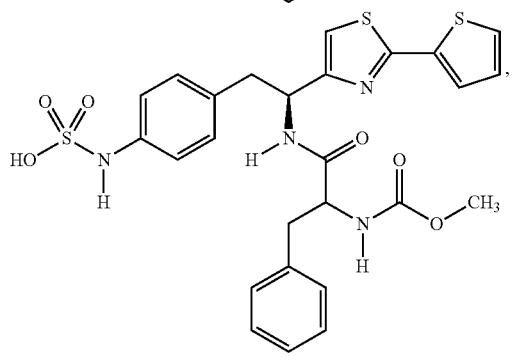
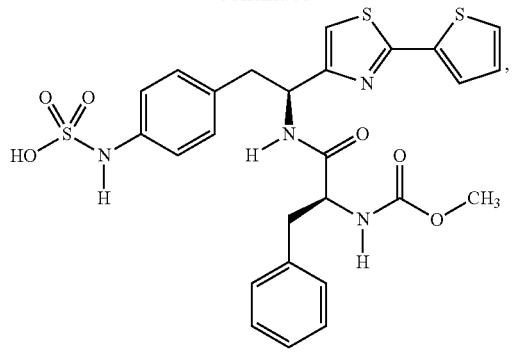
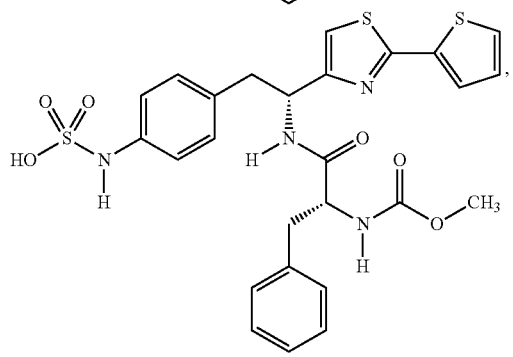
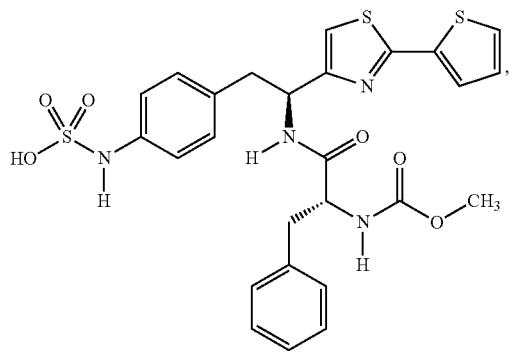
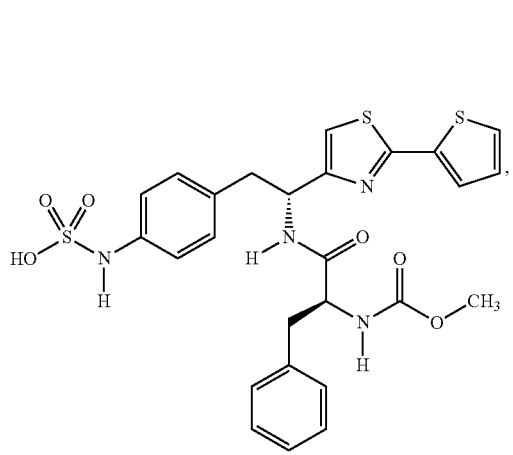

-continued

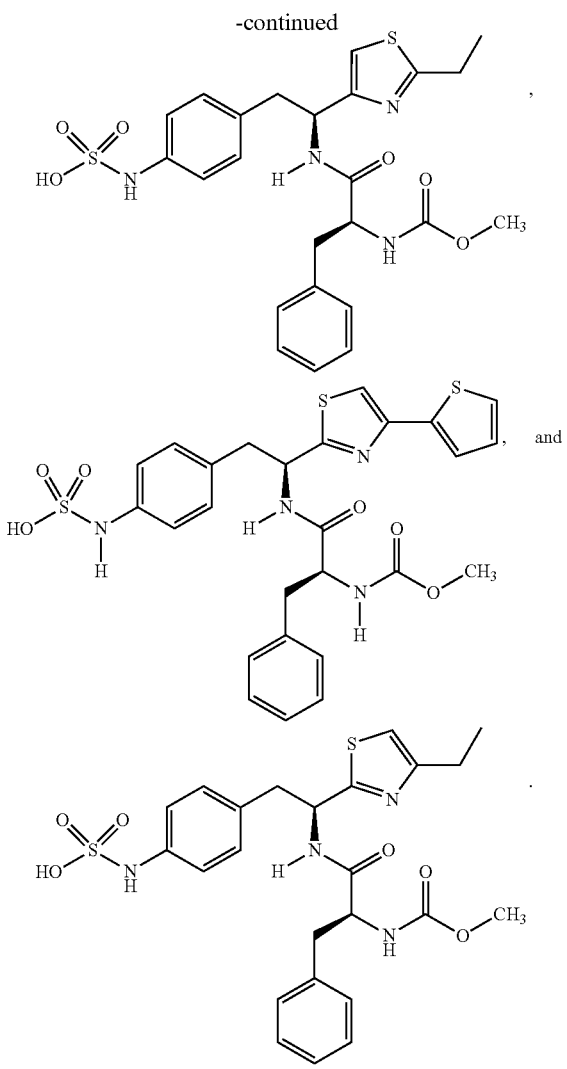

Optional Substituents for Chemical Groups

Non-limiting examples of optional substituents include hydroxyl groups, sulfhydryl groups, halogens, amino groups, nitro groups, cyano groups, azido groups, sulfoxide groups, sulfone groups, sulfonamide groups, carboxyl groups, carboxaldehyde groups, imine groups, alkyl groups, halo-alkyl groups, alkenyl groups, halo-alkenyl groups, alkynyl groups, halo-alkynyl groups, alkoxy groups, aryl groups, aryloxy groups, aralkyl groups, arylalkoxy groups, heterocyclyl groups, acyl groups, acyloxy groups, carbamate groups, amide groups, and ester groups.

Non-limiting examples of alkyl and alkylene groups include straight, branched, and cyclic alkyl and alkylene groups. An alkyl group can be, for example, a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted.

Non-limiting examples of straight alkyl groups include methyl, ethyl, propyl, butyl, pentyl, hexyl, heptyl, octyl, nonyl, and decyl.

Branched alkyl groups include any straight alkyl group substituted with any number of alkyl groups. Non-limiting examples of branched alkyl groups include isopropyl, isobutyl, sec-butyl, and t-butyl.

Non-limiting examples of cyclic alkyl groups include cyclopropyl, cyclobutyl, cyclopentyl, cyclohexyl, cycloheptlyl, and cyclooctyl groups. Cyclic alkyl groups also include fused-, bridged-, and spiro-bicycles and higher fused-, bridged-, and spiro-systems. A cyclic alkyl group can be substituted with any number of straight, branched, or cyclic alkyl groups.

Non-limiting examples of alkenyl and alkenylene groups include straight, branched, and cyclic alkenyl groups. The olefin or olefins of an alkenyl group can be, for example, E, Z, cis, trans, terminal, or exo-methylene. An alkenyl or alkenylene group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted.

Non-limiting examples of alkynyl or alkynylene groups include straight, branched, and cyclic alkynyl groups. The triple bond of an alkylnyl or alkynylene group can be internal or terminal. An alkylnyl or alkynylene group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted.

A halo-alkyl group can be any alkyl group substituted with any number of halogen atoms, for example, fluorine, chlorine, bromine, and iodine atoms. A halo-alkenyl group can be any alkenyl group substituted with any number of halogen atoms. A halo-alkynyl group can be any alkynyl group substituted with any number of halogen atoms.

An alkoxy group can be, for example, an oxygen atom substituted with any alkyl, alkenyl, or alkynyl group. An ether or an ether group comprises an alkoxy group. Non-limiting examples of alkoxy groups include methoxy, ethoxy, propoxy, isopropoxy, and isobutoxy.

An aryl group can be heterocyclic or non-heterocyclic. An aryl group can be monocyclic or polycyclic. An aryl group can be substituted with any number of substituents described herein, for example, hydrocarbyl groups, alkyl groups, alkoxy groups, and halogen atoms. Non-limiting examples of aryl groups include phenyl, toluyl, naphthyl, pyrrolyl, pyridyl, imidazolyl, thiophenyl, and furyl.

An aryloxy group can be, for example, an oxygen atom substituted with any aryl group, such as phenoxy.

An aralkyl group can be, for example, any alkyl group substituted with any aryl group, such as benzyl.

An arylalkoxy group can be, for example, an oxygen atom substituted with any aralkyl group, such as benzyloxy.

A heterocycle can be any ring containing a ring atom that is not carbon, for example, N, O, S, P, Si, B, or any other heteroatom. A heterocycle can be substituted with any number of substituents, for example, alkyl groups and halogen atoms. A heterocycle can be aromatic (heteroaryl) or non-aromatic. Non-limiting examples of heterocycles include pyrrole, pyrrolidine, pyridine, piperidine, succinamide, maleimide, morpholine, imidazole, thiophene, furan, tetrahydrofuran, pyran, and tetrahydropyran.

An acyl group can be, for example, a carbonyl group substituted with hydrocarbyl, alkyl, hydrocarbyloxy, alkoxy, aryl, aryloxy, aralkyl, arylalkoxy, or a heterocycle. Non-limiting examples of acyl include acetyl, benzoyl, benzyloxycarbonyl, phenoxycarbonyl, methoxycarbonyl, and ethoxycarbonyl.

An acyloxy group can be an oxygen atom substituted with an acyl group. An ester or an ester group comprises an acyloxy group. A non-limiting example of an acyloxy group, or an ester group, is acetate.

A carbamate group can be an oxygen atom substituted with a carbamoyl group, wherein the nitrogen atom of the carbamoyl group is unsubstituted, monosubstituted, or disubstituted with one or more of hydrocarbyl, alkyl, aryl, heterocyclyl, or aralkyl. When the nitrogen atom is disubstituted, the two substituents together with the nitrogen atom can form a heterocycle.

In some embodiments, a Tie-2 activator is MAN-01.

Pharmaceutically-Acceptable Salts

The method disclosed herein provides the use of pharmaceutically-acceptable salts of any compound described herein. Pharmaceutically-acceptable salts include, for example, acid-addition salts and base-addition salts. The acid that is added to the compound to form an acid-addition salt can be an organic acid or an inorganic acid. A base that is added to the compound to form a base-addition salt can be an organic base or an inorganic base. In some embodiments, a pharmaceutically-acceptable salt is a metal salt. In some embodiments, a pharmaceutically-acceptable salt is an ammonium salt.

Metal salts can arise from the addition of an inorganic base to a compound disclosed herein. The inorganic base consists of a metal cation paired with a basic counterion, such as, for example, hydroxide, carbonate, bicarbonate, or phosphate. The metal can be an alkali metal, alkaline earth metal, transition metal, or main group metal. In some embodiments, the metal is lithium, sodium, potassium, cesium, cerium, magnesium, manganese, iron, calcium, strontium, cobalt, titanium, aluminum, copper, cadmium, or zinc.

In some embodiments, a metal salt is a lithium salt, a sodium salt, a potassium salt, a cesium salt, a cerium salt, a magnesium salt, a manganese salt, an iron salt, a calcium salt, a strontium salt, a cobalt salt, a titanium salt, an aluminum salt, a copper salt, a cadmium salt, or a zinc salt.

Ammonium salts can arise from the addition of ammonia or an organic amine to a compound disclosed herein. In some embodiments, the organic amine is triethyl amine, diisopropyl amine, ethanol amine, diethanol amine, triethanol amine, morpholine, N-methylmorpholine, piperidine, N-methylpiperidine, N-ethylpiperidine, dibenzylamine, piperazine, pyridine, pyrrazole, piprazole, imidazole, or pyrazine.

In some embodiments, an ammonium salt is a triethyl amine salt, a diisopropyl amine salt, an ethanol amine salt, a diethanol amine salt, a triethanol amine salt, a morpholine salt, an N-methylmorpholine salt, a piperidine salt, an N-methylpiperidine salt, an N-ethylpiperidine salt, a dibenzylamine salt, a piperazine salt, a pyridine salt, a pyrrazole salt, a piprazole salt, an imidazole salt, or a pyrazine salt.

Acid addition salts can arise from the addition of an acid to a compound disclosed herein. In some embodiments, the acid is organic. In some embodiments, the acid is inorganic. In some embodiments, the acid is hydrochloric acid, hydrobromic acid, hydroiodic acid, nitric acid, nitrous acid, sulfuric acid, sulfurous acid, a phosphoric acid, isonicotinic acid, lactic acid, salicylic acid, tartaric acid, ascorbic acid, gentisinic acid, gluconic acid, glucaronic acid, saccaric acid, formic acid, benzoic acid, glutamic acid, pantothenic acid, acetic acid, propionic acid, butyric acid, fumaric acid, succinic acid, methanesulfonic acid, ethanesulfonic acid, benzenesulfonic acid, p-toluenesulfonic acid, citric acid, oxalic acid, or maleic acid.

In some embodiments, the salt is a hydrochloride salt, a hydrobromide salt, a hydroiodide salt, a nitrate salt, a nitrite salt, a sulfate salt, a sulfite salt, a phosphate salt, isonicotinate salt, a lactate salt, a salicylate salt, a tartrate salt, an ascorbate salt, a gentisinate salt, a gluconate salt, a glucaronate salt, a saccarate salt, a formate salt, a benzoate salt, a glutamate salt, a pantothenate salt, an acetate salt, a propionate salt, a butyrate salt, a fumarate salt, a succinate salt, a methanesulfonate salt, an ethanesulfonate salt, a benzenesulfonate salt, a p-toluenesulfonate salt, a citrate salt, an oxalate salt, or a maleate salt.

A compound herein can be a salt of an acidic group, for example:

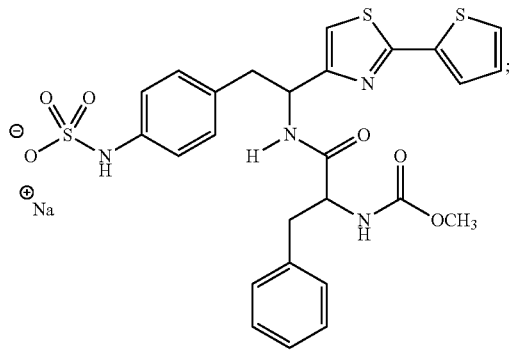

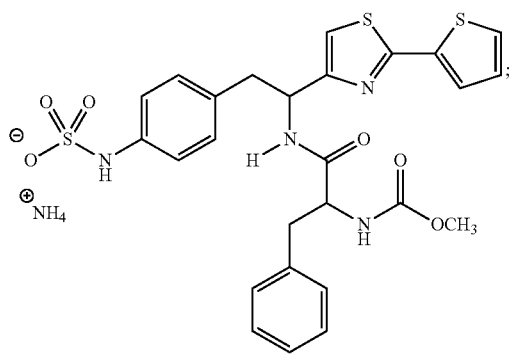

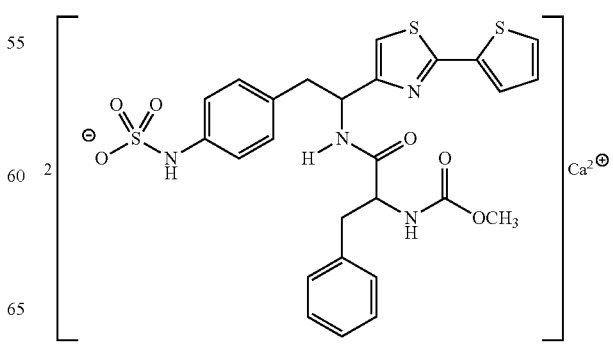

-continued

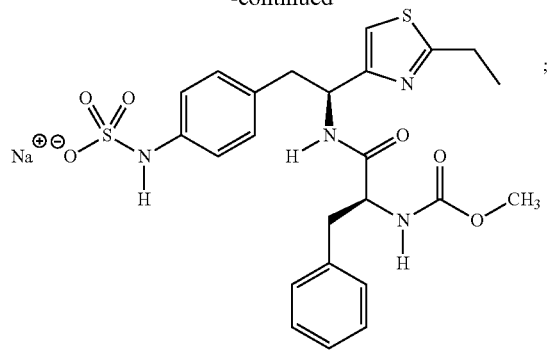

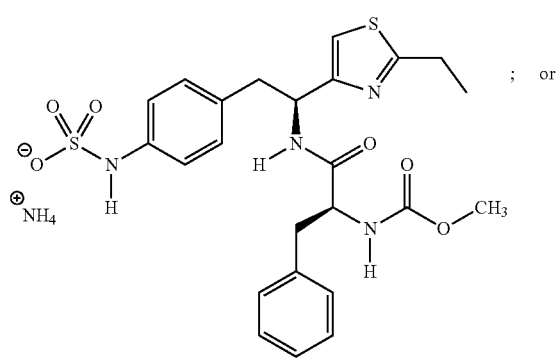

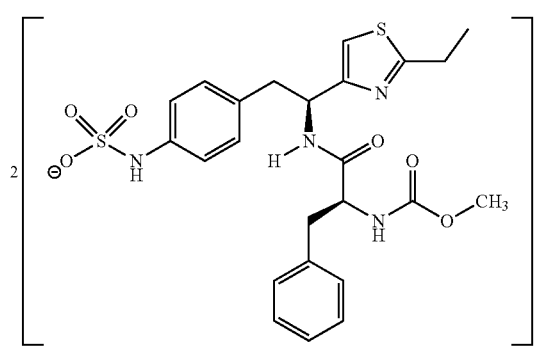

A compound herein can be a salt of a basic group formed from a strong acid, for example:

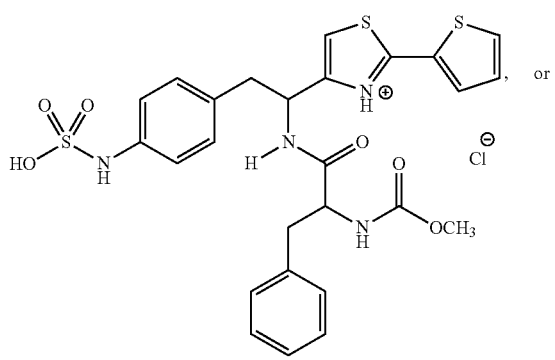

-continued

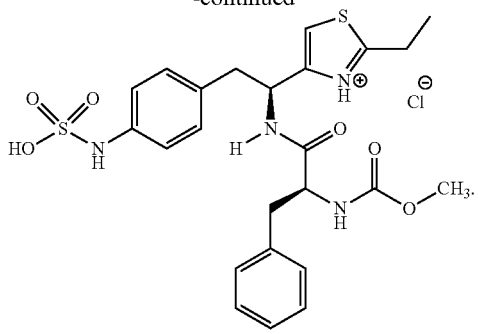

A compound herein can also exist in a zwitterionic form, for example:

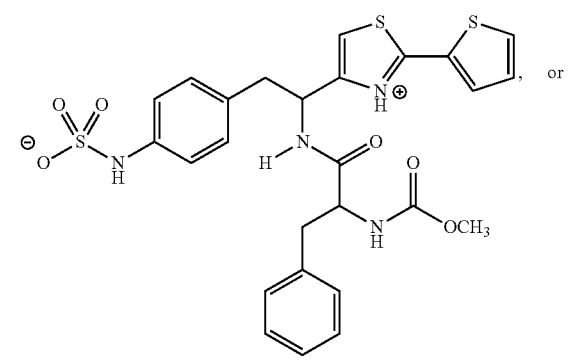

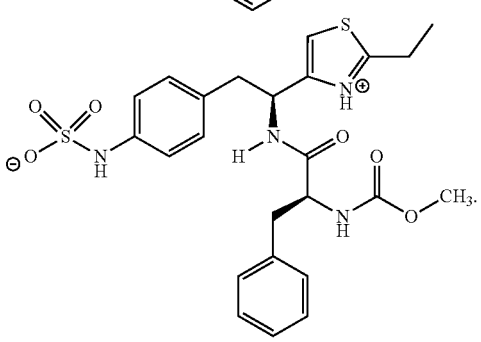

Formulations

A pharmaceutical composition of the present disclosure can provide a therapeutically-effective amount of an activator of Tie-2.

The disclosed formulations can comprise one or more pharmaceutically-acceptable agents, which alone or in combination solubilize a compound herein or a pharmaceutically-acceptable salt thereof.

In some embodiments, a compound or pharmaceutically-acceptable salt thereof is present in a formulation in an amount of from about 0.1 mg/mL to about 100 mg/mL, from about 0.1 mg/mL to about 1 mg/mL, from about 0.1 mg/mL to about 5 mg/mL, from about 5 mg/mL to about 10 mg/mL, from about 10 mg/mL to about 15 mg/mL, from about 15 mg/mL to about 20 mg/mL, from about 20 mg/mL to about 25 mg/mL, from about 25 mg/mL to about 30 mg/mL, from about 30 mg/mL to about 35 mg/mL, from about 35 mg/mL to about 40 mg/mL, from about 40 mg/mL to about 45 mg/mL, about 45 mg/mL to about 50 mg/mL, from about 50 mg/mL to about 55 mg/mL, from about 55 mg/mL to about 60 mg/mL, from about 60 mg/mL to about 65 mg/mL, from about 65 mg/mL to about 70 mg/mL, from about 70 mg/mL to about 75 mg/mL, about 75 mg/mL to about 80 mg/mL, from about 80 mg/mL to about 85 mg/mL, from about 85 mg/mL to about 90 mg/mL, from about 90 mg/mL to about 95 mg/mL, or from about 95 mg/mL to about 100 mg/mL.

In some embodiments, a compound or pharmaceutically-acceptable salt thereof is present in a formulation in an amount of about 1 mg/mL, about 2 mg/mL, about 3 mg/mL, about 4 mg/mL, about 5 mg/mL, about 6 mg/mL, about 7 mg/mL, about 8 mg/mL, about 9 mg/mL, about 10 mg/mL, about 11 mg/mL about 12 mg/mL, about 13 mg/mL, about 14 mg/mL, about 15 mg/mL, about 16 mg/mL, about 17 mg/mL, about 18 mg/mL, about 19 mg/mL, about 20 mg/mL, about 21 mg/mL about 22 mg/mL, about 23 mg/mL, about 24 mg/mL, about 25 mg/mL, about 26 mg/mL, about 27 mg/mL, about 28 mg/mL, about 29 mg/mL, about 30 mg/mL, about 31 mg/mL about 32 mg/mL, about 33 mg/mL, about 34 mg/mL, about 35 mg/mL, about 36 mg/mL, about 37 mg/mL, about 38 mg/mL, about 39 mg/mL, about 40 mg/mL, about 41 mg/mL about 42 mg/mL, about 43 mg/mL, about 44 mg/mL, about 45 mg/mL, about 46 mg/mL, about 47 mg/mL, about 48 mg/mL, about 49 mg/mL, about 50 mg/mL, about 51 mg/mL about 52 mg/mL, about 53 mg/mL, about 54 mg/mL, about 55 mg/mL, about 56 mg/mL, about 57 mg/mL, about 58 mg/mL, about 59 mg/mL, about 60 mg/mL, about 61 mg/mL about 62 mg/mL, about 63 mg/mL, about 64 mg/mL, about 65 mg/mL, about 66 mg/mL, about 67 mg/mL, about 68 mg/mL, about 69 mg/mL, about 70 mg/mL, about 71 mg/mL about 72 mg/mL, about 73 mg/mL, about 74 mg/mL, about 75 mg/mL, about 76 mg/mL, about 77 mg/mL, about 78 mg/mL, about 79 mg/mL, about 80 mg/mL, about 81 mg/mL about 82 mg/mL, about 83 mg/mL, about 84 mg/mL, about 85 mg/mL, about 86 mg/mL, about 87 mg/mL, about 88 mg/mL, about 89 mg/mL, about 90 mg/mL, about 91 mg/mL about 92 mg/mL, about 93 mg/mL, about 94 mg/mL, about 95 mg/mL, about 96 mg/mL, about 97 mg/mL, about 98 mg/mL, about 99 mg/mL, or about 100 mg/mL.

A formulation that is disclosed herein can be made more soluble by the addition of an additive or agent. The improvement of solubility of the formulation can increase by about 5%, about 10%, about 15%, about 20%, about 25%, about 30%, about 35%, about 40%, about 45%, about 50%, about 55%, about 60%, about 65%, about 70%, about 75% about 80%, about 85%, about 90%, about 95%, about 100%, about 110%, about 120%, about 130%, about 140%, about 150%, about 160%, about 170%, about 180%, about 190%, about 200%, about 225%, about 250%, about 275%, about 300%, about 325%, about 350%, about 375%, about 400%, about 450%, or about 500%.

A formulation disclosed herein can be stable for about 1 day, about 2 days, about 3 days, about 4 days, about 5 days, about 6 days, about 7 days, about 8 days, about 9 days, about 10 days, about 2 weeks, about 4 weeks, about 6 weeks, about 8 weeks, about 10 weeks, about 12 weeks, about 3 months, about 4 months, about 5 months, about 6 months, about 7 months, about 8 months, about 9 months, about 10 months, about 11 months, or about one year. A formulation disclosed herein can be stable, for example, at about 0° C., about 5° C., about 10° C., about 15° C., about 20° C., about 25° C., about 30° C., about 35° C., about 40° C., about 45° C., about 50° C., about 60° C., about 70° C., or about 80° C.

Alcohols

A non-limiting example of a solubilizing agent includes an organic solvent. Non-limiting examples of organic solvents include alcohols, for example, $C_1$-$C_4$ linear alkyl, $C_3$-$C_4$ branched alkyl, ethanol, ethylene glycol, glycerin, 2-hydroxypropanol, propylene glycol, maltitol, sorbitol, xylitol; substituted or unsubstituted aryl, and benzyl alcohol.

Cyclodextrins

Non-limiting examples of cyclodextrins include α-cyclodextrin, β-cyclodextrin, methyl β-cyclodextrin, 2-hydroxypropyl-β-cyclodextrin, sulfobutylether-β-cyclodextrin sodium salt, hydroxyethyl-β-cyclodextrin (HEβCD), heptakis(2,6-di-O-methyl)-β-cyclodextrin (DMβCD), 2-hydroxypropyl-β-cyclodextrin, γ-cyclodextrin, and 2-hydroxypropyl-γ-cyclodextrin (HPγCD). A cyclodextrin can possess a large cyclic structure with a channel passing through the center of the structure. The interior of the cyclodextrin can be hydrophobic, and interact favorably with hydrophobic molecules. The exterior of the cyclodextrin can be highly hydrophilic owing to the several hydroxyl groups exposed to bulk solvent. Capture of a hydrophobic molecule, such as a compound disclosed herein, in the channel of the cyclodextrin can result in the formation of a complex stabilized by non-covalent hydrophobic interactions. The complex can be soluble in water, and carry the captured hydrophobic molecule into the bulk solvent.

Formulations of the disclosure can comprise randomly methylated β-cyclodextrins (RAMEB or RMCD). The formulations of the disclosure can comprise RAMEB comprising at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or at least 21 methyl groups.

The disclosed solubilizing systems comprise 2-hydroxypropyl-β-cyclodextrin (HPβCD). 2-Hydroxypropyl-β-cyclodextrin [CAS No. 128446-35-5] is commercially available as Cavitron™ 2-Hydroxypropyl-β-cyclodextrin, also described as hydroxypropyl-β-cyclodextrin or HPβCD, can be represented by either of the following formulae:

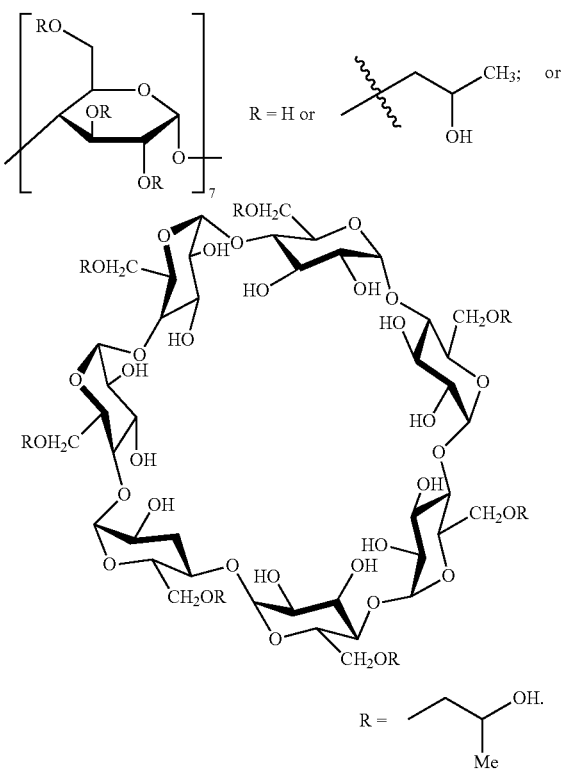

The average molecular weight of Cavitron™, is approximately 1396 Da, wherein the average degree of substitution is from about 0.5 to about 1.3 units of 2-hydroxypropyl per ring glucose unit.

The disclosed solubilizing systems comprise 2-hydroxypropyl-γ-cyclodextrin (HPγCD). 2-Hydroxypropyl-γ-cyclodextrin [CAS No. 128446-34-4], also known as hydroxypropyl-γ-cyclodextrin or HPGCD, can be represented by the following formula:

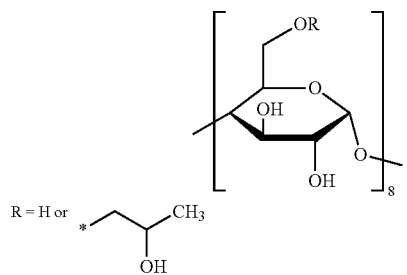

In one embodiment, a formulation disclosed herein can comprise a ratio of about 20 parts of a compound herein or a pharmaceutically-acceptable salt thereof to about 1 part solubilizing system (about 20; about 1), to about 1 part of the compound herein or a pharmaceutically-acceptable salt thereof to about 20 parts solubilizing system (about 1; about 20). For example, a formulation containing about 100 mg of a compound herein or a pharmaceutically-acceptable salt thereof can contain from about 5 mg to about 2000 mg of a solubilizing agent, such as a cyclodextrin. In another embodiment, the ratio can be based on number, or moles, or compound compared to number, or moles, of the solubilizing system.

The following are non-limiting examples of ratios of a compound herein and a solubilizing agent, such as a cyclodextrin. The following examples alternatively describe the ratio of a solubilizing agent, such as a cyclodextrin, and a compound herein. The ratio can be: about 20:about 1; about 19.9:about 1; about 19.8:about 1; about 19.7:about 1; about 19.6:about 1; about 19.5:about 1; about 19.4:about 1; about 19.3:about 1; about 19.2:about 1; about 19.1:about 1; about 19:about 1; about 18.9:about 1; about 18.8:about 1; about 18.7:about 1; about 18.6:about 1; about 18.5:about 1; about 18.4:about 1; about 18.3:about 1; about 18.2:about 1; about 18.1:about 1; about 18:about 1; about 17.9:about 1; about 17.8:about 1; about 17.7:about 1; about 17.6:about 1; about 17.5:about 1; about 17.4:about 1; about 17.3:about 1; about 17.2:about 1; about 17.1:about 1; about 17:about 1; about 16.9:about 1; about 16.8:about 1; about 16.7:about 1; about 16.6:about 1; about 16.5:about 1; about 16.4:about 1; about 16.3:about 1; about 16.2:about 1; about 16.1:about 1; about 16:about 1; about 15.9:about 1; about 15.8:about 1; about 15.7:about 1; about 15.6:about 1; about 15.5:about 1; about 15.4:about 1; about 15.3:about 1; about 15.2:about 1; about 15.1:about 1; about 15:about 1; about 14.9:about 1; about 14.8:about 1; about 14.7:about 1; about 14.6:about 1; about 14.5:about 1; about 14.4:about 1; about 14.3:about 1; about 14.2:about 1; about 14.1:about 1; about 14:about 1; about 13.9:about 1; about 13.8:about 1; about 13.7:about 1; about 13.6:about 1; about 13.5:about 1; about 13.4:about 1; about 13.3:about 1; about 13.2:about 1; about 13.1:about 1; about 13:about 1; about 12.9:about 1; about 12.8:about 1; about 12.7:about 1; about 12.6:about 1; about 12.5:about 1; about 12.4:about 1; about 12.3:about 1; about 12.2:about 1; about 12.1:about 1; about 12:about 1; about 11.9:about 1; about 11.8:about 1; about 11.7:about 1; about 11.6:about 1; about 11.5:about 1; about 11.4:about 1; about 11.3:about 1; about 11.2:about 1; about 11.1:about 1; about 11:about 1; about 10.9:about 1; about 10.8:about 1; about 10.7:about 1; about 10.6:about 1; about 10.5:about 1; about 10.4:about 1; about 10.3:about 1; about 10.2:about 1; about 10.1:about 1; about 10:about 1; about 9.9:about 1; about 9.8:about 1; about 9.7:about 1; about 9.6:about 1; about 9.5:about 1; about 9.4:about 1; about 9.3:about 1; about 9.2:about 1; about 9.1:about 1; about 9:about 1; about 8.9:about 1; about 8.8:about 1; about 8.7:about 1; about 8.6:about 1; about 8.5:about 1; about 8.4:about 1; about 8.3:about 1; about 8.2:about 1; about 8.1:about 1; about 8:about 1; about 7.9:about 1; about 7.8:about 1; about 7.7:about 1; about 7.6:about 1; about 7.5:about 1; about 7.4:about 1; about 7.3:about 1; about 7.2:about 1; about 7.1:about 1; about 7:about 1; about 6.9:about 1; about 6.8:about 1; about 6.7:about 1; about 6.6:about 1; about 6.5:about 1; about 6.4:about 1; about 6.3:about 1; about 6.2:about 1; about 6.1:about 1; about 6:about 1; about 5.9:about 1; about 5.8:about 1; about 5.7:about 1; about 5.6:about 1; about 5.5:about 1; about 5.4:about 1; about 5.3:about 1; about 5.2:about 1; about 5.1:about 1; about 5:about 1; about 4.9:about 1; about 4.8:about 1; about 4.7:about 1; about 4.6:about 1; about 4.5:about 1; about 4.4:about 1; about 4.3:about 1; about 4.2:about 1; about 4.1:about 1; about 4:about 1; about 3.9:about 1; about 3.8:about 1; about 3.7:about 1; about 3.6:about 1; about 3.5:about 1; about 3.4:about 1; about 3.3:about 1; about 3.2:about 1; about 3.1:about 1; about 3:about 1; about 2.9:about 1; about 2.8:about 1; about 2.7:about 1; about 2.6:about 1; about 2.5:about 1; about 2.4:about 1; about 2.3:about 1; about 2.2:about 1; about 2.1:about 1; about 2:about 1; about 1.9:about 1; about 1.8:about 1; about 1.7:about 1; about 1.6:about 1; about 1.5:about 1; about 1.4:about 1; about 1.3:about 1; about 1.2:about 1; about 1.1:about 1; or about 1:about 1.

Polyvinylpyrrolidione

Another non-limiting example of a solubilizing agent is polyvinylpyrrolidone (PVP), having the formula:

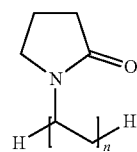

wherein the index n is from about 40 to about 200. PVP's can have an average molecular weight from about 5500 to about 28,000 g/mol. One non-limiting example is PVP-10, having an average molecular weight of approximately 10,000 g/mol.

Polyakyleneoxides and Ethers Thereof

Another non-limiting example of solubilizing agents includes polyalkyleneoxides, and polymers of alcohols or polyols. Polymers can be mixed, or contain a single monomeric repeat subunit. For example, polyethylene glycols (PEG) having an average molecular weight of from about 200 to about 20,000, for example, PEG 200, PEG 400, PEG 600, PEG 1000, PEG 1450, PEG 1500, PEG 4000, PEG 4600, and PEG 8000. In a same embodiment, a composition comprises one or more polyethylene glycols chosen from PEG 400, PEG 1000, PEG 1450, PEG 4600 and PEG 8000.

Other polyalkyleneoxides are polypropylene glycols having the formula:

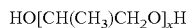

wherein the index x represents the average number of propyleneoxy units in the polymer. The index x can be represented by a whole number or a fraction. For example, a polypropylene glycol having an average molecular weight of 8,000 g/mol (PEG 8000) can be represented by the formulae:

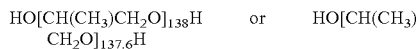

or the polypropylene glycol can be represented by the common, short hand notation: PEG 8000.

Another example of polypropylene glycols can have an average molecular weight from about 1,200 g/mol to about 20,000 g/mol, i.e., a polypropylene glycol having an average molecular weight of about 8,000 g/mol, for example, PEG 8000.

Another solubilizing agent is Polysorbate 80 (Tween™ 80), which is an oleate ester of sorbitol and its anhydrides copolymerized with approximately 20 moles of ethylene oxide for each mole of sorbitol and sorbitol anhydrides. Polysorbate 80 is made up of sorbitan mono-9-octadecanoate poly(oxy-1,2-ethandiyl) derivatives.

Solubilizing agents also include poloxamers having the formula:

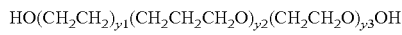

which are nonionic block copolymers composed of a polypropyleneoxy unit flanked by two polyethyleneoxy units. The indices $y^1$, $y^2$, and $y^3$ have values such that the poloxamer has an average molecular weight of from about 1000 g/mol to about 20,000 g/mol.

Excipients

A pharmaceutical composition of a compound disclosed herein can be a combination of any pharmaceutical compounds described herein with other chemical components, such as carriers, stabilizers, diluents, dispersing agents, suspending agents, thickening agents, or excipients. The pharmaceutical composition facilitates administration of the compound to an organism. Pharmaceutical compositions can be administered in therapeutically-effective amounts as pharmaceutical compositions by various forms and routes including, for example, intravenous, intravitreal, intranasal, inhalation, nasal inhalation, mouth inhalation, intratracheal, intrapulmonary, transmucosal, subcutaneous, intramuscular, oral, rectal, aerosol, parenteral, ophthalmic, pulmonary, transdermal, vaginal, otic, nasal, and topical administration.

A pharmaceutical composition can be administered in a local or systemic manner, for example, via injection of the compound directly into an organ, optionally in a depot or sustained release formulation. Pharmaceutical compositions can be provided in the form of a rapid release formulation, in the form of an extended release formulation, or in the form of an intermediate release formulation. A rapid release form can provide an immediate release. An extended release formulation can provide a controlled release or a sustained delayed release.

For oral administration, pharmaceutical compositions can be formulated readily by combining the active compounds with pharmaceutically-acceptable carriers or excipients. Such carriers can be used to formulate tablets, powders, pills, dragees, capsules, liquids, gels, syrups, elixirs, slurries, suspensions, and the like, for oral ingestion by a subject.

Pharmaceutical preparations for oral use can be obtained by mixing one or more solid excipient with one or more compounds described herein, optionally grinding the resulting mixture, and processing the mixture of granules, after adding suitable auxiliaries, if desired, to obtain tablets or dragee cores. Cores can be provided with suitable coatings. For this purpose, concentrated sugar solutions can be used, which can contain an excipient such as gum arabic, talc, polyvinylpyrrolidone, carbopol gel, polyethylene glycol, or titanium dioxide, lacquer solutions, and suitable organic solvents or solvent mixtures. Dyestuffs or pigments can be added to the tablets or dragee coatings, for example, for identification or to characterize different combinations of active compound doses.

Pharmaceutical preparations which can be used orally include push-fit capsules made of gelatin, as well as soft, sealed capsules made of gelatin and a plasticizer, such as glycerol or sorbitol. In some embodiments, the capsule comprises a hard gelatin capsule comprising one or more of pharmaceutical, bovine, and plant gelatins. A gelatin can be alkaline-processed. The push-fit capsules can contain the active ingredients in admixture with filler such as lactose, binders such as starches, or lubricants such as talc or magnesium stearate, and stabilizers. In soft capsules, the active compounds can be dissolved or suspended in suitable liquids, such as fatty oils, liquid paraffin, or liquid polyethylene glycols. Stabilizers can be added. All formulations for oral administration are provided in dosages suitable for such administration.

For buccal or sublingual administration, the compositions can be tablets, lozenges, or gels.

Parenteral injections can be formulated for bolus injection or continuous infusion. The pharmaceutical compositions can be in a form suitable for parenteral injection as a sterile suspension, solution or emulsion in oily or aqueous vehicles, and can contain formulatory agents such as suspending, stabilizing or dispersing agents. Pharmaceutical formulations for parenteral administration include aqueous solutions of the active compounds in water-soluble form. Suspensions of the active compounds can be prepared as oily injection suspensions. Suitable lipophilic solvents or vehicles include fatty oils such as sesame oil, or synthetic fatty acid esters, such as ethyl oleate or triglycerides, or liposomes. Aqueous injection suspensions can contain substances which increase the viscosity of the suspension, such as sodium carboxymethyl cellulose, sorbitol, or dextran. The suspension can also contain suitable stabilizers or agents which increase the solubility of the compounds to allow for the preparation of highly concentrated solutions. Alternatively, the active ingredient can be in powder form for constitution with a suitable vehicle, e.g., sterile pyrogen-free water, before use.

An active compound can be administered topically and can be formulated into a variety of topically administrable compositions, such as solutions, suspensions, lotions, gels, pastes, medicated sticks, balms, creams, and ointments. Such pharmaceutical compositions can contain solubilizers, stabilizers, tonicity enhancing agents, buffers and preservatives.

Formulations suitable for transdermal administration of the active compounds can employ transdermal delivery devices and transdermal delivery patches, and can be lipophilic emulsions or buffered aqueous solutions, dissolved or dispersed in a polymer or an adhesive. Such patches can be constructed for continuous, pulsatile, or on demand delivery of pharmaceutical compounds. Transdermal delivery can be accomplished by means of iontophoretic patches. Additionally, transdermal patches can provide controlled delivery.

The rate of absorption can be slowed by using rate-controlling membranes or by trapping the compound within a polymer matrix or gel. Conversely, absorption enhancers can be used to increase absorption. An absorption enhancer or carrier can include absorbable pharmaceutically-acceptable solvents to assist passage through the skin. For example, transdermal devices can be in the form of a bandage comprising a backing member, a reservoir containing compounds and carriers, a rate controlling barrier to deliver the compounds to the skin of the subject at a controlled and predetermined rate over a prolonged period of time, and adhesives to secure the device to the skin or the eye.

For administration by inhalation, the active compounds can be in a form as an aerosol, a vapor, a mist, or a powder. Inhalation can occur through by nasal delivery, oral delivery, or both. Pharmaceutical compositions are conveniently delivered in the form of an aerosol spray presentation from pressurized packs, a nebulizer, or an atomizer, with the use of a suitable propellant, for example, dichlorodifluoromethane, trichlorofluoromethane, dichlorotetrafluoroethane, difluoroethane, carbon dioxide, nitrogen, oxygen, or other suitable gas. Nebulizers are available as jet nebulizers, ultrasonic nebulizers, or vibrating mesh nebulizers. Jet nebulizers operate by compressed air. Ultrasonic nebulizers use a piezoelectric transducer to create droplets from an open liquid reservoir. Vibrating mesh nebulizers use vibrating perforated membranes (mesh) actuated by an annular piezoelectric element. The holes in the membrane have a wide cross-sectional diameter on the liquid supply side and a narrow cross-section diameter on the side from where the droplets emerge.

In the case of a pressurized aerosol, the dosage unit can be determined by providing a valve to deliver a metered amount, for example, using a metered dose inhaler (MDI). Capsules and cartridges of, for example, gelatin for use in an inhaler or insufflator can be formulated to contain a powder mix of the compounds and a suitable powder base such as lactose or starch. Powder aerosols can be administered by dry powder inhalers (DPI). Aerosols can also be administered by a facemask interface, which can be a preferred delivery route for pediatric patients less than 5 years of age. Selection of a suitable inhalation device depends on favors, such as nature of the active compound and its formulation, the delivery site of interest, and pathophysiology of the lung.

Nasal or intranasal administration involves insufflation of compounds through the nose, which includes nasal drops and nasal sprays. This route of administration can result in local and/or systemic effects. Inhaler or insufflator devices can be used for nose-to-lung delivery of compounds described herein.

The compounds can also be formulated in rectal compositions such as enemas, rectal gels, rectal foams, rectal aerosols, suppositories, jelly suppositories, or retention enemas, containing conventional suppository bases such as cocoa butter or other glycerides, as well as synthetic polymers such as polyvinylpyrrolidone and PEG. In suppository forms of the compositions, a low-melting point wax such as a mixture of fatty acid glycerides or cocoa butter, can be used.

In practicing a method of treatment or use provided herein, therapeutically-effective amounts of a compound described herein are administered in pharmaceutical compositions to a subject having a disease or condition to be treated. In some embodiments, the subject is a mammal such as a human. A therapeutically-effective amount can vary widely depending on the severity of the disease, the age and relative health of the subject, the potency of the compounds used, and other factors. The compounds can be used singly or in combination with one or more therapeutic agents as components of mixtures.

Pharmaceutical compositions can be formulated using one or more physiologically-acceptable carriers comprising excipients and auxiliaries, which facilitate processing of the active compounds into preparations that can be used pharmaceutically. Formulation can be modified depending upon the route of administration chosen. Pharmaceutical compositions comprising a compound described herein can be manufactured, for example, by mixing, dissolving, granulating, dragee-making, levigating, emulsifying, encapsulating, entrapping, or compression processes.

The pharmaceutical compositions can include at least one pharmaceutically-acceptable carrier, diluent, or excipient and compound described herein as free-base or pharmaceutically-acceptable salt form. The methods and pharmaceutical compositions described herein include the use of crystalline forms (also known as polymorphs), and active metabolites of these compounds having the same type of activity.

Methods for the preparation of compositions comprising a compound described herein include formulating a compound with one or more inert, pharmaceutically-acceptable excipients or carriers to form a solid, semi-solid, or liquid composition. Solid compositions include, for example, powders, tablets, dispersible granules, capsules, cachets, and suppositories. Liquid compositions include, for example, solutions in which a compound is dissolved, emulsions comprising a compound, or a solution containing liposomes, micelles, or nanoparticles comprising a compound as disclosed herein. Semi-solid compositions include, for example, gels, suspensions and creams. The compositions can be in liquid solutions or suspensions, solid forms suitable for solution or suspension in a liquid prior to use, or as emulsions. These compositions can also contain minor amounts of nontoxic, auxiliary substances, such as wetting or emulsifying agents, pH buffering agents, and other pharmaceutically-acceptable additives.

Non-limiting examples of dosage forms suitable for use in a method disclosed herein include feed, food, pellet, lozenge, liquid, elixir, aerosol, inhalant, spray, powder, tablet, pill, capsule, gel, geltab, nanosuspension, nanoparticle, microgel, suppository troches, aqueous or oily suspensions, ointment, patch, lotion, dentifrice, emulsion, creams, drops, dispersible powders or granules, emulsion in hard or soft gel capsules, syrups, phytoceuticals, nutraceuticals, and any combination thereof.

Non-limiting examples of pharmaceutically-acceptable excipients suitable for use in the method disclosed herein include granulating agents, binding agents, lubricating agents, disintegrating agents, sweetening agents, glidants, anti-adherents, anti-static agents, surfactants, anti-oxidants, gums, coating agents, coloring agents, flavoring agents, coating agents, plasticizers, preservatives, suspending agents, emulsifying agents, anti-microbial agents, plant cellulosic material and spheronization agents, and any combination thereof.

A composition of a compound disclosed herein can be, for example, an immediate release form or a controlled release formulation. An immediate release formulation can be formulated to allow a compound to act rapidly. Non-limiting examples of immediate release formulations include readily dissolvable formulations. A controlled release formulation can be a pharmaceutical formulation that has been adapted such that drug release rates and drug release profiles can be matched to physiological and chronotherapeutic requirements or, alternatively, has been formulated to effect release of a drug at a programmed rate. Non-limiting examples of controlled release formulations include granules, delayed release granules, hydrogels (e.g., of synthetic or natural origin), other gelling agents (e.g., gel-forming dietary fibers), matrix-based formulations (e.g., formulations comprising a polymeric material having at least one active ingredient dispersed through), granules within a matrix, polymeric mixtures, and granular masses.

The disclosed compositions can optionally comprise from about 0.001% to about 0.005% weight by volume pharmaceutically-acceptable preservatives. One non-limiting example of a suitable preservative is benzyl alcohol.

In some, a controlled release formulation is a delayed release form. A delayed release form can be formulated to delay a compound's action for an extended period of time. A delayed release form can be formulated to delay the release of an effective dose of one or more compounds, for example, for about 4, about 8, about 12, about 16, or about 24 hours.

A controlled release formulation can be a sustained release form. A sustained release form can be formulated to sustain, for example, the compound's action over an extended period of time. A sustained release form can be formulated to provide an effective dose of any compound described herein (e.g., provide a physiologically-effective blood profile) over about 4, about 8, about 12, about 16, or about 24 hours.

Non-limiting examples of pharmaceutically-acceptable excipients can be found, for example, in *Remington: The Science and Practice of Pharmacy*, Nineteenth Ed (Easton, Pa.: Mack Publishing Company, 1995); Hoover, John E., *Remington's Pharmaceutical Sciences*, Mack Publishing Co., Easton, Pennsylvania 1975; Liberman, H. A. and Lachman, L., Eds., *Pharmaceutical Dosage Forms*, Marcel Decker, New York, N.Y., 1980; and *Pharmaceutical Dosage Forms* and Drug Delivery Systems, Seventh Ed. (Lippincott Williams & Wilkins 1999), each of which is incorporated by reference in its entirety.

A method disclosed herein includes, for example, administration of a Tie-2 activator, or a pharmaceutically-acceptable salt thereof, in combination with a pharmaceutically-acceptable carrier. The carrier can be selected to minimize any degradation of the active ingredient and to minimize any adverse side effects in the subject.

The Tie-2 activator or a pharmaceutically-acceptable salt thereof disclosed herein can be conveniently formulated into pharmaceutical compositions composed of one or more pharmaceutically-acceptable carriers. See e.g., *Remington's Pharmaceutical Sciences*, latest edition, by E. W. Martin Mack Pub. Co., Easton, PA, which discloses typical carriers and conventional methods of preparing pharmaceutical compositions that can be used in conjunction with the preparation of formulations of the compound described herein and which is incorporated by reference herein. Such pharmaceuticals can be standard carriers for administration of compositions to humans and non-humans, including solutions such as sterile water, saline, and buffered solutions at physiological pH. Other compositions can be administered according to standard procedures. For example, pharmaceutical compositions can also include one or more additional active ingredients such as antimicrobial agents, anti-inflammatory agents, and anesthetics.

Non-limiting examples of pharmaceutically-acceptable carriers include saline solution, Ringer's solution and dextrose solution. The pH of the solution can be from about 5 to about 8, and can be from about 7 to about 7.5. Further carriers include sustained release preparations such as semi-permeable matrices of solid hydrophobic polymers containing the Tie-2 activator or a pharmaceutically-acceptable salt thereof, where the matrices are in the form of shaped articles, such as films, liposomes, microparticles, and microcapsules.

A method disclosed herein relates to administering the Tie-2 activator or a pharmaceutically-acceptable salt thereof as part of a pharmaceutical composition. In various embodiments, compositions of a compound disclosed herein can comprise a liquid comprising an active agent in solution, in suspension, or both. Liquid compositions can include gels. In one embodiment, the liquid composition is aqueous. Alternatively, the composition can take form of an ointment. In another embodiment, the composition is an in situ gellable aqueous composition. In some embodiments, the composition is an in situ gellable aqueous solution.

Pharmaceutical formulations can include additional carriers, as well as thickeners, diluents, buffers, preservatives, and surface active agents in addition to a compound disclosed herein. Pharmaceutical formulations can also include one or more additional active ingredients such as antimicrobial agents, anti-inflammatory agents, anesthetics, and the like.

An excipient can fill a role as simple and direct as being an inert filler, or an excipient as used herein can be part of a pH stabilizing system or coating to insure delivery of the ingredients safely to the stomach.

The Tie-2 activator or a pharmaceutically-acceptable salt thereof can also be present in liquids, emulsions, or suspensions for delivery of active therapeutic agents in aerosol form to cavities of the body such as the nose, throat, or bronchial passages. The ratio of Tie-2 activator or a pharmaceutically-acceptable salt thereof to the other compounding agents in these preparations can vary as the dosage form requires.

Depending on the intended mode of administration, the pharmaceutical compositions administered as part of a method disclosed herein can be in the form of solid, semi-solid or liquid dosage forms, such as, for example, tablets, suppositories, pills, capsules, powders, liquids, suspensions, lotions, creams, gels, for example, in unit dosage form suitable for single administration of a precise dosage. The compositions can contain, as noted above, an effective amount of the Tie-2 activator or a pharmaceutically-acceptable salt thereof in combination with a pharmaceutically-acceptable carrier and, in addition, can include other medicinal agents, pharmaceutical agents, carriers, adjuvants, diluents, etc.

For solid compositions, nontoxic solid carriers include, for example, pharmaceutical grades of mannitol, lactose, starch, magnesium stearate, sodium saccharin, talc, cellulose, glucose, sucrose, and magnesium carbonate. In one embodiment, a composition comprising the Tie-2 activator or a pharmaceutically-acceptable salt thereof in an amount of approximately 4 mg per 0.1 mL liquid is prepared. The liquid phase comprises sterile water and an appropriate amount of a saccharide or polysaccharide.

Pharmaceutical Compositions

Pharmaceutical compositions containing a compound described herein can be administered for prophylactic or therapeutic treatments. Compositions can contain any number of active agents. In therapeutic applications, the compositions can be administered to a subject already suffering from a disease or condition, in an amount sufficient to cure or at least partially arrest the symptoms of the disease or condition, or to cure, heal, improve, reduce, lessen or ameliorate the disease or condition. A compound can also be administered to lessen or reduce a likelihood of developing, contracting, or worsening a condition. Amounts effective for this use can vary based on the severity and course of the disease or condition, previous therapy, the subject's health status, weight, response to the drugs, and the judgment of the treating physician.

Multiple therapeutic agents can be administered in any order or simultaneously. If simultaneously, the multiple therapeutic agents can be provided in a single, unified form, or in multiple forms, for example, as multiple separate pills or injections. The compounds can be packed together or separately, in a single package or in a plurality of packages. One or all of the therapeutic agents can be given in multiple doses. If not simultaneous, the timing between the multiple doses can vary.

Compounds and compositions of the present disclosure can be packaged as a kit. In some embodiments, the present disclosure provides a kit comprising a compound disclosed herein, or a pharmaceutically-acceptable salt thereof, and written instructions on use of the kit in the treatment of a condition described herein. In some embodiments, the present disclosure provides a kit comprising a compound disclosed herein, or a pharmaceutically-acceptable salt thereof, an antibody, and written instructions on use of the kit in the treatment of a condition described herein.

Administration and Dosage

A compound disclosed herein can be administered via subcutaneous or intravenous injection. The volume of an injection can be about 0.1 mL, about 0.2 mL, about 0.3 mL, about 0.4 mL, about 0.5 mL, about 0.6 mL, about 0.7 mL, about 0.8 mL, about 0.9 mL, about 1 mL, about 1.1 mL, about 1.2 mL, about 1.3 mL, about 1.4 mL, about 1.5 mL, about 1.6 mL, about 1.7 mL, about 1.8 mL, about 1.9 mL, about 2 mL, about 2.1 mL, about 2.2 mL, about 2.3 mL, about 2.4 mL, about 2.5 mL, about 2.6 mL, about 2.7 mL, about 2.8 mL, about 2.9 mL, or about 3 mL. The individual dose administered to a subject can be about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 16 mg, about 17 mg, about 18 mg, about 20 mg, about 21 mg, about 22 mg, about 23 mg, about 24 mg, about 25 mg, about 26 mg, about 27 mg, about 28 mg, about 29 mg, about 30 mg, about 31 mg, about 32 mg, about 33 mg, about 34 mg, about 35 mg, about 36 mg, about 37 mg, about 38 mg, about 39 mg, about 40 mg, about 41 mg, about 42 mg, about 43 mg, about 44 mg, about 45 mg, about 46 mg, about 47 mg, about 48 mg, about 49 mg, or about 50 mg.

Pharmaceutical compositions described herein can be in unit dosage forms suitable for single administration of precise dosages. In unit dosage form, the formulation is divided into unit doses containing appropriate quantities of one or more compounds. The unit dosage can be in the form of a package containing discrete quantities of the formulation. Non-limiting examples are packaged injectables, vials, or ampoules. Aqueous suspension compositions can be packaged in single-dose non-reclosable containers. Multiple-dose reclosable containers can be used, for example, in combination with or without a preservative. Formulations for parenteral injection can be presented in unit dosage form, for example, in ampoules, or in multi-dose containers with a preservative.

A Tie-2 activator described herein can be present in a composition in a range of from about 1 mg to about 5 mg, from about 5 mg to about 10 mg, from about 10 mg to about 15 mg, from about 15 mg to about 20 mg, from about 20 mg to about 25 mg, from about 25 mg to about 30 mg, from about 30 mg to about 35 mg, from about 35 mg to about 40 mg, from about 40 mg to about 45 mg, from about 45 mg to about 50 mg, from about 50 mg to about 55 mg, from about 55 mg to about 60 mg, from about 60 mg to about 65 mg, from about 65 mg to about 70 mg, from about 70 mg to about 75 mg, from about 75 mg to about 80 mg, from about 80 mg to about 85 mg, from about 85 mg to about 90 mg, from about 90 mg to about 95 mg, from about 95 mg to about 100 mg, from about 100 mg to about 125 mg, from about 125 mg to about 150 mg, from about 150 mg to about 175 mg, from about 175 mg to about 200 mg, from about 200 mg to about 225 mg, from about 225 mg to about 250 mg, or from about 250 mg to about 300 mg.

A Tie-2 activator described herein can be present in a composition in an amount of about 5 mg, about 10 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 125 mg, about 150 mg, about 175 mg, about 200 mg, about 225 mg, about 250 mg, or about 300 mg.

A Tie-2 activator described herein can be present in a composition in an amount of about 0.5 µg, about 1 µg, about 2 µg, about 3 µg, about 4 µg, about 5 µg, about 6 µg, about 7 µg, about 8 µg, about 9 µg, about 10 µg, about 20 µg, about 30 µg, about 40 µg, about 50 µg, about 60 µg, about 70 µg, about 80 µg, about 90 µg, about 100 µg, about 150 µg, about 200 µg, about 250 µg, about 300 µg, about 350 µg, about 400 µg, about 450 µg, about 500 µg, about 550 µg, about 600 µg, about 650 µg, about 700 µg, about 750 µg, about 800 µg, about 850 µg, about 900 µg, about 950 µg, about 1 mg, about 1.1 mg, about 1.2 mg, 1.3 mg, about 1.4 mg, about 1.5 mg, about 1.6 mg, about 1.7 mg, about 1.8 mg, about 1.9 mg, or about 2 mg.

A Tie-2 activator described herein can be administered to a subject in an amount of about 0.1 mg/kg to about 500 mg/kg, about 1 mg/kg to about 500 mg/kg, about 0.1 mg/kg to about 300 mg/kg, about 1 mg/kg to about 300 mg/kg, or about 0.1 mg/kg to about 30 mg/kg. In some embodiments, the Tie-2 activator is administered to a subject in an amount of about 1 mg/kg, about 2 mg/kg, about 3 mg/kg, about 4 mg/kg, about 5 mg/kg, about 6 mg/kg, about 7 mg/kg, about 8 mg/kg, about 9 mg/kg, about 10 mg/kg, about 11 mg/kg, about 12 mg/kg, about 13 mg/kg, about 14 mg/kg, about 15 mg/kg, about 16 mg/kg, about 17 mg/kg, about 18 mg/kg, about 19 mg/kg, about 20 mg/kg, about 25 mg/kg, about 30 mg/kg, about 35 mg/kg, about 40 mg/kg, about 45 mg/kg, about 50 mg/kg, about 55 mg/kg, about 60 mg/kg, about 65 mg/kg, about 70 mg/kg, about 75 mg/kg, about 80 mg/kg, about 85 mg/kg, about 90 mg/kg, about 95 mg/kg, about 100 mg/kg, about 120 mg/kg, about 150 mg/kg, about 160 mg/kg, about 180 mg/kg, about 200 mg/kg, about 240 mg/kg, about 250 mg/kg, about 300 mg/kg, about 350 mg/kg, about 360 mg/kg, about 400 mg/kg, about 450 mg/kg, about 500 mg/kg, or about 600 mg/kg of the subject.

A compound described herein can be administered before, during, or after the occurrence of a disease or condition, and the timing of administering the composition containing a compound can vary. For example, a compound can be used as a prophylactic and can be administered continuously to subjects with a propensity to conditions or diseases in order to lessen or reduce a likelihood of the occurrence of the disease or condition. A compound and composition can be administered to a subject during or as soon as possible after the onset of the symptoms. The administration of a compound can be initiated within the first 48 hours of the onset of the symptoms, within the first 24 hours of the onset of the symptoms, within the first 6 hours of the onset of the symptoms, or within 3 hours of the onset of the symptoms. The initial administration can be via any route practical, such as by any route described herein using any formulation described herein.

A compound can be administered as soon as is practical after the onset of a disease or condition is detected or suspected, and for a length of time necessary for the treatment of the disease, such as, for example, from about 1 month to about 3 months. In some embodiments, the length of time a compound can be administered can be about 1 day, about 2 days, about 3 days, about 4 days, about 5 days, about 6 days, about 1 week, about 2 weeks, about 3 weeks, about 4 weeks, about 1 month, about 5 weeks, about 6 weeks, about 7 weeks, about 8 weeks, about 2 months, about 9 weeks, about 10 weeks, about 11 weeks, about 12 weeks, about 3 months, about 13 weeks, about 14 weeks, about 15 weeks, about 16 weeks, about 4 months, about 17 weeks, about 18 weeks, about 19 weeks, about 20 weeks, about 5 months, about 21 weeks, about 22 weeks, about 23 weeks, about 24 weeks, about 6 months, about 7 months, about 8 months, about 9 months, about 10 months, about 11 months, about 1 year, about 13 months, about 14 months, about 15 months, about 16 months, about 17 months, about 18 months, about 19 months, about 20 months, about 21 months, about 22 months about 23 months, about 2 years, about 2.5 years, about 3 years, about 3.5 years, about 4 years, about 4.5 years, about 5 years, about 6 years, about 7 years, about 8 years, about 9 years, about 10 years, about 11 years, about 12 years, about 13 years, about 14 years, about 15 years, about 16 years, about 17 years, about 18 years, about 19 years, about 20 years, about 21 years, about 22 years, about 23 years, about 24 years, or about 25 years. The length of treatment can vary for each subject.

A dosing schedule for administration of a compound described herein include, but are not limited to, once daily (QD), twice daily (BID), three times daily (TID), four times daily (QID), once weekly, twice weekly, three times weekly, once monthly, twice monthly, and once every other month.

Treatment of Subjects with a Tie-2 Activator

Disclosed herein is a method for treating a subject afflicted with, for example, ARDS, lung injury, respiratory failure, and pulmonary inflammation with an activator of Tie-2. The subject can be a human. Treatment can include treating a human in a clinical trial. A treatment can comprise administering to a subject a pharmaceutical composition comprising one or more of the activators of Tie-2 described throughout the disclosure. A treatment can comprise administrating to a subject a therapy that promotes the phosphorylation of a Tie-2 molecule.

In some embodiments, the method disclosed herein provides a Tie-2 activator for use in treatment of indications disclosed herein. In some embodiments, the method disclosed herein provides a Tie-2 activator for use in the manufacture of a medicament for the treatment of indications disclosed herein. In some embodiments, the method disclosed herein provides a Tie-2 activator for use singly or in combination with one or more therapeutic agents as components of mixtures. For example, a Tie-2 activator of the disclosure can be co-formulated or co-administered with an antibody, for example, an anti-VEGF agent. An anti-VEGF agent can be a compound, an antibody, or an antibody fragment, variant, or derivative thereof. Non-limiting examples of anti-VEGF agents include bevacizumab (Avastin®), ranibizumab (Lucentis®), and aflibercept (Eylea®). In some embodiments, a Tie-2 activator of the disclosure can be co-formulated, or co-administered, with a non-inflammatory agent, for example, a VEGF modulating agent. Non-limiting examples of a VEGF-modulating agent include, for example, dexamethasone, fluocinolone, and triamcinolone. In some embodiments, a compound described herein can be used before, during, or after treatment with an anti-VEGF, or VEGF modulating, agent.

Non-limiting examples of possible subjects for administration include the following. Subjects can be humans, non-human primates such as chimpanzees, and other apes and monkey species; farm animals such as cattle, horses, sheep, goats, and swine; domestic animals such as rabbits, dogs, and cats; and laboratory animals including rats, mice, and guinea pigs. A subject can be of any age. Subjects can be, for example, elderly adults, adults, adolescents, pre-adolescents, children, toddlers, infants, and neonates.

Combination Therapies

A Tie-2 activator described herein can be co-formulated or co-administered with one or more additional therapies or therapeutic agents for the treatment of lung injury, ARDS, or COVID-19. For example, a combination therapy can include a Tie-2 activator that stabilizes the endothelium, in combination with an agent that inhibits viral replication, for example, an anti-inflammatory agent, an anti-cytokine agent, an angiotensin-converting enzyme (ACE) inhibitor, or a statin.

The combination can be administered consecutively, simultaneously, in a single dosage form, or in separate dosage forms. Non-limiting examples of additional therapies include oxygen supplementation (e.g., mechanical ventilation), extracorporeal membrane oxygenation (ECMO). Non-limiting examples of additional therapeutic agents include an Ang-1 activator, an Ang-1 agonist, an Ang-1 peptide agonist, an Ang-1 mimetic, an Ang-1 antibody, an Ang-1 antibody agonist, an Ang-2 inhibitor, an Ang-2 antagonist, an Ang-2 mimetic, an Ang-2 antibody, an Ang-2 peptide antagonist, an Ang-2 antibody antagonist, an anti-inflammatory agent, an anti-cytokine agent, an immune modulator, an interleukin antagonist, an ACE inhibitor, a statin, a steroid, a corticosteroid, a IL-6 inhibitor, a IL-2 inhibitor, a JAK inhibitor, an antibiotic, an anti-viral, an anti-parasitic, a diuretic, a bronchodilator, a prostaglandin agonist, a prostaglandin analogue, epoprostenol, alprostadil, a vasodilator, and a vasoconstrictor. In some embodiments, the additional therapeutic agent is remdesivir, hydroxychloroquine, chloroquine, azithromycin, tocilizumab, acalabrutinib, tofacitinib, ruxolitinib, baricitinib, anakinra, mavrilimumab, sarilumab, lopinavir, ritonavir, iopinavir, interferon-β, oseltamivir, favipiravir, umifenovir, galidesivir, colchicine, ivermectin, or ascorbic acid.

In some embodiments, an additional therapeutic agent is convalescent plasma, hyperimmune globulin, human immunoglobin for COVID-19 (COVID19-HIG), or SARS-COV-2 specific monoclonal antibodies. Convalescent plasma is plasma obtained from patients recovered from COVID-19. Antibody-containing plasma from a recovered patient can be administered by intravenous transfusion to a patient who is suffering from COVID-19. Donor antibodies can help reduce the severity of the disease, for example, by recognition of viral particles.

In some embodiments, a Tie-2 activator described herein can be administered in combination with remdesivir. Remdesivir is an RNA polymerase inhibitor that that inhibits viral RNA synthesis. Remdesivir has been used for the treatment of Ebola virus disease. Remdesivir exhibits activity in cell culture and animal models against SARS-COV, MERS-COV, and SARS-CoV-2. Remdesivir can reduce time to recovery in subjects with COVID-19 by decreasing the amount of the coronavirus in the body.

Remdesivir can be an effective treatment for COVID-19, for example, as emergency use or investigational use. Remdesivir can be used to treat adults and children with suspected or laboratory confirmed COVID-19 and severe disease defined as SpO2≤94% on room air, requiring supplemental oxygen, mechanical ventilation, or ECMO. Remdesivir can be administered in an in-patient hospital setting via intravenous infusion by a healthcare provider. Remdesivir can be administered through a vein (intravenous or IV) one time each day for up to 10 days.

Non-limiting side effects of remdesivir treatment include:
Infusion-related reactions. Infusion-related reactions have been seen during a remdesivir infusion or around the time remdesivir was given. Signs and symptoms of infusion-related reactions may include: low blood pressure, nausea, vomiting, sweating, and shivering.
Increases in levels of liver enzymes. Increases in levels of liver enzymes have been seen in people who have received remdesivir, which may be a sign of inflammation or damage to cells in the liver. Blood tests can be performed by a healthcare provider to check liver enzyme levels before receiving remdesivir and daily while receiving remdesivir.
Brief pain, bleeding, bruising of the skin, soreness, swelling, and possible infection at the injection site.

Remdesivir for injection, 100 mg, is a sterile, preservative-free lyophilized solid that is to be reconstituted with 19 mL of sterile water for injection and diluted into 0.9% saline prior to intravenous administration. Following reconstitution, a single-dose, clear glass vial contains a 5 mg/mL remdesivir concentrated solution with sufficient volume to allow withdrawal of 20 mL. Remdesivir Injection, 5 mg/mL, is a sterile, preservative-free, clear, solution that is diluted into 0.9% saline prior to intravenous administration.

Remdesivir for injection, 100 mg, vials should be stored below 30° C. until time of use. Remdesivir injection, 5 mg/ml vials should be stored at refrigerated temperatures (2° C. to 8° C.) until time of use. Following dilution with 0.9% saline, the solution can be stored for up to 4 hours at room temperature (20° C. to 25° C.) or 24 hours at refrigerated temperatures (2° C. to 8° C.).

In some embodiments, the Tie-2 activator is an Ang-1 activator, Ang-1 mimetic, an Ang-1 antibody, or an Ang-1 polypeptide. In some embodiments, a Tie-2 activator is MAN-01.

Pharmacodynamic and Pharmacokinetic Parameters

Pharmacokinetic and pharmacodynamic data can be obtained by various experimental techniques. Appropriate pharmacokinetic and pharmacodynamic profile components describing a particular composition can vary due to variations in the metabolism of an activator of Tie-2 in different subjects. Pharmacokinetic and pharmacodynamic profiles can be based on the determination of the mean parameters of a group of subjects. The group of subjects includes any reasonable number of subjects suitable for determining a representative mean, for example, 5 subjects, 10 subjects, 15 subjects, 20 subjects, 25 subjects, 30 subjects, 35 subjects, or more. The mean is determined by calculating the average of all subject's measurements for each parameter measured.

A therapy can be used to inhibit a specific biological or biochemical function at a lower dosage. A dose can be modulated to achieve a desired pharmacokinetic or pharmacodynamics profile, such as a desired or effective blood profile, as described herein. The half maximum inhibitory concentration ($IC_{50}$) is a measure of the effectiveness of a substance in inhibiting a specific biological or biochemical function. This quantitative measure indicates how much of a particular drug or compound is needed to inhibit a given biological process, such as the activity of HPTPβ by half. Combination drug treatments can present lower $IC_{50}$ values as compared to monotherapies.

The outcome of treating a human subject with a therapy can be measured by calculating pharmacodynamic and pharmacokinetic parameters. Non-limiting examples of pharmacodynamic and pharmacokinetic parameters that can be used to determine the effect of treatment of a subject with a therapy of the disclosure include: a) the amount of drug administered, which can be represented as a dose D; b) the dosing interval, which can be represented as τ; c) the apparent volume in which a drug is distributed, which can be represented as a volume of distribution $V_d$, where $V_d = D/C_0$; d) the amount of drug in a given volume of tissue, which can be represented as concentration $C_0$ or $C_{ss}$, where $C_0$ or $C_{ss} = D/V_d$; e) the half-life of a drug $t_{1/2}$, where $t_{1/2} = \ln(2)/k_e$; f) the rate at which a drug is removed from the body $k_e$, where $k_e \ln(2) t_{1/2} = CL/V_d$; g) the rate of infusion required to balance the equation $K_{in}$, where $K_{in} = C_{ss} \cdot CL$; h) the integral of the concentration-time curve after administration of a single dose, which can be represented as $AUC_{0-\infty}$, wherein $\int_0^\infty C \, dt$, or in steady-state, which can be represented as $AUC\tau$, ss, wherein $\int_t^{t+\tau} C \, dt$; i) the volume of tissue cleared of the drug per unit time, which can be represented as CL (clearance), wherein $CL = V_d \cdot k_e = D/AUC$; j) the systemically available fraction of a drug, which can be represented as f, where $$f = \frac{AUCpo.Div}{AUCiv.Dpo};$$

k) the peak tissue concentration of a drug after administration $C_{max}$; l) the time taken by a drug to reach $C_{max}$, $T_{max}$; m) the lowest concentration that a drug reaches before the next dose is administered $C_{min}$; and n) the peak trough fluctuation within one dosing interval at steady state, which can be represented as $$\% \, PTF = 100 * \frac{(C_{max,ss} - C_{min,ss})}{C_{av,ss}} \text{ where } C_{av,ss} = \frac{AUC_{\tau,ss}}{\tau}.$$

The pharmacokinetics parameters can be any parameters suitable for describing the tissue concentration profiles of a therapy of the disclosure. For example, the pharmacokinetics profile can be obtained at a time after dosing of, for example, about zero minutes, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, about 20 minutes, about 21 minutes, about 22 minutes, about 23 minutes, about 24 minutes, about 25 minutes, about 26 minutes, about 27 minutes, about 28 minutes, about 29 minutes, about 30 minutes, about 31 minutes, about 32 minutes, about 33 minutes, about 34 minutes, about 35 minutes, about 36 minutes, about 37 minutes, about 38 minutes, about 39 minutes, about 40 minutes, about 41 minutes, about 42 minutes, about 43 minutes, about 44 minutes, about 45 minutes, about 46 minutes, about 47 minutes, about 48 minutes, about 49 minutes, about 50 minutes, about 51 minutes, about 52 minutes, about 53 minutes, about 54 minutes, about 55 minutes, about 56 minutes, about 57 minutes, about 58 minutes, about 59 minutes, about 60 minutes, about zero hours, about 0.5 hours, about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, about 15 hours, about 15.5 hours, about 16 hours, about 16.5 hours, about 17 hours, about 17.5 hours, about 18 hours, about 18.5 hours, about 19 hours, about 19.5 hours, about 20 hours, about 20.5 hours, about 21 hours, about 21.5 hours, about 22 hours, about 22.5 hours, about 23 hours, about 23.5 hours, or about 24 hours.

The pharmacokinetic parameters can be any parameters suitable for describing a small molecule activator of Tie-2. The $C_{max}$ can be, for example, not less than about 1 ng/ml; not less than about 2 ng/mL; not less than about 3 ng/ml; not less than about 4 ng/ml; not less than about 5 ng/ml; not less than about 6 ng/ml; not less than about 7 ng/ml; not less than about 8 ng/ml; not less than about 9 ng/ml; not less than about 10 ng/ml; not less than about 15 ng/ml; not less than about 20 ng/ml; not less than about 25 ng/ml; not less than about 50 ng/ml; not less than about 75 ng/ml; not less than about 100 ng/ml; not less than about 200 ng/mL; not less than about 300 ng/ml; not less than about 400 ng/ml; not less than about 500 ng/ml; not less than about 600 ng/ml; not less than about 700 ng/ml; not less than about 800 ng/ml; not less than about 900 ng/ml; not less than about 1000 ng/ml; not less than about 1250 ng/mL; not less than about 1500 ng/mL; not less than about 1750 ng/ml; not less than about 2000 ng/ml; or any other $C_{max}$ appropriate for describing a pharmacokinetic profile of an activator of Tie-2 described herein. The $C_{max}$ can be, for example, about 1 ng/mL to about 5,000 ng/ml; about 1 ng/mL to about 4,500 ng/ml; about 1 ng/mL to about 4,000 ng/ml; about 1 ng/mL to about 3,500 ng/ml; about 1 ng/ml to about 3,000 ng/ml; about 1 ng/mL to about 2,500 ng/ml; about 1 ng/ml to about 2,000 ng/ml; about 1 ng/mL to about 1,500 ng/ml; about 1 ng/mL to about 1,000 ng/ml; about 1 ng/ml to about 900 ng/ml; about 1 ng/ml to about 800 ng/ml; about 1 ng/ml to about 700 ng/ml; about 1 ng/ml to about 600 ng/ml; about 1 ng/mL to about 500 ng/ml; about 1 ng/ml to about 450 ng/ml; about 1 ng/mL to about 400 ng/ml; about 1 ng/mL to about 350 ng/ml; about 1 ng/ml to about 300 ng/ml; about 1 ng/mL to about 250 ng/ml; about 1 ng/mL to about 200 ng/ml; about 1 ng/ml to about 150 ng/ml; about 1 ng/mL to about 125 ng/ml; about 1 ng/ml to about 100 ng/ml; about 1 ng/mL to about 90 ng/ml; about 1 ng/mL to about 80 ng/ml; about 1 ng/ml to about 70 ng/ml; about 1 ng/mL to about 60 ng/ml; about 1 ng/mL to about 50 ng/ml; about 1 ng/ml to about 40 ng/mL; about 1 ng/mL to about 30 ng/mL; about 1 ng/mL to about 20 ng/ml; about 1 ng/mL to about 10 ng/ml; about 1 ng/mL to about 5 ng/ml; about 10 ng/ml to about 4,000 ng/mL; about 10 ng/mL to about 3,000 ng/mL; about 10 ng/mL to about 2,000 ng/ml; about 10 ng/ml to about 1,500 ng/ml; about 10 ng/mL to about 1,000 ng/ml; about 10 ng/mL to about 900 ng/ml; about 10 ng/mL to about 800 ng/ml; about 10 ng/mL to about 700 ng/ml; about 10 ng/mL to about 600 ng/ml; about 10 ng/mL to about 500 ng/ml; about 10 ng/ml to about 400 ng/ml; about 10 ng/ml to about 300 ng/ml; about 10 ng/ml to about 200 ng/ml; about 10 ng/mL to about 100 ng/ml; about 10 ng/mL to about 50 ng/mL; about 25 ng/ml to about 500 ng/ml; about 25 ng/mL to about 100 ng/ml; about 50 ng/ml to about 500 ng/ml; about 50 ng/ml to about 100 ng/ml; about 100 ng/mL to about 500 ng/mL; about 100 ng/ml to about 400 ng/ml; about 100 ng/ml to about 300 ng/ml; or about 100 ng/ml to about 200 ng/mL.

The $T_{max}$ of an activator of Tie-2 described herein can be, for example, not greater than about 0.1 hours, about 0.2 hours, about 0.3 hours, about 0.4 hours, about 0.5 hours, not greater than about 1 hours, not greater than about 1.5 hours, not greater than about 2 hours, not greater than about 2.5 hours, not greater than about 3 hours, not greater than about 3.5 hours, not greater than about 4 hours, not greater than about 4.5 hours, not greater than about 5 hours, or any other $T_{max}$ appropriate for describing a pharmacokinetic profile of an activator of Tie-2 described herein. The $T_{max}$ can be, for example, about 0.1 hours to about 24 hours; about 0.1 hours to about 0.5 hours; about 0.5 hours to about 1 hour; about 1 hour to about 1.5 hours; about 1.5 hours to about 2 hour; about 2 hours to about 2.5 hours; about 2.5 hours to about 3 hours; about 3 hours to about 3.5 hours; about 3.5 hours to about 4 hours; about 4 hours to about 4.5 hours; about 4.5 hours to about 5 hours; about 5 hours to about 5.5 hours; about 5.5 hours to about 6 hours; about 6 hours to about 6.5 hours; about 6.5 hours to about 7 hours; about 7 hours to about 7.5 hours; about 7.5 hours to about 8 hours; about 8 hours to about 8.5 hours; about 8.5 hours to about 9 hours; about 9 hours to about 9.5 hours; about 9.5 hours to about 10 hours; about 10 hours to about 10.5 hours; about 10.5 hours to about 11 hours; about 11 hours to about 11.5 hours; about 11.5 hours to about 12 hours; about 12 hours to about 12.5 hours; about 12.5 hours to about 13 hours; about 13 hours to about 13.5 hours; about 13.5 hours to about 14 hours; about 14 hours to about 14.5 hours; about 14.5 hours to about 15 hours; about 15 hours to about 15.5 hours; about 15.5 hours to about 16 hours; about 16 hours to about 16.5 hours; about 16.5 hours to about 17 hours; about 17 hours to about 17.5 hours; about 17.5 hours to about 18 hours; about 18 hours to about 18.5 hours; about 18.5 hours to about 19 hours; about 19 hours to about 19.5 hours; about 19.5 hours to about 20 hours; about 20 hours to about 20.5 hours; about 20.5 hours to about 21 hours; about 21 hours to about 21.5 hours; about 21.5 hours to about 22 hours; about 22 hours to about 22.5 hours; about 22.5 hours to about 23 hours; about 23 hours to about 23.5 hours; or about 23.5 hours to about 24 hours.

The $AUC_{(0-inf)}$ or $AUC_{(last)}$ of an activator of Tie-2 described herein can be, for example, not less than about 1 ng·hr/mL, not less than about 5 ng·hr/mL, not less than about 10 ng·hr/mL, not less than about 20 ng·hr/mL, not less than about 30 ng·hr/mL, not less than about 40 ng·hr/mL, not less than about 50 ng·hr/mL, not less than about 100 ng·hr/mL, not less than about 150 ng·hr/mL, not less than about 200 ng·hr/mL, not less than about 250 ng·hr/mL, not less than about 300 ng·hr/mL, not less than about 350 ng·hr/mL, not less than about 400 ng·hr/mL, not less than about 450 ng·hr/mL, not less than about 500 ng·hr/mL, not less than about 600 ng·hr/mL, not less than about 700 ng·hr/mL, not less than about 800 ng·hr/mL, not less than about 900 ng·hr/mL, not less than about 1000 ng·hr/mL, not less than about 1250 ng·hr/mL, not less than about 1500 ng·hr/mL, not less than about 1750 ng·hr/mL, not less than about 2000 ng·hr/mL, not less than about 2500 ng·hr/mL, not less than about 3000 ng·hr/mL, not less than about 3500 ng·hr/mL, not less than about 4000 ng·hr/mL, not less than about 5000 ng·hr/mL, not less than about 6000 ng·hr/mL, not less than about 7000 ng·hr/mL, not less than about 8000 ng·hr/mL, not less than about 9000 ng·hr/mL, not less than about 10,000 ng·hr/mL, or any other AUC (0-inf) appropriate for describing a pharmacokinetic profile of a compound described herein. The AUC (0-inf) of an activator of Tie-2 can be, for example, about 1 ng·hr/mL to about 10,000 ng·hr/mL; about 1 ng·hr/mL to about 10 ng·hr/mL; about 10 ng·hr/mL to about 25 ng·hr/mL; about 25 ng·hr/mL to about 50 ng·hr/mL; about 50 ng·hr/mL to about 100 ng·hr/mL; about 100 ng·hr/mL to about 200 ng·hr/mL; about 200 ng·hr/mL to about 300 ng·hr/mL; about 300 ng·hr/mL to about 400 ng·hr/mL; about 400 ng·hr/mL to about 500 ng·hr/mL; about 500 ng·hr/mL to about 600 ng·hr/mL; about 600 ng·hr/mL to about 700 ng·hr/mL; about 700 ng·hr/mL to about 800 ng·hr/mL; about 800 ng·hr/mL to about 900 ng·hr/mL; about 900 ng·hr/mL to about 1,000 ng·hr/mL; about 1,000 ng·hr/mL to about 1,250 ng·hr/mL; about 1,250 ng·hr/mL to about 1,500 ng·hr/mL; about 1,500 ng·hr/mL to about 1,750 ng·hr/mL; about 1,750 ng·hr/mL to about 2,000 ng·hr/mL; about 2,000 ng·hr/mL to about 2,500 ng·hr/mL; about 2,500 ng·hr/mL to about 3,000 ng·hr/mL; about 3,000 ng·hr/mL to about 3,500 ng·hr/mL; about 3,500 ng·hr/mL to about 4,000 ng·hr/mL; about 4,000 ng·hr/mL to about 4,500 ng·hr/mL; about 4,500 ng·hr/mL to about 5,000 ng·hr/mL; about 5,000 ng·hr/mL to about 5,500 ng·hr/mL; about 5,500 ng·hr/mL to about 6,000 ng·hr/mL; about 6,000 ng·hr/mL to about 6,500 ng·hr/mL; about 6,500 ng·hr/mL to about 7,000 ng·hr/mL; about 7,000 ng·hr/mL to about 7,500 ng·hr/mL; about 7,500 ng·hr/mL to about 8,000 ng·hr/mL; about 8,000 ng·hr/mL to about 8,500 ng·hr/mL; about 8,500 ng·hr/mL to about 9,000 ng·hr/mL; about 9,000 ng·hr/mL to about 9,500 ng·hr/mL; or about 9,500 ng·hr/mL to about 10,000 ng·hr/mL.

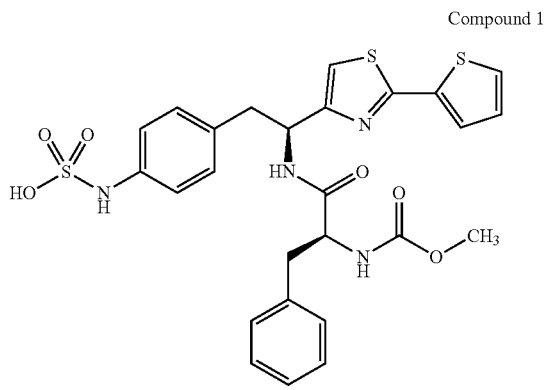 [SMILES: COC(=O)N[C@@H](Cc1ccccc1)C(=O)N[C@@H](Cc1ccc(NS(=O)(=O)O)cc1)c1csc(-c2cccs2)n1]

Compound 1

EXAMPLES

Example 1. Compounds with Inhibitory Activity to HPTPβ

Non-limiting examples of the HPTPβ $IC_{50}$ (μM) activity for illustrative compounds are listed in TABLE 3.

TABLE 3

| No. | Compound | HPTPβ $IC_{50}$ μM |
|---|---|---|
| AA1 | (S)-{4-[2-(4-Ethylthiazol-2-yl)-2-(phenylacetylamino)ethyl]-phenyl}sulfamic acid | 0.000157 |
| AA2 | 4-{(S)-2-[(R)-2-(tert-butoxycarbonylamino)-3-phenylpropanamido]-2-(4-ethylthiazol-2-yl)ethyl}phenylsulfamic acid | 0.004 |

TABLE 3-continued

| No. | Compound | HPTPβ IC$_{50}$ μM |
|---|---|---|
| AA3 | 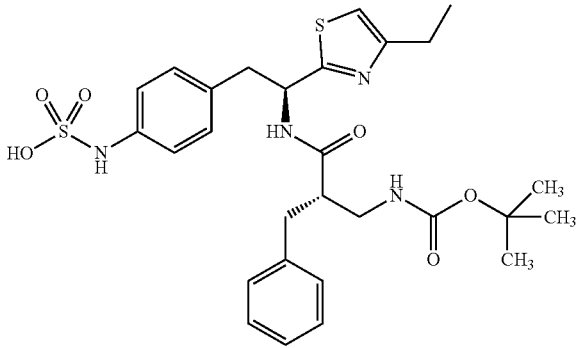 [SMILES: CCc1csc([C@H](Cc2ccc(NS(=O)(=O)O)cc2)NC(=O)[C@H](CNC(=O)OC(C)(C)C)Cc2ccccc2)n1]  {1-[1-(5-Ethylthiazol-2-yl)-(S)-2-(4-sulfoaminophenyl)ethyl-carbamoyl]-(S)-2-phenylethyl}methylcarbamic acid tert-butyl ester | 0.031 |
| AA4 | 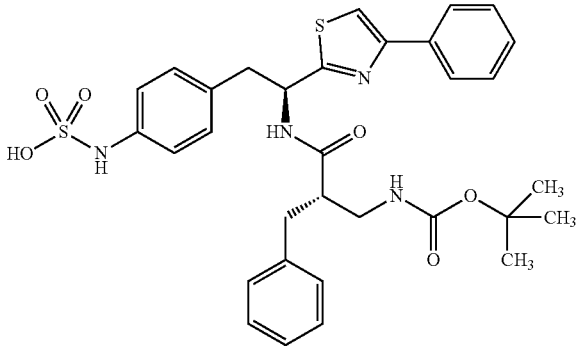 [SMILES: CC(C)(C)OC(=O)NC[C@H](Cc1ccccc1)C(=O)N[C@@H](Cc1ccc(NS(=O)(=O)O)cc1)c1nc(-c2ccccc2)cs1]  {1-[1-(5-phenylthiazol-2-yl)-(S)-2-(4-sulfoaminophenyl)ethylcarbamoyl]-(S)-2-phenylethyl}methylcarbamic acid tert-butyl ester | <5 × 10$^{-8}$ |
| AA5 | 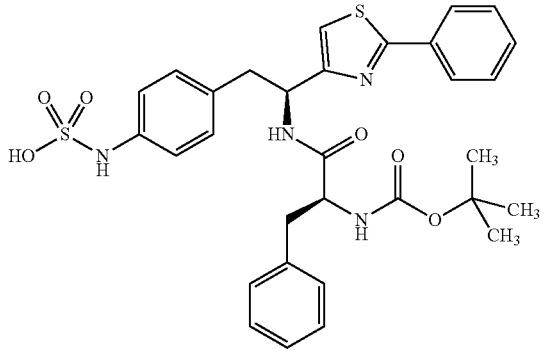 [SMILES: CC(C)(C)OC(=O)N[C@@H](Cc1ccccc1)C(=O)N[C@@H](Cc1ccc(NS(=O)(=O)O)cc1)c1csc(-c2ccccc2)n1]  4-{(S)-2-(S)-2-(tert-Butoxycarbonylamino)-3-phenylpropanamido-2-(2-phenylthiazol-4-yl)}phenylsulfamic acid | <5 × 10$^{-8}$ |

TABLE 3-continued
| No. | Compound | HPTPβ IC$_{50}$ μM |
|---|---|---|
| AA6 | 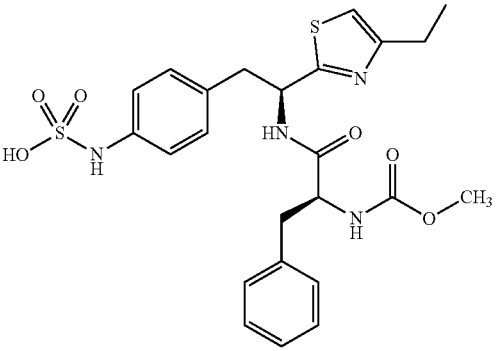 [SMILES: CCc1csc([C@H](Cc2ccc(NS(=O)(=O)O)cc2)NC(=O)[C@H](Cc2ccccc2)NC(=O)OC)n1]<br>4-{(S)-2-(4-Ethylthiazol-2-yl)-2-[(S)-2-(methoxycarbonylamino)-3-phenylpropanamido]ethyl}phenylsulfamic acid | 0.000162 |
| AA7 | 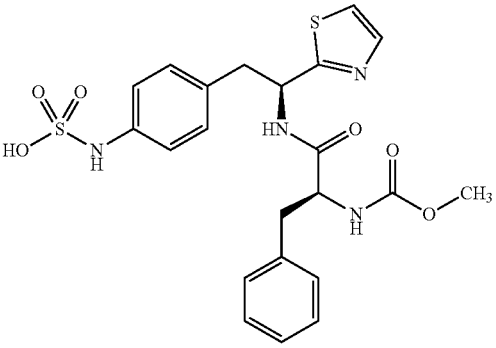 [SMILES: COC(=O)N[C@@H](Cc1ccccc1)C(=O)N[C@@H](Cc1ccc(NS(=O)(=O)O)cc1)c1nccs1]<br>4-{(S)-2-[(S)-2-(Methoxycarbonylamino)-3-phenylpropanamido]-2-(thiazol-2-yl)ethyl}phenylsulfamic acid | 0.006 |
| AA8 | 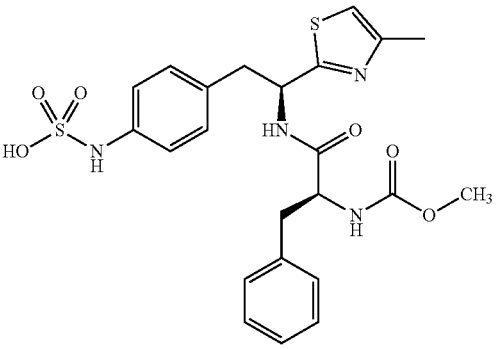 [SMILES: COC(=O)N[C@@H](Cc1ccccc1)C(=O)N[C@@H](Cc1ccc(NS(=O)(=O)O)cc1)c1nc(C)cs1]<br>4-{(S)-2-[(S)-2-(Methoxycarbonylamino)-3-phenylpropanamido]-2-(4-methylthiazol-2-yl)ethyl}phenylsulfamic acid | 0.001 |

TABLE 3-continued
| No. | Compound | HPTPβ IC$_{50}$ μM |
|---|---|---|
| AA9 | 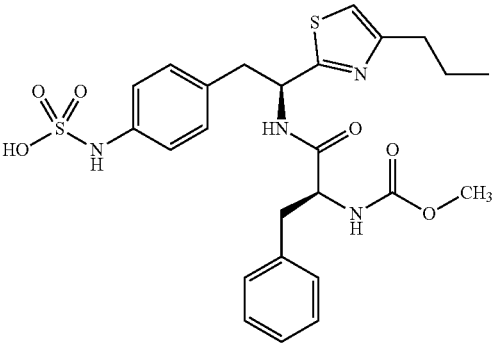 [SMILES: CCCc1csc([C@H](Cc2ccc(NS(=O)(=O)O)cc2)NC(=O)[C@H](Cc2ccccc2)NC(=O)OC)n1] 4-{(S)-2-[(S)-2-(Methoxycarbonylamino)-3-phenylpropanamido]-2-(4-propylthiazol-2-yl)ethyl}phenylsulfamic acid | 0.0001 |
| AA10 | 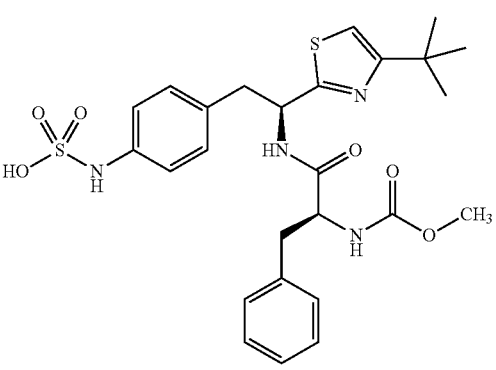 [SMILES: COC(=O)N[C@@H](Cc1ccccc1)C(=O)N[C@@H](Cc1ccc(NS(=O)(=O)O)cc1)c1nc(C(C)(C)C)cs1] 4-{(S)-2-(4-tert-Butylthiazol-2-yl)-2-[(S)-2-(methoxycarbonylamino)-3-phenylpropanamido]ethyl}phenylsulfamic acid | 0.0002 |
| AA11 | 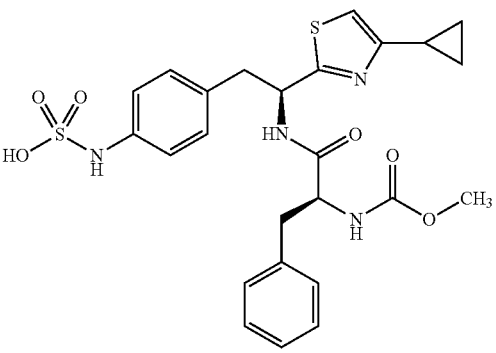 [SMILES: COC(=O)N[C@@H](Cc1ccccc1)C(=O)N[C@@H](Cc1ccc(NS(=O)(=O)O)cc1)c1nc(C2CC2)cs1] 4-{(S)-2-(4-Cyclopropylthiazol-2-yl)-2-[(S)-2-(methoxy-carbonylamino)-3-phenylpropanamido]ethyl}phenylsulfamic acid | 0.00001 |

TABLE 3-continued

| No. | Compound | HPTPβ IC$_{50}$ μM |
|---|---|---|
| AA12 | 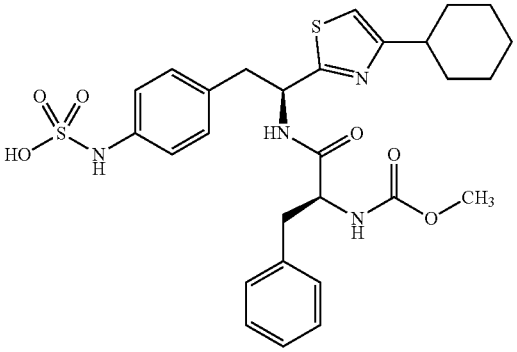 [SMILES: COC(=O)N[C@@H](Cc1ccccc1)C(=O)N[C@@H](Cc1ccc(NS(=O)(=O)O)cc1)c1nc(C2CCCCC2)cs1]<br>4-{(S)-2-(4-Cyclohexylthiazol-2-yl)-2-[(S)-2-(methoxycarbonylamino)-3-phenyl-propanamido]ethyl}phenylsulfamic acid | $<5 \times 10^{-8}$ |
| AA13 | 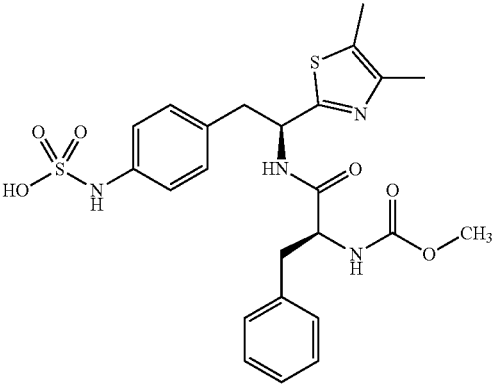 [SMILES: COC(=O)N[C@@H](Cc1ccccc1)C(=O)N[C@@H](Cc1ccc(NS(=O)(=O)O)cc1)c1nc(C)c(C)s1]<br>4-{(S)-2-(4,5-Dimethylthiazol-2-yl)-2-[(S)-2-(methoxycarbonylamino)-3-phenyl-propanamido]ethyl}phenylsulfamic acid | 0.001 |
| AA14 | 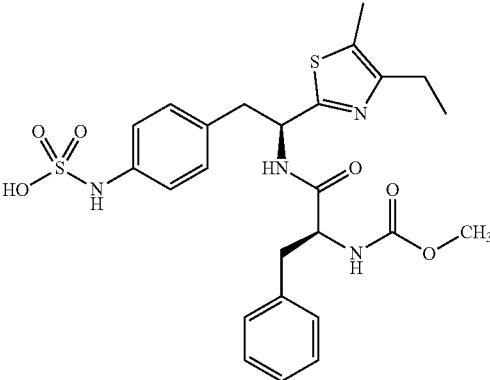 [SMILES: CCc1nc([C@H](Cc2ccc(NS(=O)(=O)O)cc2)NC(=O)[C@H](Cc2ccccc2)NC(=O)OC)sc1C]<br>4-{(S)-2-(4-Ethyl-5-methylthiazol-2-yl)-2-[(S)-2-(methoxy-carbonylamino)-3-phenyl-propanamido]ethyl}phenylsulfamic acid | 0.0001 |

TABLE 3-continued
| No. | Compound | HPTPβ IC$_{50}$ μM |
|---|---|---|
| AA15 | 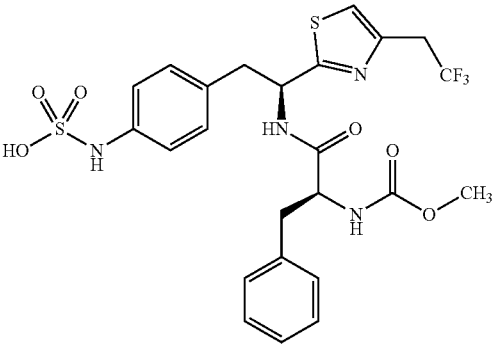 [SMILES: COC(=O)N[C@@H](Cc1ccccc1)C(=O)N[C@@H](Cc1ccc(NS(=O)(=O)O)cc1)c1nc(CC(F)(F)F)cs1] 4-{(S)-2-[(S)-2-(Methoxycarbonylamino)-3-phenylpropanamido]-2-[4-(2,2,2-trifluoroethyl)thiazol-2-yl]ethyl}phenylsulfamic acid | 0.0003 |
| AA16 | 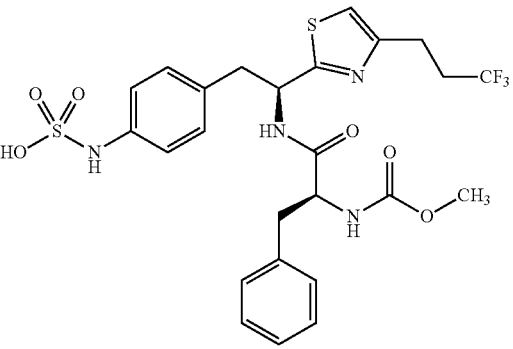 [SMILES: COC(=O)N[C@@H](Cc1ccccc1)C(=O)N[C@@H](Cc1ccc(NS(=O)(=O)O)cc1)c1nc(CCC(F)(F)F)cs1] 4-{(S)-2-[(S)-2-(Methoxycarbonylamino)-3-phenylpropanam]do)-2-[4-(3,3,3-trifluoropropyl)thiazol-2-yl]ethyl}phenylsulfamic acid | 0.00008 |
| AA17 | 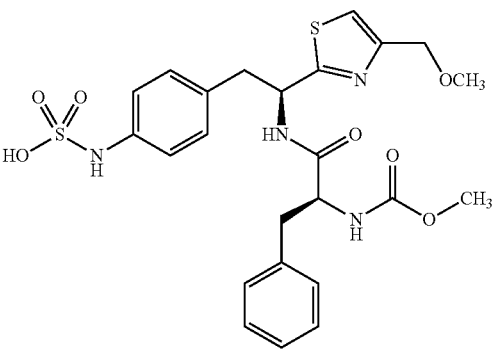 [SMILES: COCc1csc([C@H](Cc2ccc(NS(=O)(=O)O)cc2)NC(=O)[C@H](Cc2ccccc2)NC(=O)OC)n1] 4-{(S)-2-[(S)-2-(Methoxycarbonylamino)-3-phenylpropanamido]-2-[4-(methoxymethyl)thiazol-2-yl]ethyl}phenylsulfamic acid | 0.001 |

TABLE 3-continued
| No. | Compound | HPTPβ IC$_{50}$ μM |
|---|---|---|
| AA18 | 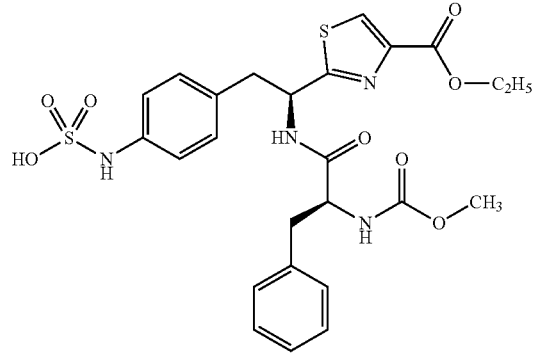 [SMILES: CCOC(=O)c1csc([C@H](Cc2ccc(NS(=O)(=O)O)cc2)NC(=O)[C@H](Cc2ccccc2)NC(=O)OC)n1]  4-{(S)-2-(4-(Ethoxycarbonyl)thiazol-2-yl)-2-[(S)-2-(methoxy-carbonylamino)-3-phenylpropanamido]ethyl}phenylsulfamic acid | 0.0002 |
| AA19 | 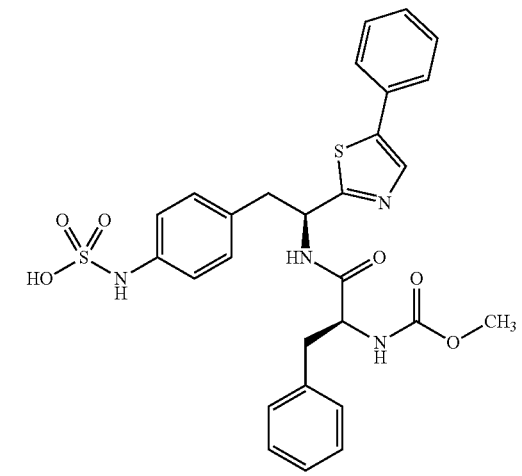 [SMILES: COC(=O)N[C@@H](Cc1ccccc1)C(=O)N[C@@H](Cc1ccc(NS(=O)(=O)O)cc1)c1ncc(-c2ccccc2)s1]  4-{(S)-2-[(S)-2-(Methoxycarbonylamino)-3-phenylpropanamido]-2-(5-phenylthiazol-2-yl)ethyl}phenylsulfamic acid | 0.0003 |
| AA20 | 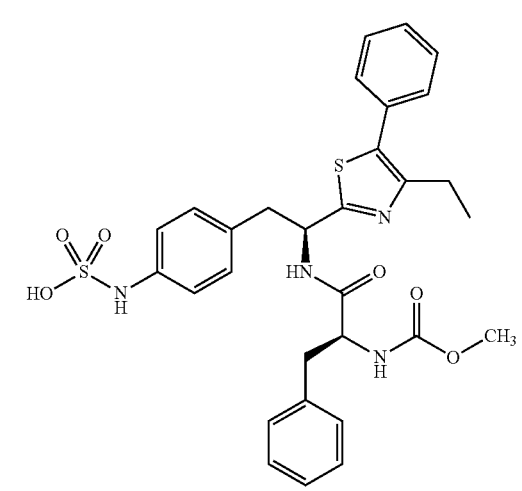 [SMILES: CCc1nc([C@H](Cc2ccc(NS(=O)(=O)O)cc2)NC(=O)[C@H](Cc2ccccc2)NC(=O)OC)sc1-c1ccccc1]  4-{(S)-2-(4-Ethyl-5-phenylthiazol-2-yl)-2-[(S)-2-(methoxy-carbonylamino)-3-phenyl-propanamido]ethyl}phenylsulfamic acid | <5 × 10$^{-8}$ |

TABLE 3-continued
| No. | Compound | HPTPβ IC$_{50}$ μM |
|---|---|---|
| AA21 | 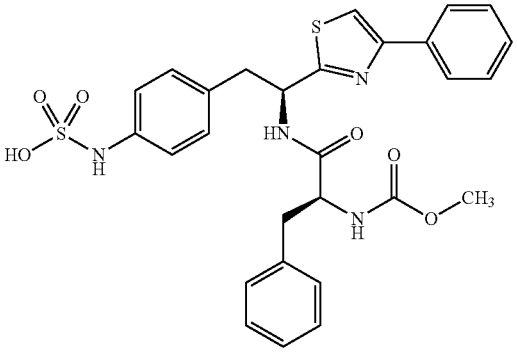 [SMILES: COC(=O)N[C@@H](Cc1ccccc1)C(=O)N[C@@H](Cc1ccc(NS(=O)(=O)O)cc1)c1nc(-c2ccccc2)cs1] 4-{(S)-2-[(S)-2-(Methoxycarbonylamino)-3-phenylpropanamido]-2-(4-phenylthiazol-2-yl)ethyl}phenylsulfamic acid | <2 × 10$^{-6}$ |
| AA22 | 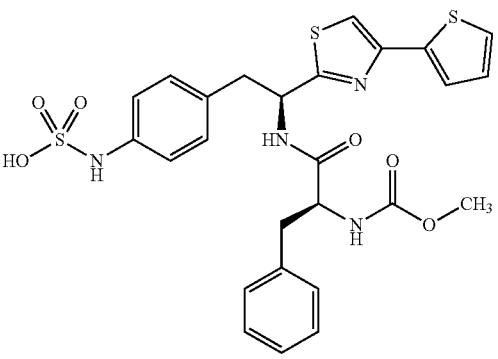 [SMILES: COC(=O)N[C@@H](Cc1ccccc1)C(=O)N[C@@H](Cc1ccc(NS(=O)(=O)O)cc1)c1nc(-c2cccs2)cs1] 4-{(S)-2-[(S)-2-(Methoxycarbonylamino)-3-phenylpropanamido]-2-[4-(thiophen-2-yl)thiazol-2-yl]ethyl}phenylsulfamic acid | <5 × 10$^{-8}$ |
| AA23 | 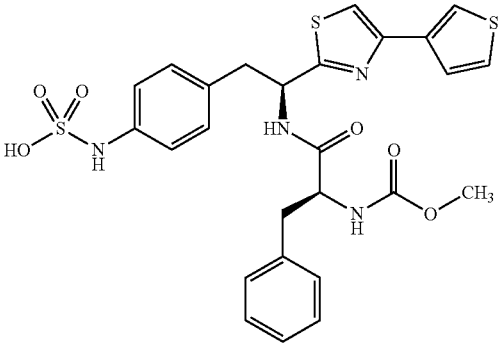 [SMILES: COC(=O)N[C@@H](Cc1ccccc1)C(=O)N[C@@H](Cc1ccc(NS(=O)(=O)O)cc1)c1nc(-c2ccsc2)cs1] 4-{(S)-2-[(S)-2-(Methoxycarbonylamino)-3-phenylpropanamido]-2-[4-(thiophen-3-yl)thiazol-2-yl]ethyl}phenylsulfamic acid | 0.00009 |

TABLE 3-continued

| No. | Compound | HPTPβ IC$_{50}$ μM |
|---|---|---|
| AA24 | 4-{(S)-2-(5,6-Dihydro-4H-cyclopenta[d]thiazol-2-yl)-2-[(S)-2-(methoxycarbonylamino)-3-phenylpropanamido]ethyl}phenylsulfamic acid | 0.001 |
| AA25 | 4-{(S)-2-[(S)-2-(Methoxycarbonylamino)-3-phenylpropanamido]-2-(4,5,6,7-tetrahydrobenzo[d]thiazol-2-yl)ethyl}phenylsulfamic acid | 0.0004 |
| AA26 | 4-{(S)-2-[4-(5-Chlorothiophen-2-yl)thiazol-2-yl]-2-[(S)-2-(methoxycarbonylamino)-3-phenylpropanamido]ethyl}phenyl-sulfamic acid | <5 × 10−8 |

TABLE 3-continued
| No. | Compound | HPTPβ IC$_{50}$ μM |
|---|---|---|
| AA27 | 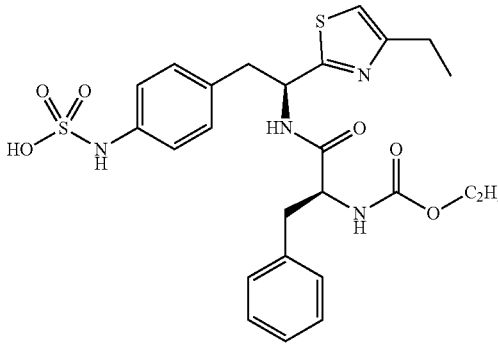 4-{(S)-2-[(S)-2-(Ethoxycarbonylamino)-3-phenylpropanamido]-2-(4-ethylthiazol-2-yl)ethyl}phenylsulfamic acid | 0.00014 |
| AA28 | 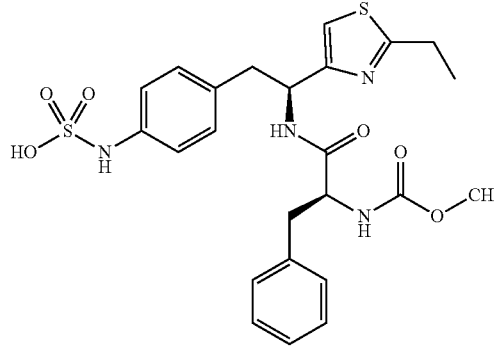 4-{(S)-2-[(S)-2-(Methoxycarbonylamino)-3-phenylpropanamido]-2-(2-ethylthiazol-4-yl)ethyl}phenylsulfamic acid | 0.0001 |
| AA29 | 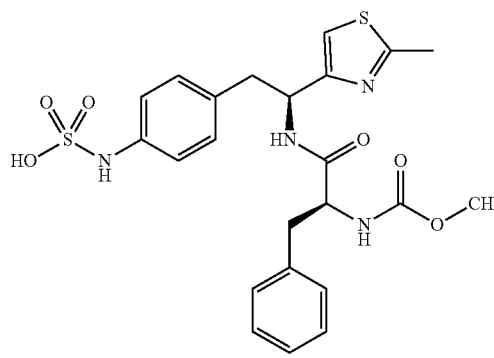 4-{(S)-2-[(S)-2-(Methoxycarbonylamino)-3-phenylpropanamido]-2-(2-methylthiazol-4-yl)ethyl}phenylsulfamic acid | 0.001 |

TABLE 3-continued

| No. | Compound | HPTPβ IC$_{50}$ μM |
|---|---|---|
| AA30 | 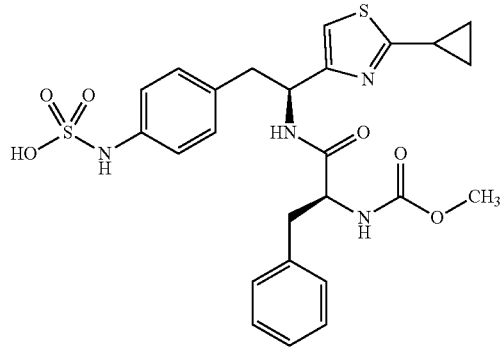 [SMILES: COC(=O)N[C@@H](Cc1ccccc1)C(=O)N[C@@H](Cc1ccc(NS(=O)(=O)O)cc1)c1csc(C2CC2)n1]<br>4-{(S)-2-(2-Cyclopropylthiazol-4-yl)-2-[(S)-2-(methoxy-carbonylamino)-3-phenylpropanamido]ethyl}phenylsulfamic acid | 0.0002 |
| AA31 | 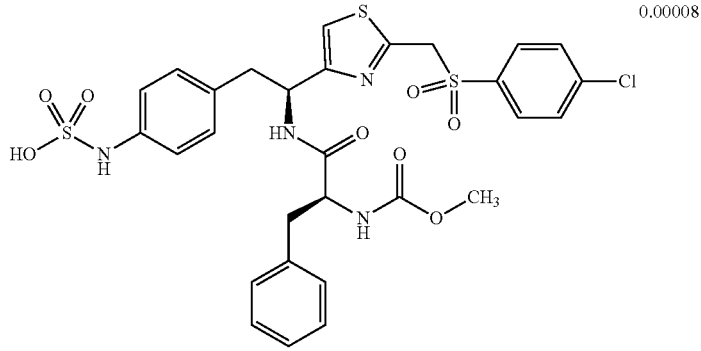<br>4-{(S)-2-{2-[(4-Chlorophenylsulfonyl)methyl]thiazol-4-yl}-2-[(S)-2-(methoxycarbonylamino)-3-phenylpropanamido]ethyl}phenylsulfamic acid | 0.00008 |
| AA32 | 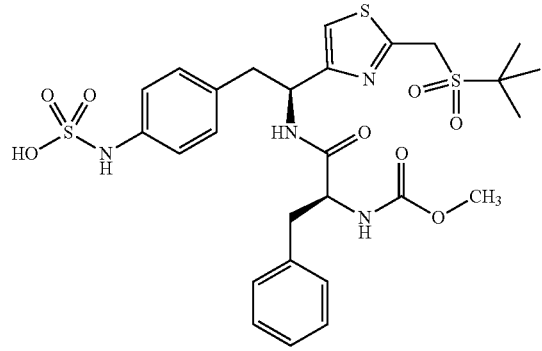 [SMILES: COC(=O)N[C@@H](Cc1ccccc1)C(=O)N[C@@H](Cc1ccc(NS(=O)(=O)O)cc1)c1csc(CS(=O)(=O)C(C)(C)C)n1]<br>4-{(S)-2-[2-(tert-Butylsulfonylmethyl)thiazol-4-yl]-2-[(S)-2-(methoxycarbonylamino)-3-phenylpropanamido]ethyl}phenylsulfamic acid | 0.002 |

TABLE 3-continued

| No. | Compound | HPTPβ IC$_{50}$ μM |
|---|---|---|
| AA33 | 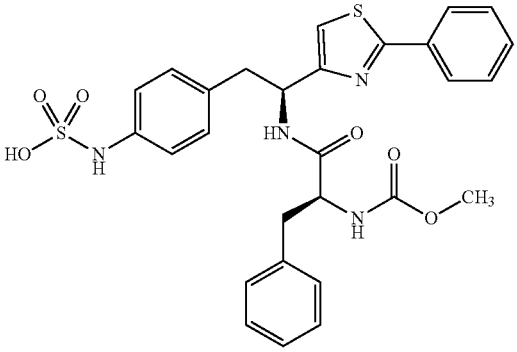 [SMILES: COC(=O)N[C@@H](Cc1ccccc1)C(=O)N[C@@H](Cc1ccc(NS(=O)(=O)O)cc1)c1csc(-c2ccccc2)n1] 4-{(S)-2-[(S)-2-(Methoxycarbonylamino)-3-phenylpropionamido]-2-(2-phenylthiazole-4-yl)ethyl}phenylsulfamic acid | $7 \times 10^{-7}$ |
| AA34 | 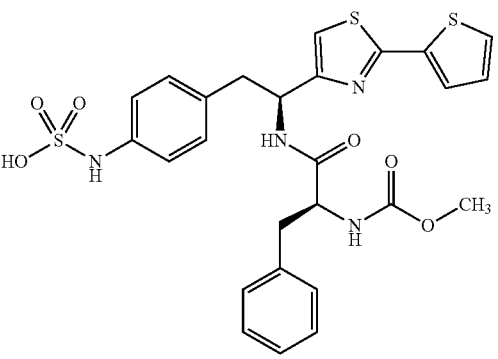 [SMILES: COC(=O)N[C@@H](Cc1ccccc1)C(=O)N[C@@H](Cc1ccc(NS(=O)(=O)O)cc1)c1csc(-c2cccs2)n1] 4-{(S)-2-[(S)-2-(Methoxycarbonylamino)-3-phenylpropanamido]-2-[2-(thiophen-2-yl)thiazol-4-yl]ethyl}phenylsulfamic acid | $5 \times 10^{-8}$ |
| AA35 | 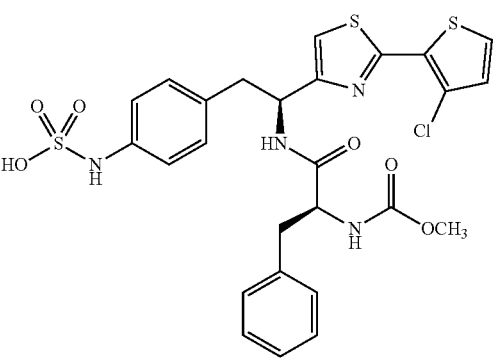 [SMILES: COC(=O)N[C@@H](Cc1ccccc1)C(=O)N[C@@H](Cc1ccc(NS(=O)(=O)O)cc1)c1csc(-c2sccc2Cl)n1] 4-{(S)-2-[2-(3-Chlorothiophen-2-yl)thiazol-4-yl]-2-[(S)-2-(methoxycarbonylamino)-3-phenylpropanamido]ethyl}phenylsulfamic acid | $<5 \times 10^{-8}$ |

TABLE 3-continued
| No. | Compound | HPTPβ IC$_{50}$ μM |
|---|---|---|
| AA36 | 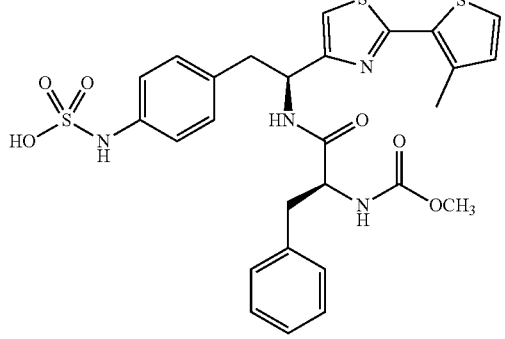 4-{(S)-2-[(S)-2-(Methoxycarbonylamino)-3-phenylpropanamido]-2-[2-(3-methylthiophen-2-yl)thiazol-4-yl]ethyl}phenylsulfamic acid | <5 × 10$^{-8}$ |
| AA37 | 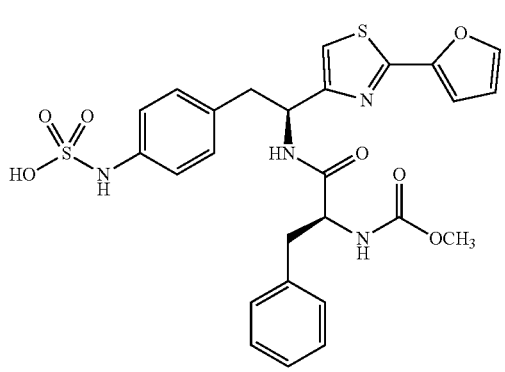 [SMILES: COC(=O)N[C@@H](Cc1ccccc1)C(=O)N[C@@H](Cc1ccc(NS(=O)(=O)O)cc1)c1csc(-c2ccco2)n1] 4-{[(S)-2-(2-(Furan-2-yl)thiazol-4)yl]-2-[(S)-2-(methoxy-carbonylamino)-3-phenylpropanamido]ethyl}phenylsulfamic acid | 0.0004 |
| AA38 | 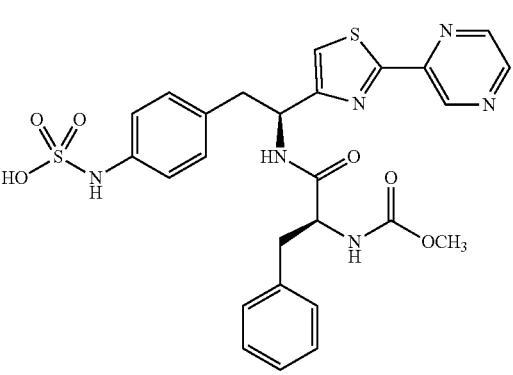 [SMILES: COC(=O)N[C@@H](Cc1ccccc1)C(=O)N[C@@H](Cc1ccc(NS(=O)(=O)O)cc1)c1csc(-c2cnccn2)n1] 4-{(S)-2-[(S)-2-(Methoxycarbonylamino)-3-phenylpropanamido]-2-[2-(pyrazin-2-yl)thiazol-4-yl]ethyl}phenylsulfamic acid | 0.003 |

TABLE 3-continued
| No. | Compound | HPTPβ IC$_{50}$ μM |
|---|---|---|
| AA39 | 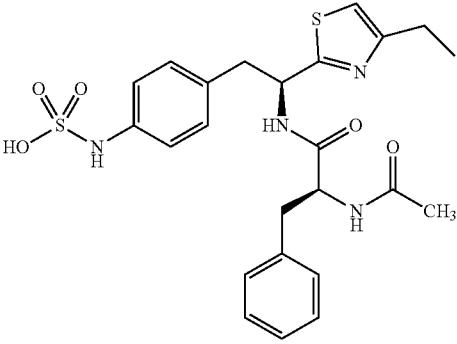 [SMILES: CCc1csc([C@H](Cc2ccc(NS(=O)(=O)O)cc2)NC(=O)[C@H](Cc2ccccc2)NC(C)=O)n1] 4-[(S)-2-((S)-2-Acetamido-3-phenylpropanamido)-2-(4-ethylthiazol-2-yl)ethyl]phenylsulfamic acid | 0.001 |
| AA40 | 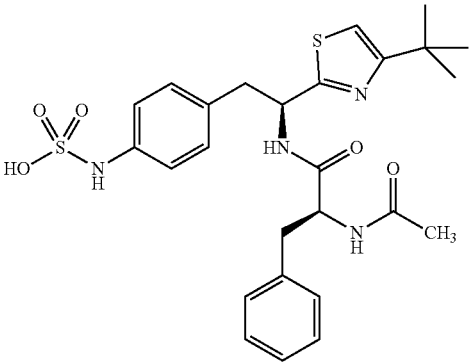 [SMILES: CC(=O)N[C@@H](Cc1ccccc1)C(=O)N[C@@H](Cc1ccc(NS(=O)(=O)O)cc1)c1nc(C(C)(C)C)cs1] 4-[(S)-2-((S)-2-Acetamido-3-phenylpropanamido)-2-(4-tert-butylthiazol-2-yl)ethyl]phenylsulfamic acid | 0.0003 |
| AA41 | 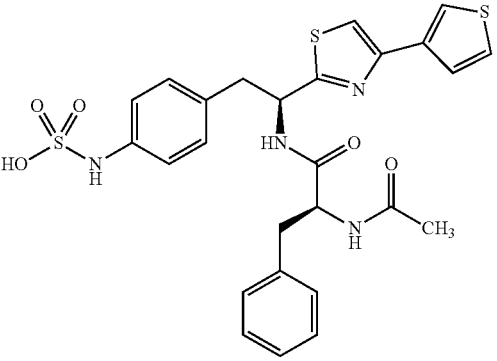 [SMILES: CC(=O)N[C@@H](Cc1ccccc1)C(=O)N[C@@H](Cc1ccc(NS(=O)(=O)O)cc1)c1nc(-c2ccsc2)cs1] 4-{(S)-2-((S)-2-Acetamido-3-phenylpropanamido)-2-[4-(thiophen-3-yl)thiazol-2-yl]ethyl}phenylsulfamic acid | 0.00024 |

TABLE 3-continued

| No. | Compound | HPTPβ IC$_{50}$ μM |
|---|---|---|
| AA42 | 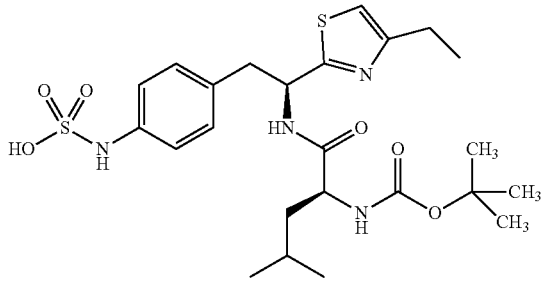 [SMILES: CCc1csc([C@H](Cc2ccc(NS(=O)(=O)O)cc2)NC(=O)[C@H](CC(C)C)NC(=O)OC(C)(C)C)n1]<br>4-{(S)-2-[(S)-2-(tert-Butoxycarbonylamino)-3-methylbutanamido]-2-(4-ethylthiazol-2-yl)ethyl}phenylsulfamic acid | 0.006 |
| AA43 | 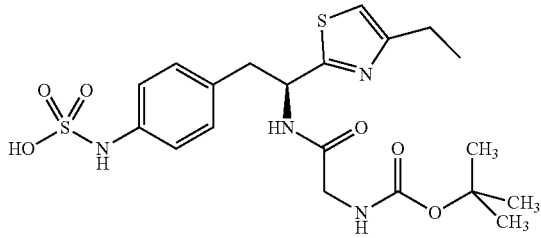 [SMILES: CCc1csc([C@H](Cc2ccc(NS(=O)(=O)O)cc2)NC(=O)CNC(=O)OC(C)(C)C)n1]<br>(S)-4-{2-[2-(tert-Butoxycarbonylamino)acetamido]-2-(4-ethylthiazol-2-yl)ethyl}phenylsulfamic acid | 0.028 |
| AA44 | 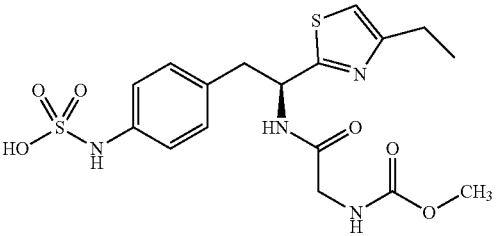 [SMILES: CCc1csc([C@H](Cc2ccc(NS(=O)(=O)O)cc2)NC(=O)CNC(=O)OC)n1]<br>(S)-4-{2-(4-Ethylthiazol-2-yl)-2-[2-(methoxycarbonylamino)acetamido]ethyl}phenylsulfamic acid | 0.020 |
| AA45 | 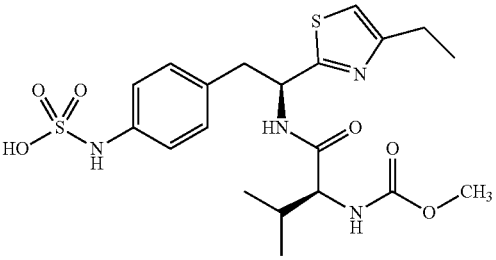 [SMILES: CCc1csc([C@H](Cc2ccc(NS(=O)(=O)O)cc2)NC(=O)[C@@H](NC(=O)OC)C(C)C)n1]<br>4-{(S)-2-(4-Ethylthiazol-2-yl)-2-[(S)-2-(methoxycarbonylamino)-3-methylbutanamido]-ethyl}phenylsulfamic acid | 0.003 |

TABLE 3-continued

| No. | Compound | HPTPβ IC$_{50}$ μM |
|---|---|---|
| AA46 | 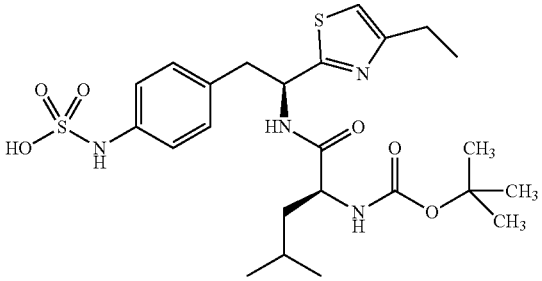 [SMILES: CCc1csc([C@H](Cc2ccc(NS(=O)(=O)O)cc2)NC(=O)[C@H](CC(C)C)NC(=O)OC(C)(C)C)n1] 4-{(S)-2-[(S)-2-(tert-Butoxycarbonylamino)-4-methylpentanamido]-2-(4-ethylthiazol-2-yl)ethyl}phenylsulfamic acid | 0.001 |
| AA47 | 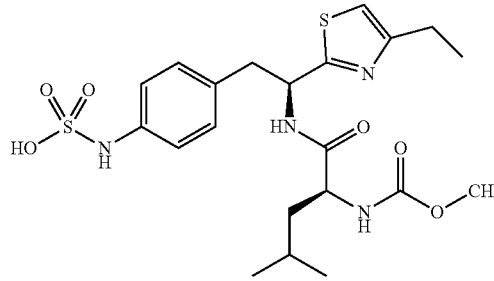 4-{(S)-2-(4-Ethylthiazol-2-yl)-2-[(S)-2-(methoxycarbonylamino)-4-methylpentanamido]ethyl}phenylsulfamic acid | 0.0003 |
| AA48 | 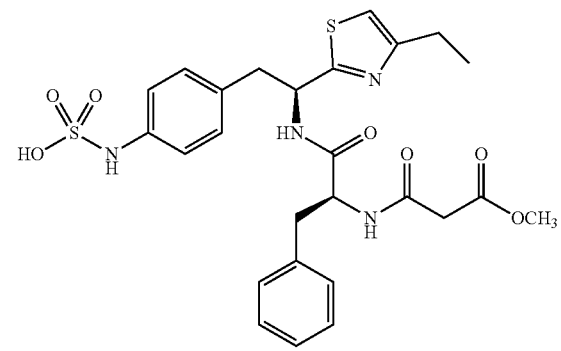 [SMILES: CCc1csc([C@H](Cc2ccc(NS(=O)(=O)O)cc2)NC(=O)[C@H](Cc2ccccc2)NC(=O)CC(=O)OC)n1] 4-((S)-2-(4-Ethylthiazol-2-yl)-2-{(S)-2-[2-(methoxycarbonylamino)-acetamido]-3-phenylpropanamido}ethyl)phenylsulfamic acid | 0.0003 |
| AA49 | 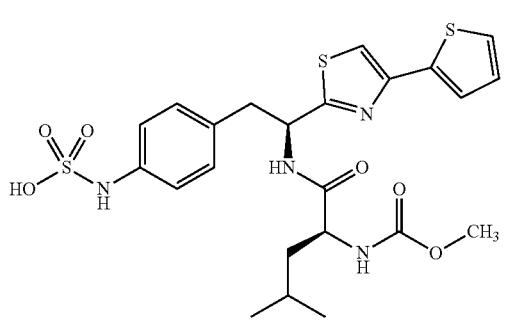 [SMILES: COC(=O)N[C@@H](CC(C)C)C(=O)N[C@@H](Cc1ccc(NS(=O)(=O)O)cc1)c1nc(-c2cccs2)cs1] 4-{(S)-2-[(S)-2-(Methoxycarbonylamino)-4-methylpentanamido]-2-[2-(thiophen-2-yl)thiazol-4-yl]ethyl}phenylsulfamic acid | <5 × 10$^{-8}$ |

TABLE 3-continued

| No. | Compound | HPTPβ IC$_{50}$ μM |
|---|---|---|
| AA50 | (S)-4-{2-[2-(tert-Butoxycarbonylamino)acetamido]-2-(4-ethylthiazol-2-yl)ethyl}-phenylsulfamic acid | 0.028 |
| AA51 | [1-(S)-(Phenylthiazol-2-yl)-2-(4-sulfoaminophenyl)ethyl]-carbamic acid tert-butyl ester | 0.049 |
| AA52 | (S)-4-(2-(4-Methylthiazol-2-yl)-2-pivalamidoethyl)phenyl-sulfamic acid | 0.112 |
| AA53 | (S)-4-(2-(4-Ethylthiazol-2-yl)-2-pivalamidoethyl)phenyl-sulfamic acid | 0.085 |
| AA54 | (S)-4-{2-[4-(hydroxymethyl)thiazol-2-yl]-2-pivalamidoethyl}phenyl-sulfamic acid | 0.266 |

TABLE 3-continued

| No. | Compound | HPTPβ IC$_{50}$ μM |
|---|---|---|
| AA55 | (S)-4-{[2-(4-Ethoxycarbonyl)thiazol-2-yl]-2-pivalamidoethyl}phenylsulfamic acid | 0.584 |
| AA56 | (S)-4-(2-(4-Phenylthiazol-2-yl)-2-pivalamidoethyl)phenylsulfamic acid | 0.042 |
| AA57 | 4-((S)-2-(4-(3-Methoxyphenyl)thiazol-2-yl)-2-pivalamidoethyl)phenylsulfamic acid | 0.110 |
| AA58 | 4-((S)-2-(4-(2,4-Dimethoxyphenyl)thiazol-2-yl)-2-pivalamidoethyl)phenyl-sulfamic acid | 0.086 |

TABLE 3-continued

| No. | Compound | HPTPβ IC$_{50}$ μM |
|---|---|---|
| AA59 | (S)-4-(2-(4-Benzylthiazol-2-yl)-2-pivalamidoethyl)phenylsulfamic acid | 0.113 |
| AA60 | (S)-4-(2-(4-(3-Methoxybenzyl)thiazol-2-yl)-2-pivalamidoethyl)phenylsulfamic acid | 0.132 |
| AA61 | 4-((S)-2-(4-(2,3-Dihydrobenzo[b][1,4]dioxin-6-yl)thiazol-2-yl)-2-pivalamidoethyl)phenylsulfamic acid | 0.138 |
| AA62 | (S)-4-(2-(5-Methyl-4-phenylthiazol-2-yl)-2-pivalamidoethyl)phenylsulfamic acid | 0.098 |

TABLE 3-continued
| No. | Compound | HPTPβ IC$_{50}$ μM |
|---|---|---|
| AA63 | 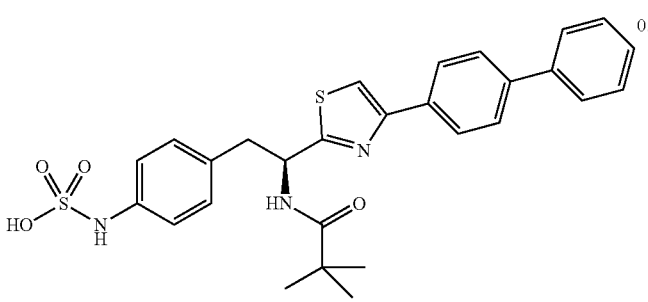<br>(S)-4- (2-(4-(Biphen-4-yl)thiazol-2-yl)-2-pivalamidoethyl)phenylsulfamic acid | 0.381 |
| AA64 | 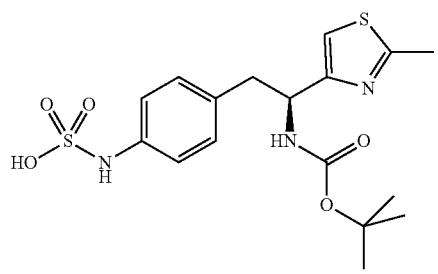 [SMILES: Cc1nc([C@H](Cc2ccc(NS(=O)(=O)O)cc2)NC(=O)OC(C)(C)C)cs1]<br>(S)-4-(2-tert-Butoxycarbonylamino)-2-(2-methylthiazol-4-yl)ethyl)phenylsulfamic acid | 0.033 |
| AA65 | 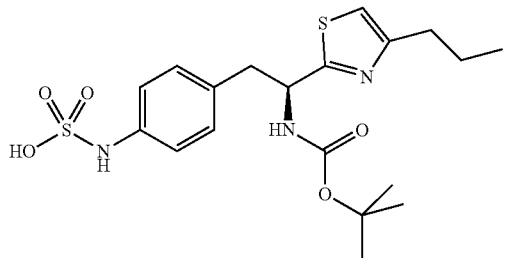 [SMILES: CCCc1csc([C@H](Cc2ccc(NS(=O)(=O)O)cc2)NC(=O)OC(C)(C)C)n1]<br>(S)-4-(2-(tert-Butoxycarbonylamino)-2-(4-propylthiazol-2-yl)ethyl)phenyl sulfamic acid | 0.04 |
| AA66 | 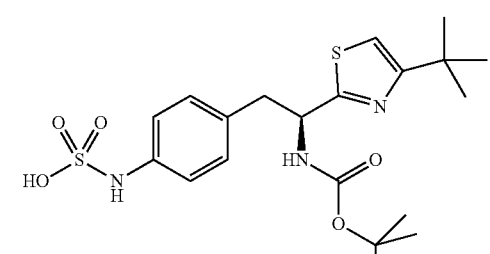<br>(S)-4-(2-(tert-Butoxycarbonylamino)-2-(4-tert-butylthiazol-2-yl)ethyl)phenyl sulfamic acid | 0.027 |

TABLE 3-continued

| No. | Compound | HPTPβ IC$_{50}$ μM |
|---|---|---|
| AA67 | (S)-4-(2-(tert-Butoxycarbonylamino)-2-(4-(methoxymethyl)thiazol-2-yl)ethyl)-phenyl sulfamic acid | 0.18 |
| AA68 | (S)-4-(2-(tert-Butoxycarbonylamino)-2-(4-(hydroxymethyl)thiazol-2-yl)ethyl)phenylsulfamic acid | 0.644 |
| AA69 | (S)-4-(2-tert-Butoxycarbonylamino)-2-(4-(2-ethoxy-2-oxoethyl)thiazol-2-yl)ethyl)phenylsulfamic acid | 0.167 |
| AA70 | (S)-4-(2-(tert-Butoxycarbonyl)-2-(4-(2-(2-methoxy-2-oxoethylamino)-2-oxoethyl)thiazole-2-yl)ethyl)phenylsulfamic acid | 0.132 |

TABLE 3-continued

| No. | Compound | HPTPβ IC$_{50}$ μM |
|---|---|---|
| AA71 | (S)-4-(2-(tert-Butoxycarbonylamino)-2-(2-pivalamidothiazol-4-yl)ethyl)phenylsulfamic acid | 0.555 |
| AA72 | (S)-4-(2-(tert-Butoxycarbonylamino)-2-(5-phenylthiazol-2-yl)ethyl)-phenyl sulfamic acid | 0.308 |
| AA73 | 4-((S)-2-(tert-Butoxycarbonylamino)-2-(4-(3-(trifluoromethyl)phenyl)thiazol-2-yl)ethyl)-phenyl sulfamic acid | 0.253 |
| AA74 | 4-((S)- 2-(tert-Butoxycarbonylamino)-2-(4-(thiophen-3-yl)thiazol-2-yl)ethyl)phenyl sulfamic acid | 0.045 |

TABLE 3-continued

| No. | Compound | HPTPβ IC$_{50}$ μM |
|---|---|---|
| AA75 | (S)-{4-[2-(4-Ethylthiazol-2-yl)-2-(phenylacetylamido)ethyl]-phenyl} sulfamic acid | 0.05 |
| AA76 | (S)-4-(2-(4-Ethylthiazol-2-yl)-2-(2-(2-fluorophenyl)acetamido)ethyl)phenyl-sulfamic acid | 0.012 |
| AA77 | (S)-4-(2-(4-Ethylthiazol-2-yl)-2-(2-(3-fluorophenyl)acetamido)ethyl)phenyl-sulfamic acid | 0.0003 |
| AA78 | (S)-4-(2-(2-(2,3-Difluorophenyl)acetamido)-2-(4-ethylthiazol-2-yl)ethyl)phenyl-sulfamic acid | 0.028 |

TABLE 3-continued

| No. | Compound | HPTPβ IC$_{50}$ μM |
|---|---|---|
| AA79 | (S)-4-(2-(2-(3,4-Difluorophenyl)acetamido)-2-(4-ethylthiazol-2-yl)ethyl)phenyl-sulfamic acid | 0.075 |
| AA80 | (S)-4-(2-(2-(2-Chlorophenyl)acetamido)-2-(4-ethylthiazol-2-yl)ethyl)phenyl-sulfamic acid | 0.056 |
| AA81 | (S)-4-(2-(2-(3-Chlorophenyl)acetamido)-2-(4-ethylthiazol-2-yl)ethyl)phenyl-sulfamic acid | 0.033 |
| AA82 | (S)-4-(2-(4-Ethylthiazol-2-yl)-2-(2-(3-hydroxyphenyl)acetamido)ethyl)phenyl-sulfamic acid | 0.04 |

TABLE 3-continued

| No. | Compound | HPTPβ IC$_{50}$ μM |
|---|---|---|
| AA83 | (S)-4-(2-(4-Ethylthiazol-2-yl)-2-(2-(2-methoxyphenyl)acetamido)ethyl)phenyl-sulfamic acid | 0.014 |
| AA84 | (S)-4-(2-(4-Ethylthiazol-2-yl)-2-(2-(3-methoxyphenyl)acetamido)ethyl)phenyl-sulfamic acid | 0.008 |
| AA85 | (S)-4-(2-(4-Ethylthiazol-2-yl)-2-(3-phenylpropanamido)ethyl)phenylsulfamic acid | 0.002 |
| AA86 | (S)-4-(2-(2-(3,4-Dimethoxyphenyl)acetamido)-2-(4-ethylthiazol-2-yl)ethyl)-phenylsulfamic acid | 0.028 |

TABLE 3-continued

| No. | Compound | HPTPβ IC$_{50}$ μM |
|---|---|---|
| AA87 | (S)-4-(2-(2-(2,3-Dimethoxyphenyl)acetamido)-2-(4-ethylthiazol-2-yl)ethyl)-phenylsulfamic acid | 0.037 |
| AA88 | (S)-4-(2-(3-(3-Chlorophenyl)propanamido)-2-(4-ethylthiazol-2-yl)ethyl)phenyl-sulfamic acid | 0.0002 |
| AA89 | (S)-4-(2-(4-Ethylthiazol-2-yl)-2-(3-(2-methoxyphenyl)propanamido)ethyl)phenyl-sulfamic acid | 0.003 |
| AA90 | (S)-4-(2-(4-Ethylthiazol-2-yl)-2-(3-(3-methoxyphenyl)propanamido)ethyl)phenyl-sulfamic acid | 0.01 |
| AA91 | (S)-4-(2-(4-Ethylthiazol-2-yl)-2-(3-(4-methoxyphenyl)propanamido)ethyl)phenyl-sulfamic acid | 0.006 |

TABLE 3-continued

| No. | Compound | HPTPβ IC$_{50}$ μM |
|---|---|---|
| AA92 | 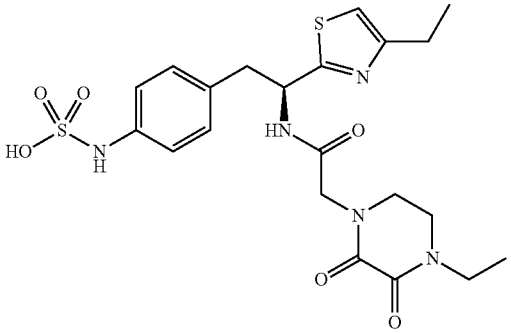 [SMILES: CCc1csc([C@H](Cc2ccc(NS(=O)(=O)O)cc2)NC(=O)CN2CCN(CC)C(=O)C2=O)n1] (S)-4-{2-[2-(4-Ethyl-2,3-dioxopiperazin-1-yl)acetamide]-2-(4-ethylthiazol-2-yl)ethyl}phenylsulfamic acid | 0.002 |
| AA93 | 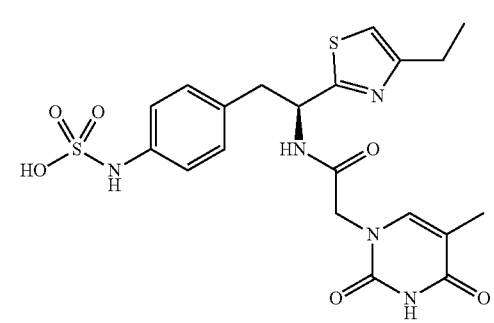 [SMILES: CCc1csc([C@H](Cc2ccc(NS(=O)(=O)O)cc2)NC(=O)Cn2cc(C)c(=O)[nH]c2=O)n1] (S)-4-{2-(4-Ethylthiazol-2-yl)-2-[2-(5-methyl-2,4-dioxo-3,4-dihydropyrimidin-1(2H)-yl)acetamide]ethyl}phenylsulfamic acid | 0.002 |
| AA94 | 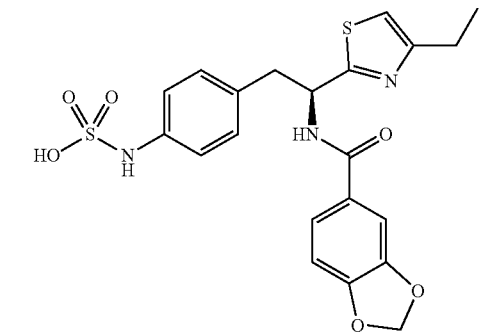 [SMILES: CCc1csc([C@H](Cc2ccc(NS(=O)(=O)O)cc2)NC(=O)c2ccc3c(c2)OCO3)n1] (S)-4-[2-(Benzo[d][1,3]dioxole-5-carboxamido)-2-(4-ethylthiazol-2-yl)ethyl]phenylsulfamic acid | 0.042 |
| AA95 | 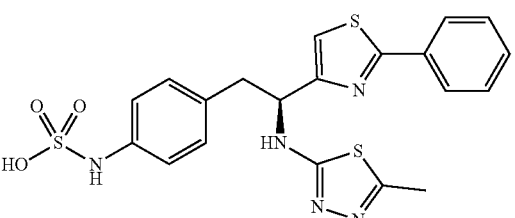 (S)-4-(2-(5-methyl-1,3,4-thiadiazol-2-ylamino)-2-(2-phenylthiazol-4-yl)ethyl)phenylsulfamic acid | 0.003 |

TABLE 3-continued

| No. | Compound | HPTPβ IC$_{50}$ μM |
|---|---|---|
| AA96 | (S)-4-(2-(5-Phenyl-1,3,4-thiadiazol-2-ylamino)-2-(2-phenylthiazol-4-yl)ethyl)-phenylsulfamic acid | 0.046 |
| AA97 | 4-((S)-2-(5-Propyl-1,3,4-thiadiazol-2-ylamino)-2-(2-(thiophen-2-yl)thiazol-4-yl)ethyl)phenylsulfamic acid | 0.0002 |
| AA98 | 4-((S)-2-(5-Benzyl-1,3,4-thiadiazol-2-ylamino)-2-(2-(thiophen-2-yl)thiazol-4-yl)ethyl)phenylsulfamic acid | 0.0006 |
| AA99 | 4-((S)-2-(5-((Methoxycarbonyl)methyl)-1,3,4-thiadiazol-2-ylamino)-2-(2-(thiophen-2-yl)thiazol-4-yl)ethyl)phenylsulfamic acid | 0.002 |

TABLE 3-continued

| No. | Compound | HPTPβ IC$_{50}$ μM |
|---|---|---|
| AA100 | 4-((S)-2-(5-((2-Methylthiazol-4-yl)methyl)-1,3,4-thiadiazol-2-ylamino)-2-(2-(thiophen-2-yl)thiazol-4-yl)ethyl)phenylsulfamic acid | $9 \times 10^{-6}$ |

Figure 3A:
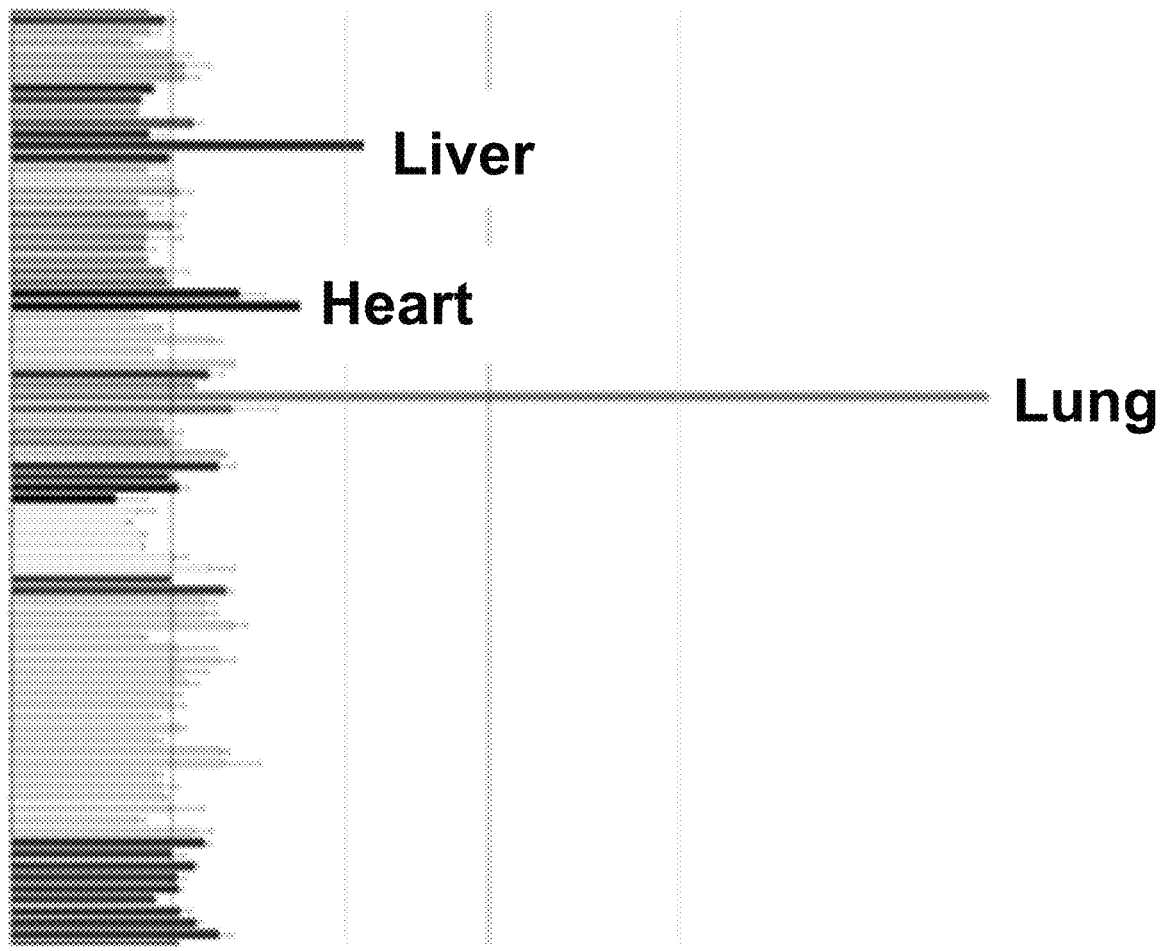
FIG. 3, Panel A illustrates human RNA expression data for VE-PTP. Panel B illustrates immunoblots and corresponding expression levels of VE-PTP (upper panels) or Tie2 (lower panels) immunoprecipitated from whole lung lysates in Akita/Ren diabetic hypertensive mice. Panel C illustrates a western blot analysis of lysates from cultured endothelial cells demonstrating VE-PTP induction by hypoxia.
Figure 3B:
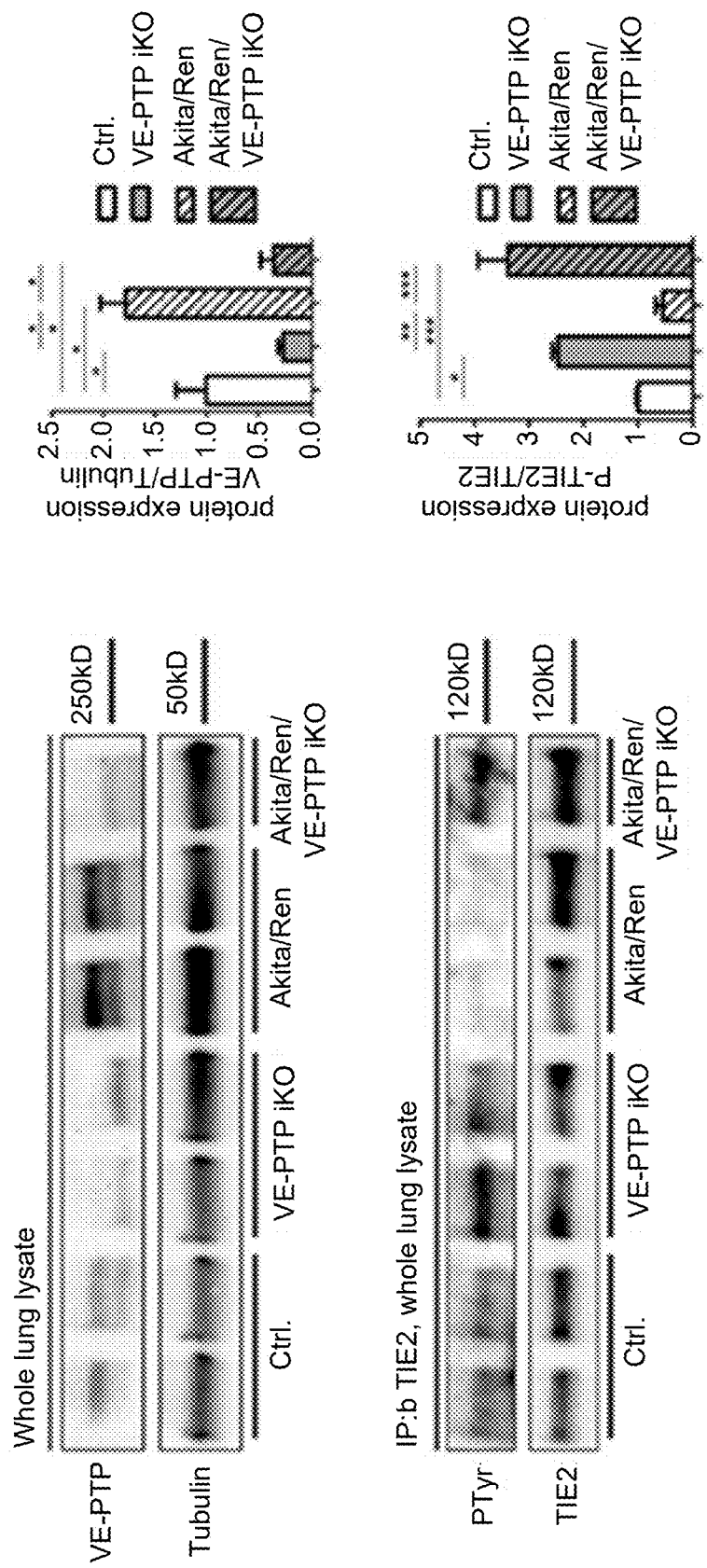
Figure 3C:
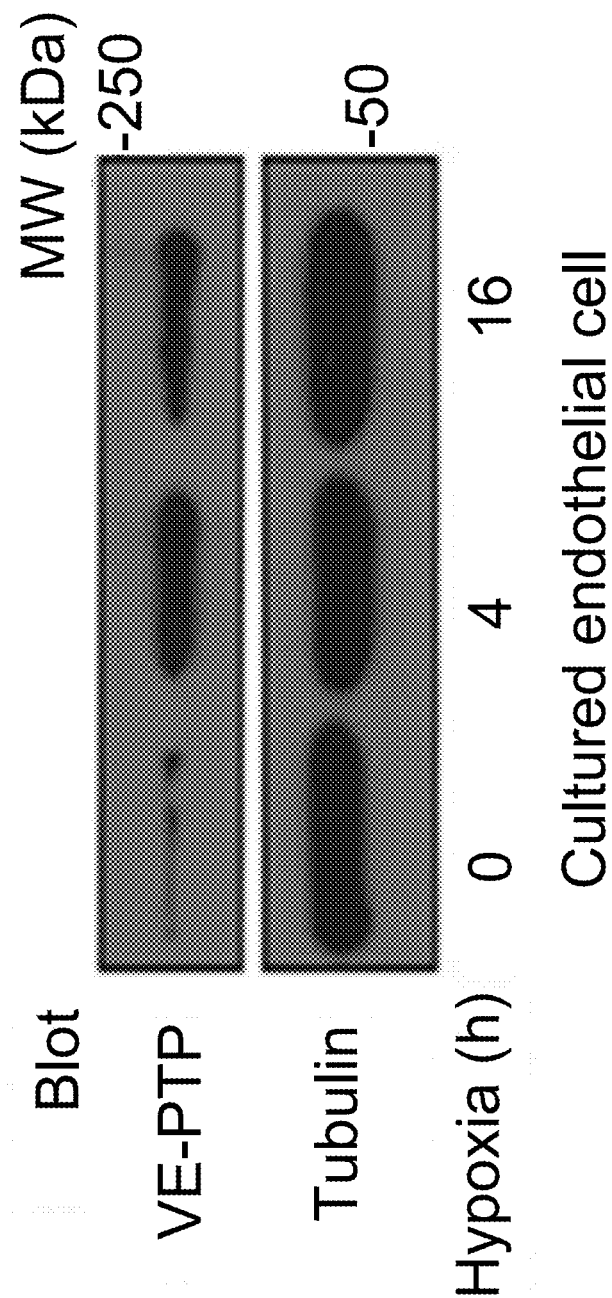

Example 2. VE-PTP is Induced in the Stressed Endothelium of the ARDS Lung Microvasculature VE-PTP is induced in the stressed endothelium, a key pathology of ARDS. Thus, the ARDS lung microvasculature is a promising target for HPTPβ/VE-PTP inhibitors. FIG. 3 illustrates the pathophysiological relevance of Tie-2 and VE-PTP in ARDS. FIG. 3, Panel A illustrates RNA expression data of VE-PTP from humans: each line represents a cell type or tissue and the degree of deflection to the right describes expression level. Even in the absence of stress, VE-PTP is most highly expressed in the lung. FIG. 3, Panel B illustrates immunoblots and corresponding protein expression levels of VE-PTP (upper panels) or Tie2 (lower panels) immunoprecipitated from whole lung lysates in Akita/Ren diabetic hypertensive mice compared to control mice. The VE-PTP conditional knockout restored Tie2 activation in the Akita/Ren mice (last lane of the lower left panel). FIG. 3, Panel C illustrates a western blot analysis of lysates from cultured endothelial cells demonstrating that VE-PTP is induced by hypoxia, a canonical stressor for the endothelium. This analysis demonstrates that VE-PTP is induced by hypoxia, a canonical stressor for the endothelium relevant in COVID-19 and ARDS. HPTPβ/VE-PTP inhibition can restore Tie-2 activation to stabilize a stressed vasculature.

Example 3. Ligand-Independent Tie-2 Activation and Targeted Protection from Lung Vascular Leakage by a HPTPβ Inhibitor Lung vascular leakage was assessed using a HPTPβ inhibitor described herein, Compound 1. When applied to cultured endothelial cells, Compound 1 achieved ligand-independent Tie-2 activation and activated Tie-2 even when Ang-1 was unable to do so during endothelial cell hypoxia (FIG. 4, Panel A).

Effects of Compound 1 were also assessed in a mice model of inflammatory lung vascular leakage. Mice treated with control siRNA or Tie-2 siRNA were analyzed for lung vascular leakage induced by the Gram-negative endotoxin, lipopolysaccharides (LPS) (FIG. 4, Panel B). LPS increased lung vascular leakage in both groups of mice. However, Compound 1 only counteracted LPS-induced vascular leakage when Tie-2 was not artificially suppressed. This result demonstrated that Compound 1 acts in a Tie-2-dependent fashion to reduce inflammatory lung vascular leakage.

The effects of Compound 1 on VE-PTP were also assessed in vivo in an inducible endothelial cell knockout mouse for VE-PTP (Cdh5-Cre$^{ERT2}$:PTPR-β$^{lox/lox}$, hereinafter "iECKO-VE-PTP"). Compared to littermate controls (PTPR-β$^{lox/lox}$), iECKO-VE-PTP mice exhibited less vascular leakage in response to two unrelated inflammatory permeability triggers: histamine and VEGF. Moreover, whereas Compound 1 reduced inflammatory vascular leakage in control mice, mice that lacked endothelial VE-PTP showed no further reduction of leakage with Compound 1 treatment (FIG. 4, Panel C). Taken together, these results demonstrate that: (a) Compound 1 is a potent activator of Tie-2 in stressed endothelium; and (b) Compound 1 reduces inflammatory vascular leakage in vivo specifically by acting through VE-PTP to augment Tie-2 signaling.

Figure 4A:
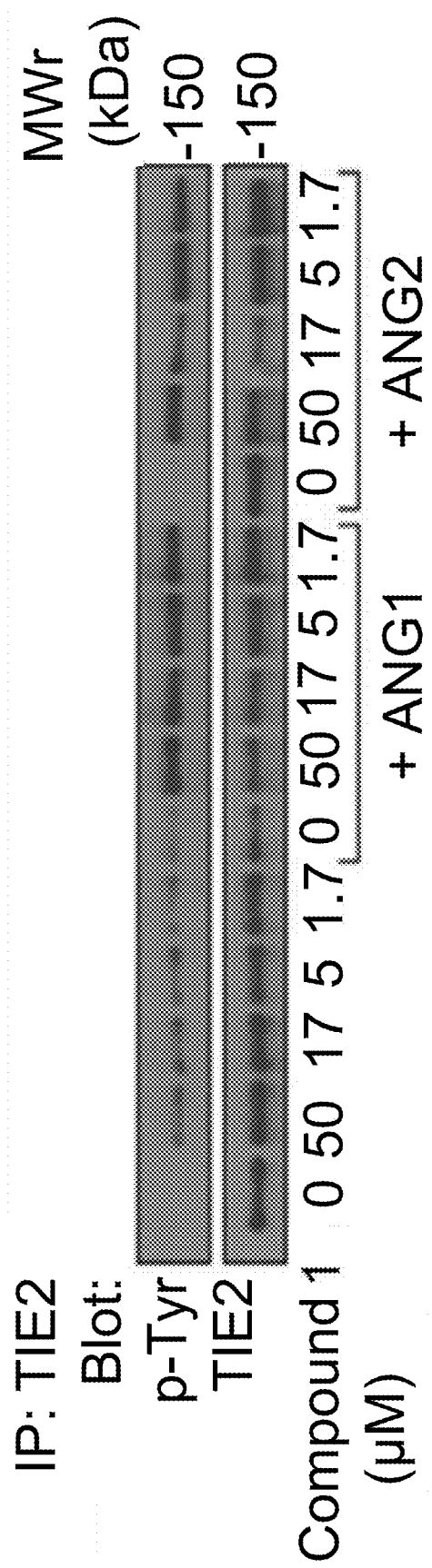
FIG. 4, Panel A illustrates a western blot analysis of cultured endothelial cell lysates demonstrating Tie-2 activation with Compound 1. Panel B illustrates effects of Compound 1 on LPS-induced lung permeability. Panel C illustrates effects of Compound 1 on VEGF-induced and histamine-induced skin blood vessel permeability.
Figure 4B:
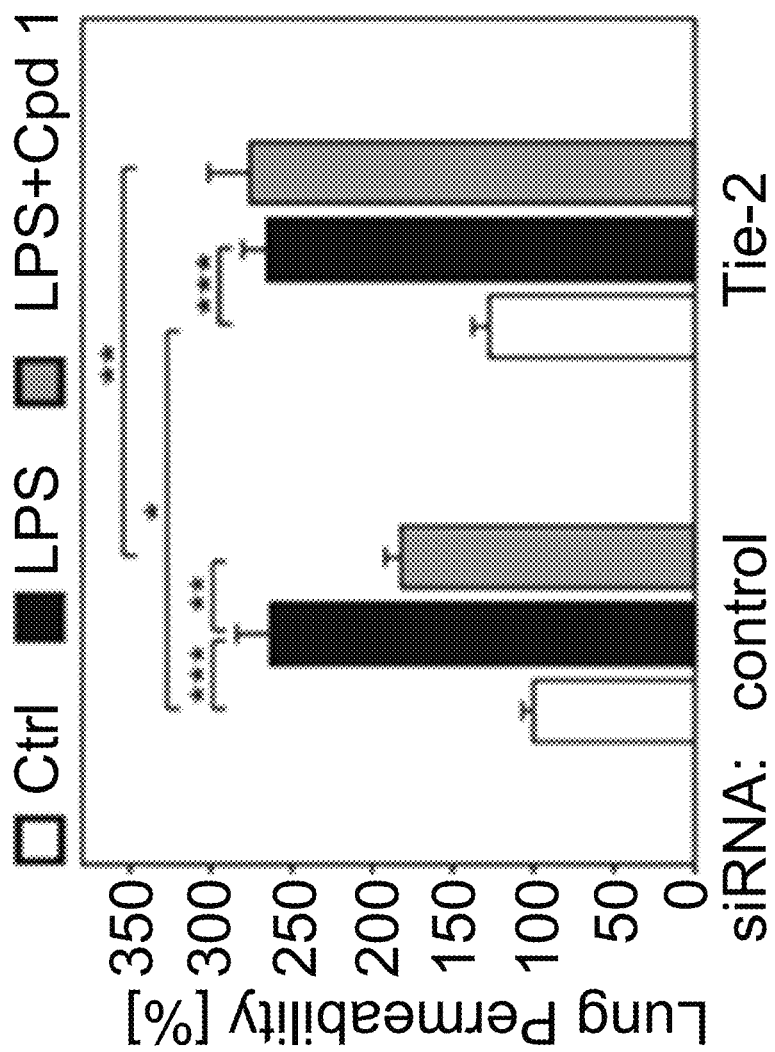
Figure 4C:
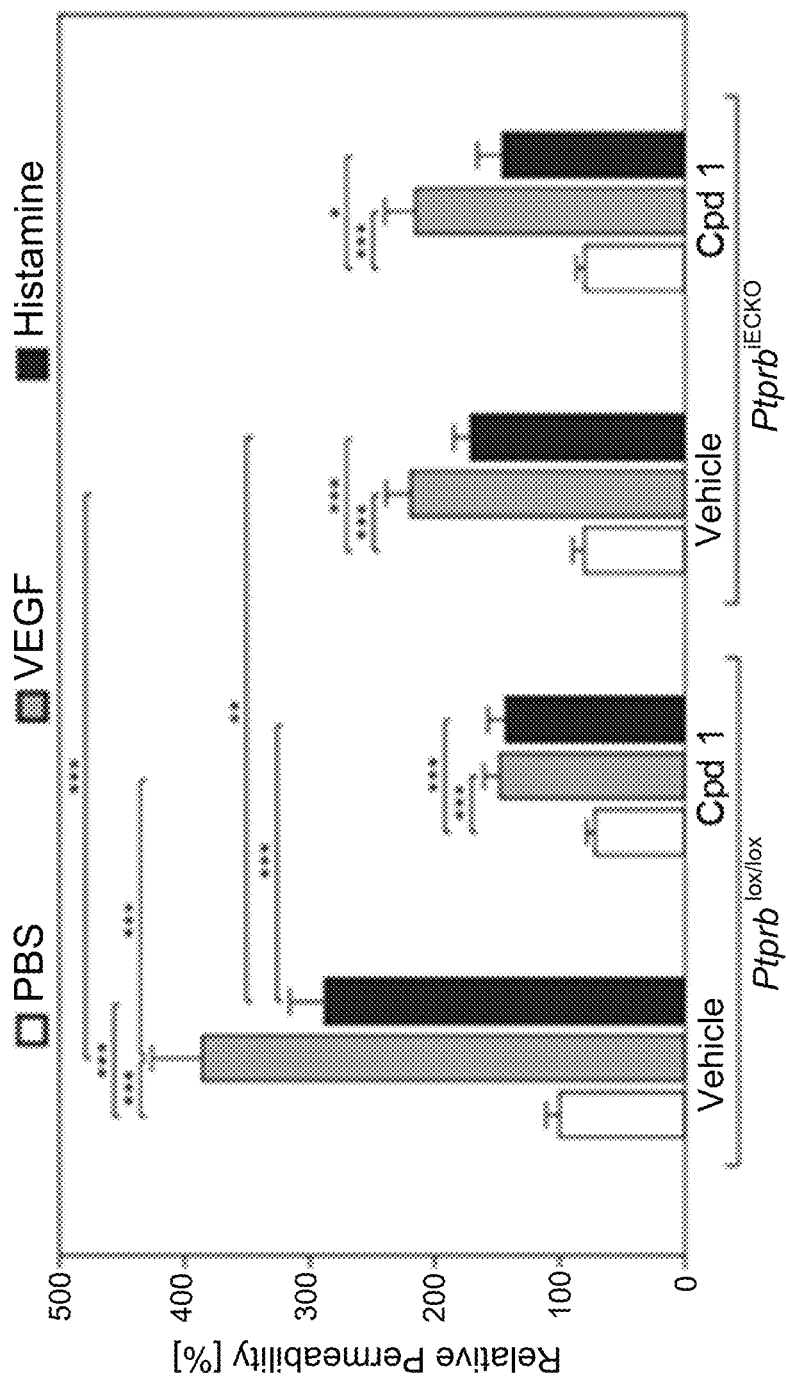

FIG. 4, Panel A shows a western blot analysis of cultured endothelial cell lysates demonstrating Tie-2 activation (p-Tyr) with Compound 1 in the absence of Ang-1 and Ang-2 ligands, and augmentation of Ang-1 induced Tie-2 and Ang-2 induced Tie-2. Thus, Compound 1 achieved ligand-independent Tie-2 activation to counteract mammalian vascular leakage in a highly targeted fashion. FIG. 4, Panel B shows that Tie-2 expression is required for Compound 1 to counteract LPS-induced lung vascular leakage as shown by siRNA vs. Tie-2. FIG. 4, Panel C shows that conditional deletion of VE-PTP (Ptprb) demonstrates a requirement for Compound 1 (Cpd 1) to counteract vascular leakage in mice induced by VEGF or histamine.

Compound 1 also reduced LPS-mediated vascular leakage and leukocyte transmigration (neutrophil and lymphocyte) in the lung, two key components of COVID-19 pulmonary pathology that contribute to respiratory failure. Compound 1 also reduced lung toxicity and improved survival in a mouse model of IL2-induced cytokine storm possibly relevant to cytokine storm that is associated with poor outcomes in COVID-19. In addition, VE-PTP inhibition via Compound 1 improved outcomes in models of diabetic nephropathy, LPS-induced acute renal injury and cerebral ischemia indicating potential benefits of restoring Tie-2 activation in crucial vascular beds outside the lung. Compound 1 also enhanced the Tie-2 agonist properties of both Ang-1 and Ang-2, and restored Tie-2 activation and angiopoietin responsiveness in hypoxic endothelial cells. These results suggest a benefit of Tie-2 activation in COVID-19 patients with respiratory failure.

Example 4. Effects of Compound 1 on Sepsis In Vivo

Figure 5:
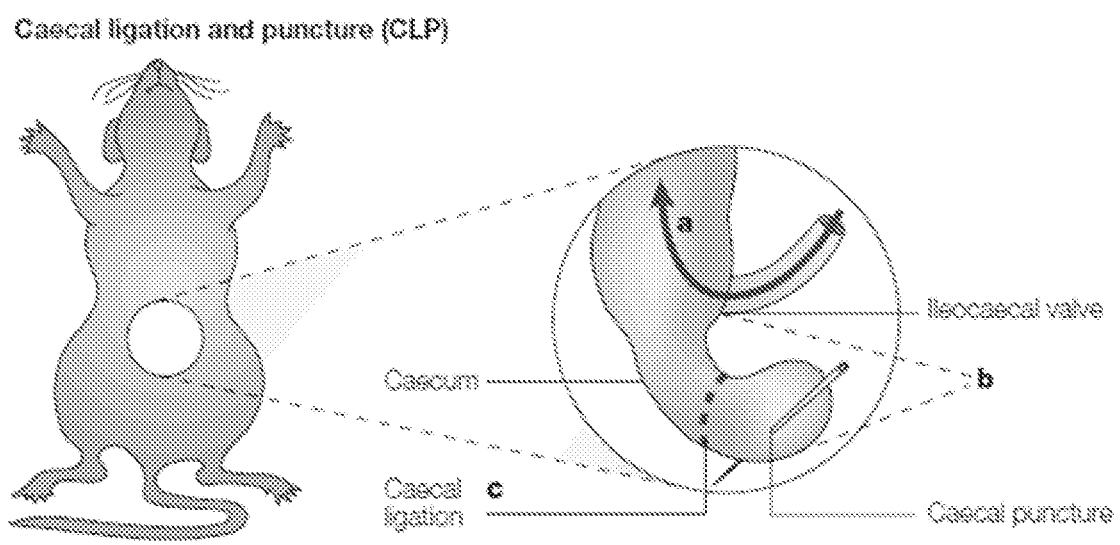
FIG. 5 is a schematic of the cecal ligation and puncture (CLP) sepsis model.

As illustrated in FIG. 5, the cecal ligation and puncture (CLP) model of sepsis involves performance of a laparotomy under general anesthesia followed by ligation of a portion of the cecum in conjunction with creation of cecal colotomies via needle puncture. This model results in: 1) surgical trauma to the tissues, 2) ischemic tissue from the ligated cecum, and 3) polymicrobial sepsis from fecal spillage after needle puncture.

Figure 6:
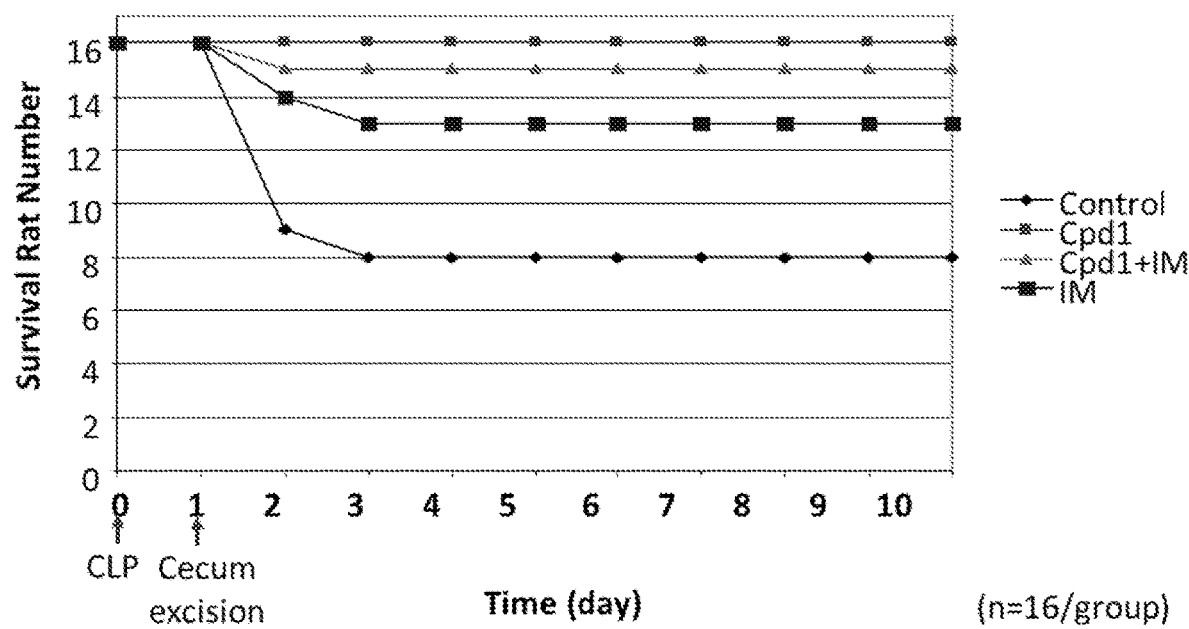
FIG. 6 illustrates effects of Compound 1 on polymicrobial septic shock.

In sepsis, elevated Ang-2 levels correlate with vascular leak and mortality. Compound 1 (Cpd 1) was used to assess effects on sepsis in vivo. Male Sprague Dawley rats fasted for 16 hours prior to cecum ligation. The cecum was surgically exposed and then ligated below the ileocecal valve. The excised cecum was punctured twice using a 16 G needle. Fecal material was expelled by squeezing prior to suturing and fluid resuscitation of the animal. After 24 hours, the necrotic cecum excised, the abdominal cavity was irrigated, and the animal was sutured again. Drug treatment was then administered subcutaneously twice daily (BID) on days 1-5 (n=16/group). Body weight and mortality was monitored for 10 days. The broad-spectrum antibiotic, imipenem (IM), was used as a positive control. The animals were divided into 4 groups: vehicle control, Cpd 1 (10 mg/kg), Cpd 1 (10 mg/kg)+IM (20 mg/kg), and IM (20 mg/kg). The resulting survival rates are shown in FIG. 6. Vehicle-treated controls showed 50% survival (8/16) versus the Cpd 1 group with 100% survival (16/16; p=0.001) and the Cpd 1+IM with 94% survival (15/16; p=0.007). The 81% survival in the IM-treated group reached statistical significance (13/16; p=0.06) compared to vehicle control. Survival results were analyzed by the Kaplan-Meier method and compared by the log-rank test. The results indicate that HPTPβ inhibition can be an effective therapy against polymicrobial septic shock.

Example 5. Assessment of Subcutaneous Formulations of Compound 1 in Humans

Clinical Pharmacokinetics

Figure 7:
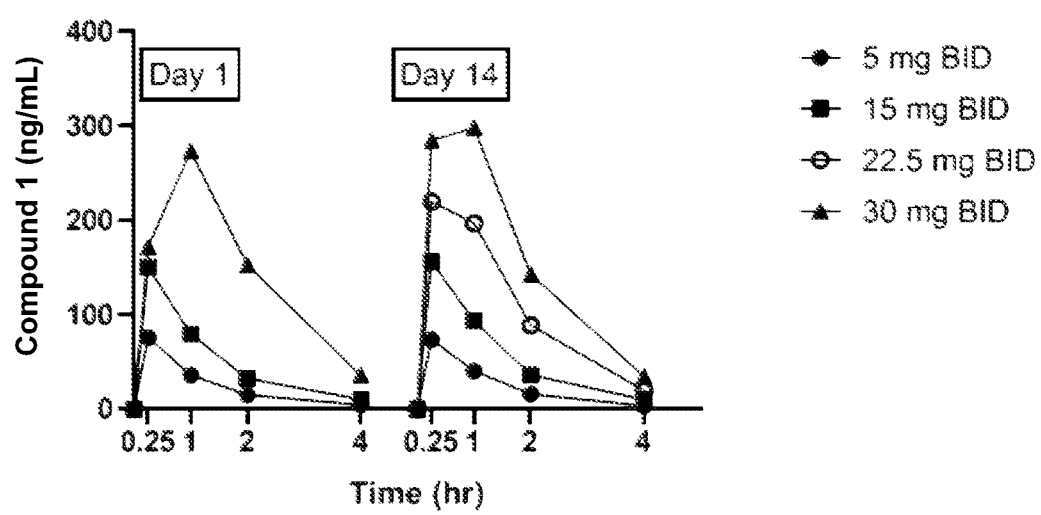
FIG. 7 illustrates human pharmacokinetic results of twice daily (BID) SQ Compound 1 at indicated doses.

A Phase 1 study was conducted to assess pharmacokinetic (PK) effects of 28-day repeat SC doses of Compound 1 in subjects with diabetic macular edema (DME). Four dose cohorts were administered 5, 15, 22.5, and 30 mg Compound 1 BID, respectively. Plasma samples were collected over 4 hours after administering the morning dose on Days 1 and 14. The resulting mean plasma concentration-time profiles are shown in FIG. 7. For all profiles shown in the figure, the samples were collected after the morning dose only of the BID regimen. Mean (SD) PK parameters of Compound 1 following morning dose on Day 14 are summarized in TABLE 3. PK samples for 22.5 mg dose group were collected for Day 14 dose only.

Compound 1 absorption following SC injection in humans was rapid with mean $T_{max}$ ranging from 0.3 hr to 0.5 hr. The plasma concentration-time profiles exhibited a rapid decline following a sharp $T_{max}$ with relatively short $T_{1/2}$ of approximately 1 hour. The $AUC_{0-inf}$ increased with increasing doses of Compound 1 in a dose proportional manner. The urinary excretion of Compound 1 was approximately 9-13% of the dose for all dose groups. These results support a dose related increase in plasma exposure in subjects with DME.

TABLE 3

| Parameter | 5 mg | 15 mg | 22.5 mg | 30 mg |
| --- | --- | --- | --- | --- |
| $C_{max}$ (ng/mL) | 77.8 (24.1) | 156.6 (51.8) | 237.4 (122.1) | 320.5 (68.5) |
| $T_{max}$ (h) | 0.31 (0.13) | 0.27 (0.04) | 0.45 (0.37) | 0.63 (0.39) |
| $AUC_{last}$ (ng · hr/mL) | 101.6 (27.0) | 239.1 (71.3) | 437.5 (235.3) | 669.4 (130.2) |
| $T_{1/2}$ (h) | 0.85 (0.19) | 0.96 (0.28) | 0.84 (0.09) | 1.07 (0.34) |

Clinical Efficacy

Inhibition of VE-PTP can activate Tie-2 irrespective of extracellular levels of Ang-1 (agonist) or Ang-2 (antagonist) and therefore represents an efficient pharmacologic approach to restoring Tie-2 activation in patients suffering from ARDS. Following SC injection, Compound 1 is rapidly absorbed into the circulation where the compound has direct access to the injured endothelium. In the Phase 1b study, BID dosing in patients with DME showed similar PK profiles during day 1 and day 14 (FIG. 7 and TABLE 3) with dose proportional increases in plasma concentrations and no evidence of accumulation.

Figure 8A:
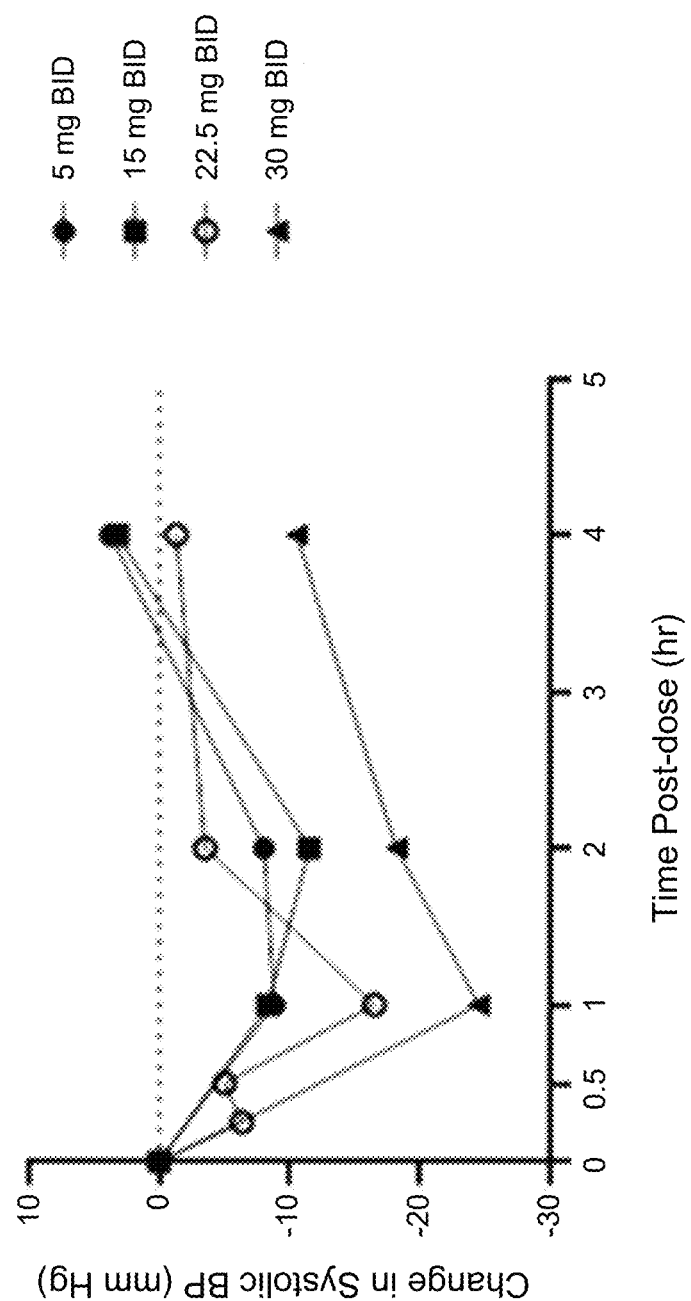
FIG. 8, Panel A illustrates effects of Compound 1 on systolic blood pressure reduction in the DME patients. Panel B illustrates effects of Compound 1 alone and in combination with ranibizumab on systolic blood pressure reduction in the DME patients. Panel C illustrates effects of Compound 1 on systolic blood pressure reduction in patients with baseline systolic pressures of 140 mm Hg or greater versus patients with baseline systolic pressures of less than 140 mm Hg.
Figure 8B:
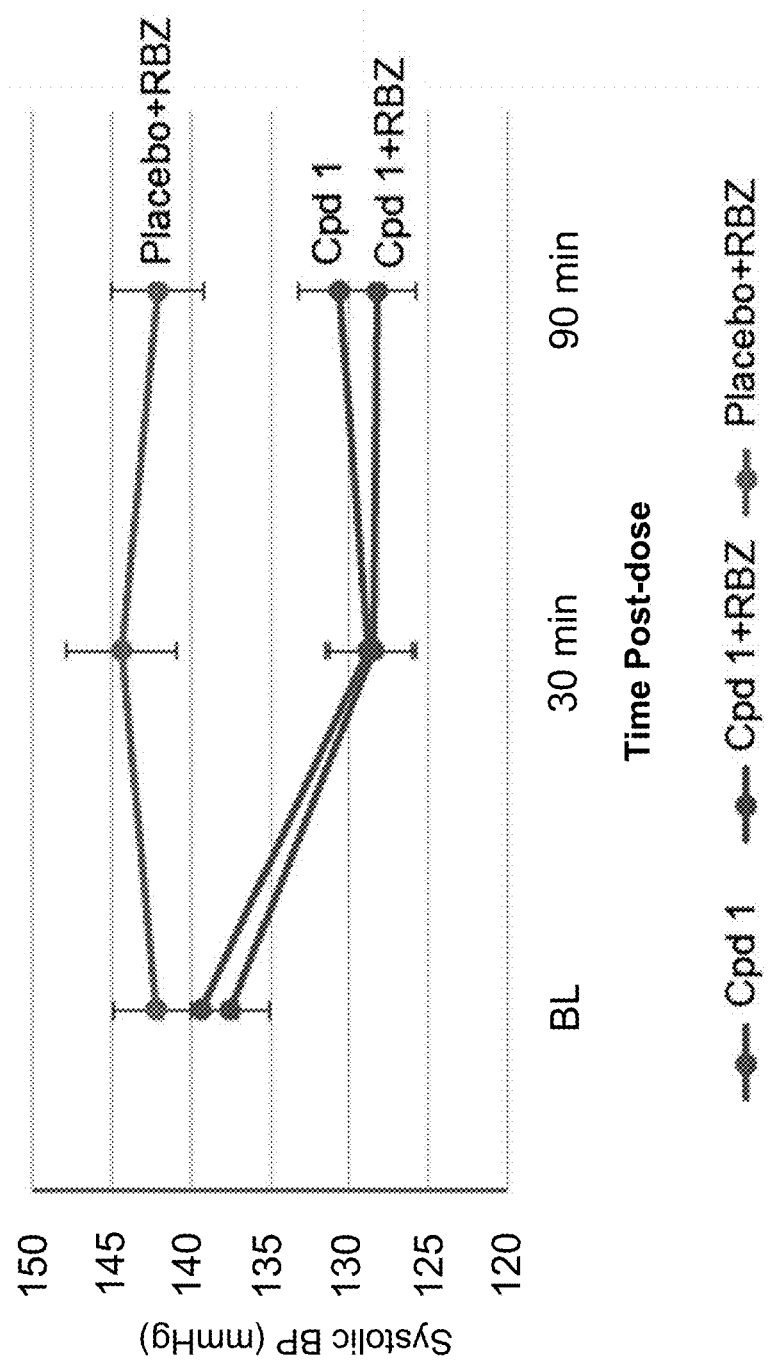
Figure 8C:
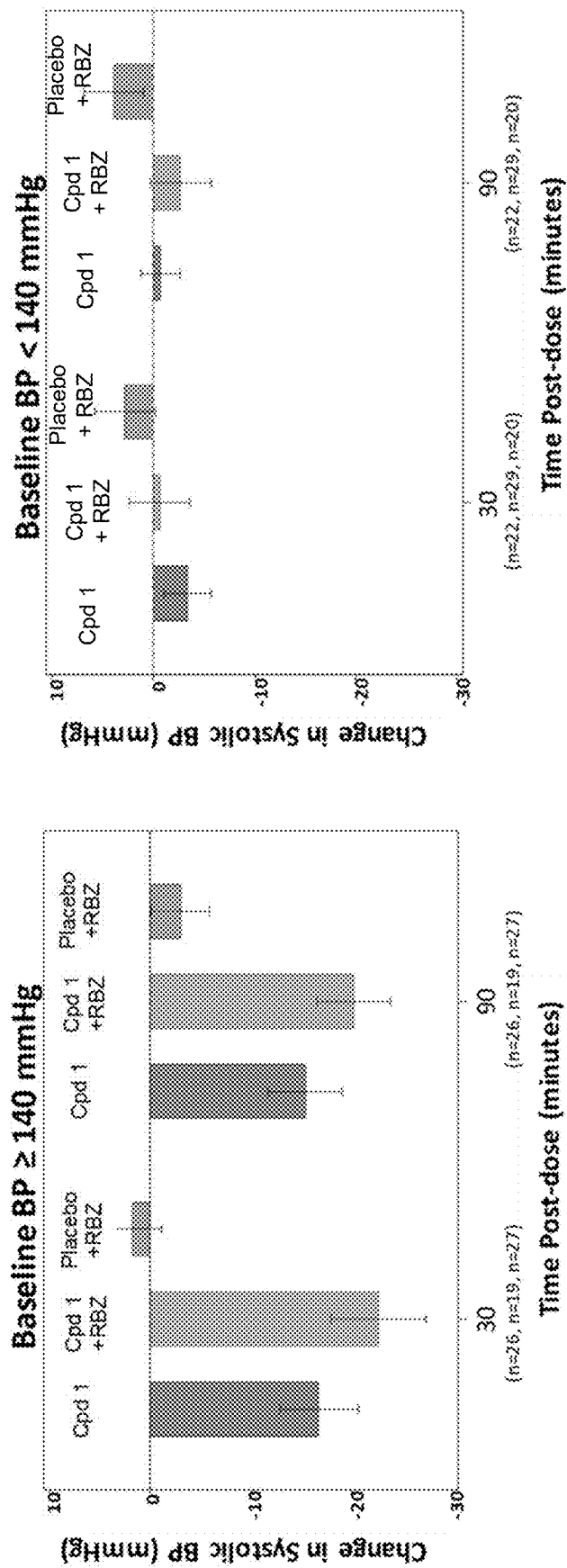

SC administration of Compound 1 resulted in a transient, dose dependent reduction in blood pressure. FIG. 8, Panel A illustrates a dose dependent, transient blood pressure reduction in the Phase 1b study. This result corresponded with the plasma concentration profile consistent with eNOS activation downstream of Tie-2. The blood pressure reduction at the 15 mg dose in the Phase 1 study was reproduced in the Phase 2 study (FIG. 8, Panel B) and the Phase 2b study (data not shown). In the Phase 2 study, a greater reduction in systolic blood pressure was observed in patients with baseline systolic BP≥140 mm Hg (left side) versus those with baseline systolic BP<140 mm Hg (right side) as illustrated in FIG. 8, Panel C. The study groups were as follows: Compound 1 at 15 mg BID only; Compound 1 at 15 mg BID+ranibizumab (RBZ); and placebo BID+ranibizumab (RBZ). The magnitude of blood pressure reduction with Compound 1 was dependent on baseline blood pressure in each of the three studies. This relationship is illustrated in FIG. 8, Panel C, where the bulk of the reduction in blood pressure occurred in patients with baseline systolic pressures of 140 mm Hg or greater. A small change in blood pressure was observed in patients with baseline systolic pressures of less than 140 mm Hg. This reduction in blood pressure is consistent with improved endothelial function in these hypertensive patients with diabetes. Improved endothelial function can be beneficial in patients with ARDS and COVID-19.

Figure 9:
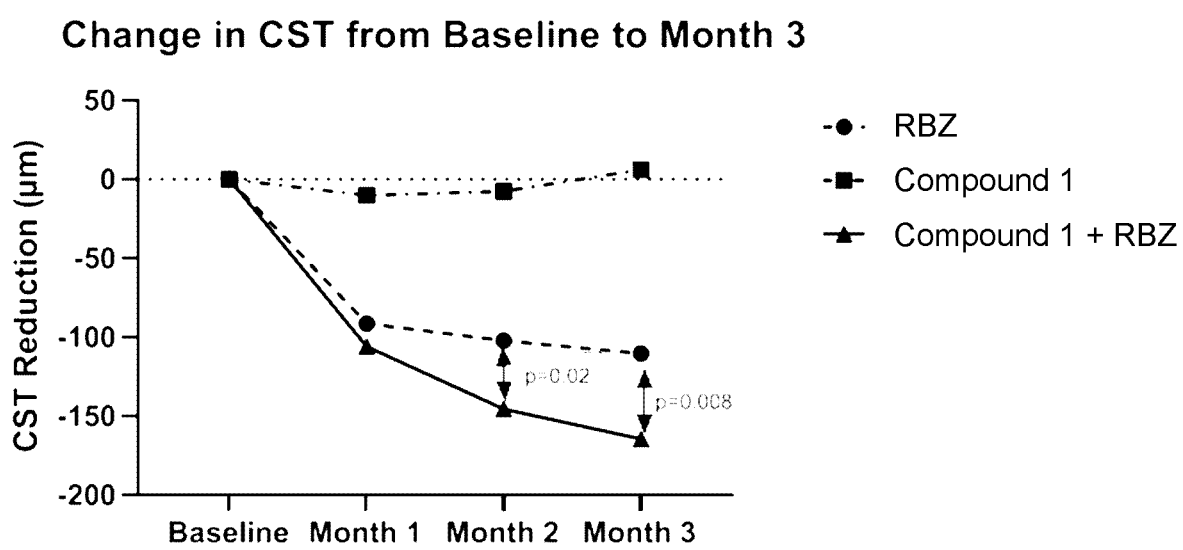
FIG. 9 illustrates effects of Compound 1 alone and in combination with ranibizumab on reduction of central subfield thickness of retina in DME patients.

In the Phase 2 study in patients with DME, SC Compound 1, 15 mg BID combined with monthly intravitreal injections of standard-of-care ranibizumab (Lucentis®) resulted in a highly statistically-significant reduction in retinal thickness compared to ranibizumab alone. DME patients were treated with three monthly intravitreal injections of ranibizumab, Compound 1, 15 mg SC BID, or Compound 1, 15 mg SC BID+monthly intravitreal injections of ranibizumab. FIG. 9 illustrates effects of Compound 1 alone and in combination with ranibizumab (RBZ) on reduction of central subfield thickness (CST) of retina in DME patients. 15 mg SQ BID Compound 1 demonstrated an additive effect atop ranibizumab for reduction of CST. Combination of daily SC Compound 1 plus monthly intravitreal ranibizumab reduced macular edema significantly more than ranibizumab alone.

Figure 10:
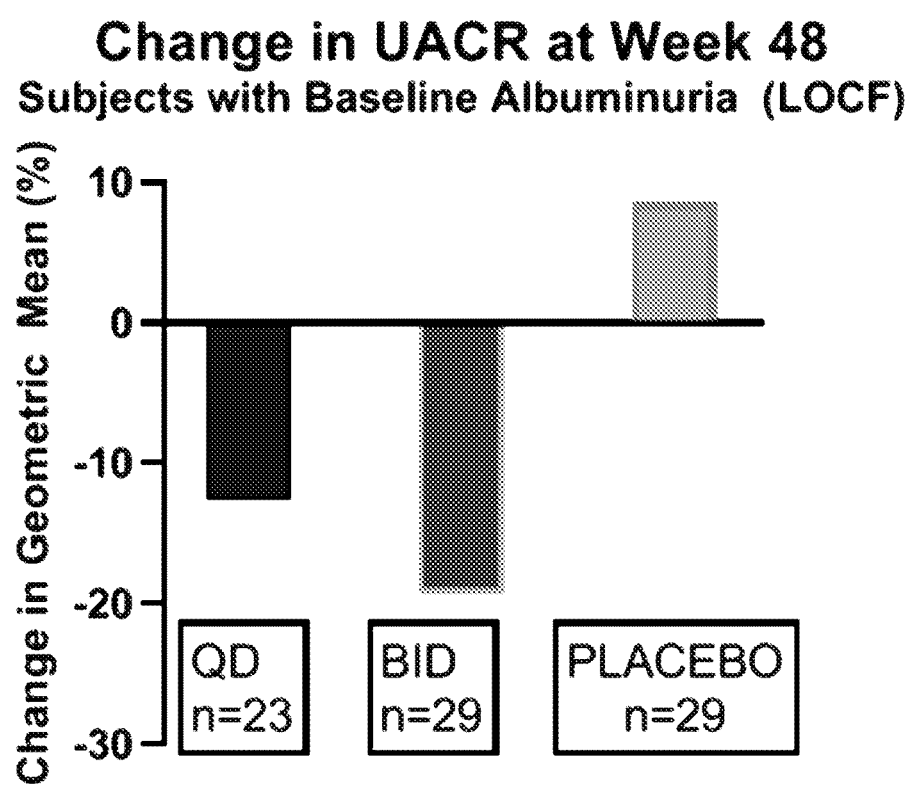
FIG. 10 illustrates effects of Compound 1 on urinary albumin/creatinine ratio (UACR).

In patients with evidence of diabetic nephropathy (i.e., urine albumin/creatinine ratio [UACR]≤30 mg/g), Compound 1 reduced UACR by about 20% compared to an increase in patients treated with ranibizumab alone. The result indicates a potential beneficial effect on renal function. In a subsequent Phase 2b study in patients with non-proliferative diabetic retinopathy, SC Compound 1, 15 mg once or twice daily for 48 weeks, resulted in a dose depended reduction in UACR, in patients with significant baseline albuminuria (UACR>30 mg/g) of up to 20% with BID dosing compared to an increase in patients receiving placebo (FIG. 10). The 20% reduction in UACR observed in the Phase 2 and Phase 2b studies is consistent with other interventions that result in long term renal protection and reduction of progression to end stage renal disease. Thus, the evidence of target engagement indicated by the blood pressure effect and evidence of vascular stabilizing efficacy suggested by the beneficial effects in the diabetic retina and kidney support a Compound 1, 15 mg dose for treatment of ARDS or COVID-19.

FIG. 10 illustrates effects of Compound 1 on UACR, a marker of kidney glomerular hyperpermeability. Once daily (QD) or twice daily (BID) administration of Compound 1 reduced urinary protein leakage in diabetics (LOCF=last observed value carried forward). Patients in the Phase 2b study were randomized equally to SC placebo or Compound 1, 15 mg once or twice a day. UACR was measured at baseline every three months including at 48 weeks end of study. Patients with baseline UACR≥30 mg/mL were included in the analysis.

Example 6. Clinical Trial of SQ Compound 1 for the Prevention of Worsening Lung Function in Acute Non-Cardiogenic Hypoxemic Respiratory Failure A multi-center, placebo-controlled, double-blind, randomized clinical trial is conducted to assess the reduction in likelihood of hypoxemia progression in patients receiving mechanical ventilation for acute non-cardiogenic hypoxemic respiratory failure who do not meet criteria for moderate-to-severe ARDS. The patient population is adults on invasive mechanical ventilation with acute non-cardiogenic hypoxemic respiratory failure, defined as a $PaO_2/FiO_2$ (P:F) ratio of <300 mm Hg, who do not fulfill the Berlin criteria for moderate-to-severe ARDS. This population includes patients with non-cardiogenic hypoxemic respiratory failure without ARDS (i.e., those with acute hypoxemic respiratory failure without bilateral pulmonary infiltrates) and those with mild ARDS by the Berlin criteria. Patients with hypoxia due to cardiogenic pulmonary edema or fluid overload are excluded. Patients with moderate-to-severe ARDS (i.e., P:F ratio <200 mm Hg with bilateral pulmonary infiltrates) are excluded because these patients have already progressed to a pathophysiological state of severe pulmonary vascular leakage (prophylaxis is no longer possible). Patients are enrolled within 24 hours of meeting criteria for inclusion criteria. Eligibility criteria are listed below.

Figure 11:
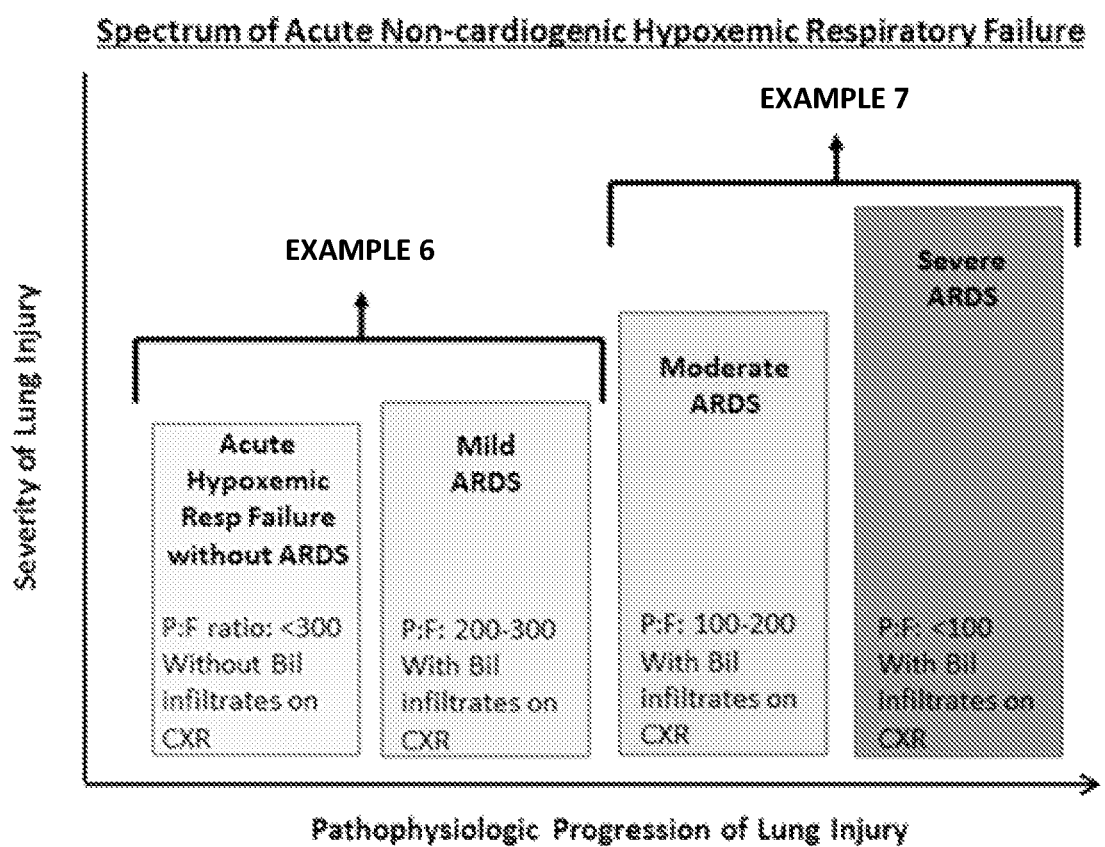
FIG. 11 illustrates the pathophysiologic progression of lung injury.

Inclusion Criteria:
1. Age≥18 years
2. Invasive mechanical ventilation, defined as positive pressure ventilation through an endotracheal tube or tracheostomy
3. Respiratory failure not fully explained by cardiac failure or fluid overload; an objective assessment (e.g., echocardiography) is needed to exclude hydrostatic edema if none of the following ARDS risk factors occur in the prior 7 days: pneumonia, aspiration of gastric contents, inhalational injury, drowning, non-pulmonary sepsis, trauma, pancreatitis, burn, non-cardiogenic shock, drug overdose, and multiple blood product transfusions
4. $PaO_2/FiO_2$ ratio≤300 mm Hg with PEEP≥5 cm $H_2O$ must be confirmed within 4 hours of initiating study medication Exclusion Criteria:
1. Lack of informed consent for trial participation
2. Inability to initiate study medication within 24 hours of meeting inclusion criteria
3. Pregnant
4. Breast feeding
5. Prisoner
6. Patient fulfills the Berlin criteria for moderate-to-severe ARDS, including bilateral pulmonary infiltrates and $PaO_2/FiO_2$ ratio <200 mm Hg
7. Norepinephrine infusion ≥10 µg/min (or equivalent dosing of alternative vasopressors)
8. Lung transplant recipient
9. Cystic fibrosis
10. WHO Class III or IV pulmonary hypertension
11. Currently receiving extracorporeal therapy
12. Chronic respiratory failure, defined as home oxygen use or $PaCO_2$>60 mm Hg in the outpatient setting
13. Chronic invasive mechanical ventilation prior to hospital admission
14. Severe chronic liver disease defined as a Child-Pugh score ≥12
15. Decision to withhold life-sustaining treatment (decision to withhold CPR only in event of a cardiac arrest does not fulfill this exclusion criterion)
16. Moribund patient not expected to survive 24 hours in the opinion of the treating clinical team
17. Unwillingness of treating clinicians to utilize low tidal volume ventilation of approximately 6 mL/kg of ideal body weight
18. Enrollment in another trial with an IND in the previous 30 days
19. Previous allergic reaction to Compound 1
20. Previous enrollment in this trial FIG. 11 illustrates the spectrum of illness for acute non-cardiogenic hypoxemic respiratory failure from least severe to most severe: acute hypoxemic respiratory failure without ARDS, mild ARDS, moderate ARDS, and severe ARDS. This pathophysiologic progression of lung injury is based on $PaO_2/FiO_2$ ratio (P:F ratio) and presence of bilateral pulmonary infiltrates (Bil infiltrates) as determined by chest X-ray (CXR). The study described in EXAMPLE 6 includes patients early in the course of pathophysiologic progression, including those with hypoxemia without bilateral pulmonary infiltrates and those with mild ARDS. The study described in EXAMPLE 7 includes patients with more advanced ARDS pathophysiology, including those with moderate and severe ARDS.

Non-limiting examples of strategies for defining a population of patients at risk for moderate-to-severe ARDS include the Lung Injury Prediction Score (LIPS) and ICU admission with a predisposing condition for lung injury. In this trial, eligible patients have acute non-cardiogenic hypoxemic respiratory failure on mechanical ventilation. The goal of increasing the severity of illness required for trial entry compared to prior prevention trials can be to increase the risk of worsening lung function among patients in the placebo group (prognostic enrichment).

Dosing Schedule: The dosing is SC administration of 15 mg or 30 mg Compound 1 three times daily (TID), every 8 hours (q8h) for 3 days (72 hr) or 7 days.

Safety of SQ Compound 1 is assessed in the target population, for example, patients receiving mechanical ventilation for acute non-cardiogenic hypoxemic respiratory failure who do not meet criteria for moderate-to-severe ARDS. These patients are at high risk for severe pulmonary vascular leakage and fulminant ARDS, but have not yet progressed to the most advanced stages of disease. The study assesses whether early use of Compound 1 in these patients reduces a likelihood of more severe lung injury via Tie-2 receptor activation and resultant decreased pulmonary vascular leakage.

Efficacy of SQ Compound 1 is assessed based on improvements in oxygenation and prevention of moderate-to-severe ARDS in this target population. The primary outcome is a change in oxygenation index, an established measure of lung function in mechanically ventilated patients with respiratory failure. As such, the results of this study can determine the extent to which Tie-2 activation can stabilize or even improve oxygenation in patients with acute hypoxemic respiratory failure who are at high risk for developing moderate-to-severe ARDS. The study can also examine whether Tie-2 activation with Compound 1 in patients early in the course of pathophysiologic progression from hypoxia to fulminant ARDS can reduce a likelihood of the most severe forms of lung injury (FIG. 11). The Phase 2 trial can also define safety of the SQ formulation in this vulnerable population. This SQ program can lead to development of a portable, easy-to-administer formulation for use in mass exposures in the field and in other resource-limited settings.

Patients randomized to the intervention arm can receive Compound 15 mg by SC injection every 8 hours for 72 hours (9 doses). Patients randomized to the control arm receive matching placebo by SC injection every 8 hours for 72 hours (9 doses). Vital signs and clinical status are closely monitored in an ICU setting for all enrolled patients during the treatment phase of the trial. Blood pressure is recorded hourly. Subsequent doses are withheld if the patient exhibits worsening hypotension (a decline in systolic blood pressure >10 mm Hg or an increase in norepinephrine infusion by >5 µg/min) after study medication administration.

Plasma and urine samples from enrolled patients who are alive and in the hospital are collected at the following time points: baseline, 24 hours, 48 hours, 72 hours, and 7 days. The samples are banked at enrolling sites and later shipped to the central study laboratory for measurement of: Ang-2, Ang-1, IL-6, IL-8, and TNFα.

Study procedures: After written informed consent for trial participation, patients are randomized in a 1:1 ratio to Compound 1 or matching placebo. Randomization is completed using the REDCap electronic randomization tool and is performed in permuted blocks of 2 and 4, stratified by enrolling site. Study group assignment is blinded to patients, clinicians, and investigators. Study pharmacists at each site are unblinded. Data to calculate oxygenation index, $PaO_2$/$FiO_2$ ratio, acute lung injury score, and SOFA score are collected at baseline (between randomization and initiation of study medication), 24 hours, 48 hours, 72 hours, and 7 days. The first dose of study drug (Compound 1 vs placebo) is administered as soon as possible after randomization, and must begin within 24 hours of the patient first meeting inclusion criteria. Patients are assessed daily for adverse events through hospital discharge. Patients are contacted at 28 days (in-person if still in the hospital or by telephone if discharged). During the 28-day assessment, investigators collect data on vital status, return hospital visits, and recurrence of invasive mechanical ventilation.

Compared with placebo, intermittent SC administration of Compound 1 to adults at risk for moderate-to-severe ARDS is assessed for improvement in lung function as measured by a change in oxygenation index during the first 72 hours of therapy. The trial design is multicenter, two-arm, parallel group, blinded RCT with 1:1 allocation of Compound 1, 15 mg subcutaneously every 8 hours for 72 hours versus matching placebo.

Figure 12:
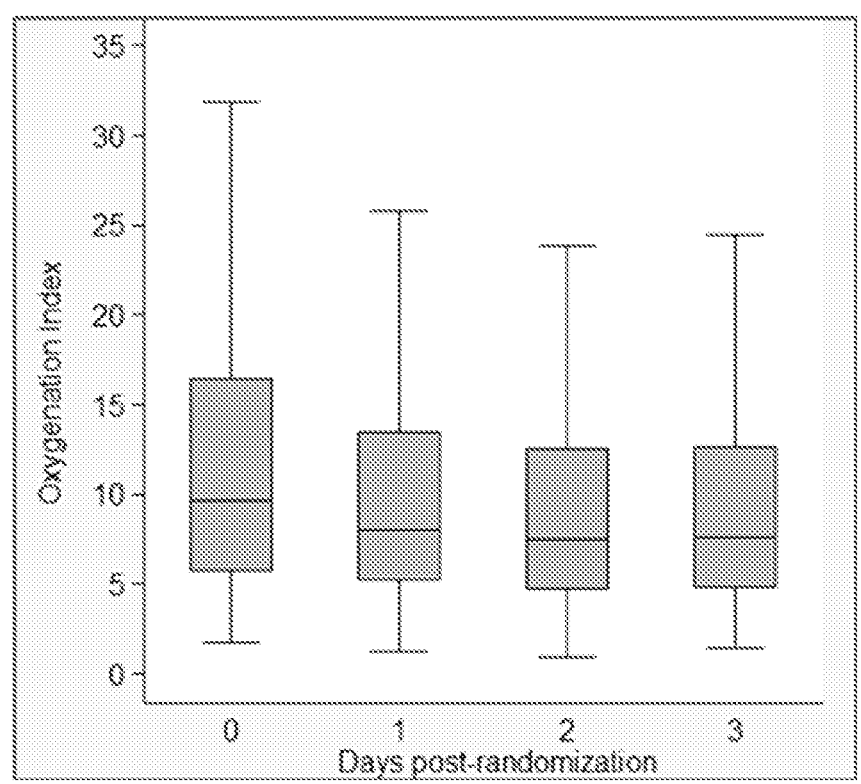
FIG. 12 illustrates example oxygenation index data from three ARDS Network trials.

Primary outcome: The primary outcome is the change in oxygenation index between baseline and 72 hours. FIG. 12 illustrates example oxygenation index data for 72 hours after randomization from three ARDS Network trials (ALTA, EDEN, OMEGA), which included patients with a $PaO_2$/$FiO_2$ ratio of <300 mm Hg. These data demonstrate that in the absence of effective treatment of pulmonary vascular leakage, oxygenation index improved from baseline to Day 1 and Day 2 but remained impaired through Day 3.

Clinical developments in the course of ARDS treatment that could obscure the association between the intervention and the primary outcome (oxygenation index during the 72 hours of drug delivery) include the following: death within 72 hours (competing risk of death); liberation from mechanical ventilation within 72 hours (competing risk of extubation); prone ventilation as a therapy for ARDS; extracorporeal membrane oxygenation (ECMO) as a therapy for ARDS; and epoprostenol as a therapy for ARDS. Each of these occurrences is prospectively tracked and handled as follows. Patients who die prior to 72 hours can be assigned their worst (highest) oxygenation index carried forward. Patients who are liberated from invasive mechanical ventilation prior to 72 hours can have their best (lowest) oxygenation index carried forward. The trial protocol includes criteria for proning, ECMO, and epoprostenol use so these therapies are used in a standardized manner in both the intervention and control arm. Sensitivity analyses include patients who do not receive proning, ECMO, or epoprostenol therapy during the 72-hour intervention period.

Secondary outcomes include: (1) development of moderate-to-severe ARDS by Berlin Criteria within 7 days; (2) change in oxygenation index between baseline and 7 days; (3) change in $PaO_2$/$FiO_2$ ratio between baseline and 72 hours and between baseline and 7 days; (4) change in acute lung injury score between baseline and 72 hours and between baseline and 7 days; (5) change in SOFA score between baseline and 72 hours and between baseline and 7 days; (6) ventilator-free days to Day 28; (7) ICU-free days to Day 28; (8) mortality within 72 hours, 7 days, and 28 days; (9) liberation from mechanical ventilation within 72 hours, 7 days, and 28 days; (10) change in plasma Ang-2 concentration between baseline and 72 hours and between baseline and 7 days; (11) change in plasma Ang-2/Ang-1 ratio between baseline and 72 hours and between baseline and 7 days; and (12) change in plasma concentrations of markers of systemic inflammation, including IL-6, IL-8, and TNFα.

Modulation of blood pressure is assessed in trial participants. Prior safety data with SQ Compound 1 showed mild and transient reduction in systolic blood pressure by ~5 mm Hg that is related to the drug's rapid absorption and circulating $C_{max}$. This pharmacologic effect of Compound 1 could indicate eNOS activation downstream of Tie-2. The studies can be used to determine whether a hypotensive effect is attenuated or well-tolerated in patients with respiratory failure and even improve lung function via attenuation of hypoxia-induced pulmonary vasoconstriction. SC intermittent dosing can facilitate use in forward positions in military settings and in broader patient populations outside the ICU in both military and civilian hospitals.

Post-hoc stratified analyses with Ang-2 and Ang-1 biomarkers are conducted to inform enrichment and monitoring for future trials. Samples can be collected for pharmacokinetic, pharmacodynamic, and further exploratory studies.

Statistical Plan and Data Analysis

The main goal of this study is to determine whether Compound 1 has potential for safely reducing a likelihood of worsening lung function in patients at risk for moderate-to-severe ARDS. The change in oxygenation index between baseline (pre-treatment) and the end of the 72-hour treatment period ($\Delta OI$) is the primary outcome measure as a sensitive indicator of progression of lung injury. Occurrence of moderate-to-severe ARDS and mortality can be quantitated to facilitate design of a subsequent Phase 3 study.

Initial analysis characterizes participants stratified by treatment group. Characteristics include demographics, medical history, and clinical and laboratory data. Continuous data are described using means and standard deviations or medians and ranges as appropriate. Categorical data are described using frequencies and proportions. Next, descriptive statistics documenting fidelity to the treatment protocol and ability to follow participants for primary and secondary endpoints are provided. Safety is assessed by documenting related adverse events. Rates are presented with 95% confidence intervals.

Example 7. Trial of IV Compound 1 for the Treatment of Moderate-to-Severe ARDS

An IV formulation of Compound 1 is developed and used to conduct a human study for safety, tolerability, and pharmacokinetics. An IV Compound 1 formulation suitable for clinical testing is used to establish pharmacokinetics and maximally-tolerated dose in healthy volunteers to examine safety and tolerability.

Dosing Schedule: The dosing is IV administration of 15 mg Compound 1 three times daily (TID), q8h for 3 days (72 hr).

Safety of IV Compound 1 is assessed in the target population, for example, patients having moderate-to-severe ARDS. Efficacy of IV Compound 1 is assessed based on improvements in oxygenation levels in this target population. Post-hoc stratified analyses with Ang-2 and Ang-1 biomarkers can be conducted to inform enrichment and monitoring for future trials. Samples can be collected for pharmacokinetic, pharmacodynamic, and further exploratory studies.

Thereafter, a multi-center, placebo-controlled, double-blind, randomized clinical trial is initiated to assess treatment of moderate-to-severe ARDS as defined by the Berlin Criteria. This patient population can be more unstable than patients with acute respiratory failure who do not have moderate-to-severe ARDS. In this setting, IV infusion can allow a greater flexibility and control in dosing at a rate that can help optimize safety in this population.

A prototype formulation for IV administration was developed and preliminary non-GLP non-clinical dose ranging studies, including pharmacokinetic (PK) assessments, were conducted. Initial PK analysis indicates a PK profile ideal for IV administration with plasma concentrations during a 2-hour infusion quickly reaching steady state after the initiation of the infusion and rapidly falling following cessation. This profile is consistent with the rapid clearance of Compound 1 seen in previous non-clinical PK studies using IV and SC injection. This PK profile for the IV infusion can allow for rapid adjustment of exposures, up or down, in critically ill and hemodynamically unstable patients in the ICU setting. In addition, initial non-clinical dose ranging studies indicate exposures of greater than 10-fold the intended clinical exposures may be well tolerated in the proposed pivotal non-clinical safety studies.

The in vitro, PK, and toxicology studies related to the 3-day IV infusion dosing of Compound 1 in human clinical trials, administered as 1 to 2-hour IV infusions TID for 3 days, are listed below. Compound 1 is formulated in a 10% HPBCD formulation of doses ≤30 mg/kg/dose BID (60 mg/kg/day).

- An in vitro assessment of blood hemolysis, flocculation, and platelet activation.
- A rat or dog non-GLP 7-day TID IV infusion dose range-finding study to characterize the PK and toleration of Compound 1 in the HPBCD formulation administered by IV infusion (2 hr) TID, at a range of doses up to the maximum tolerated daily dose observed in prior IV infusion toleration studies (60 mg/kg/day).
- A rat or dog GLP 14-day TID IV infusion toxicity study to characterize the toxicity and toxicokinetics of Compound 1 in the 10% HPBCD vehicle formulation. The vehicle and Compound 1 formulation is administered by IV infusion (2 hr) TID, and at Compound 1 doses informed by the non-GLP 7-day toleration study. The systemic safety of Compound 1 in a 10% HPBCD formulation administered by SC injection is outlined in EXAMPLE 6. Therefore, a single-species toxicity study can bridge safety for the different route of administration and can closely evaluate the effects of IV infusion exposure on previously-identified target organs and on the local injection site.

Initial Safety Study

Trial Design: A single center, double blind, placebo controlled, three-cohort, ascending dose trial in healthy volunteers is conducted to determine the safety, tolerability, and PK of up to three single-ascending doses of Compound 1 delivered as a single two-hour continuous infusion.

Population: Healthy Volunteers

Key Inclusion Criteria: The study can enroll healthy, non-smoking, male and female subjects 18-55 years of age (inclusive) with a body mass index (BMI) between 18.0 and 32.0 kg/m$^2$ (inclusive). All subjects can be required to sign an informed consent form.

Key Exclusion Criteria: Pregnant females, subjects who refuse using the required contraception measures over the prescribed time frame, Subjects with a history of symptomatic orthostatic hypotension, vaso-vagal syndrome, syncope or presyncope within one year prior to screening, diastolic blood pressure <60 mm Hg or systolic blood pressure <105 mm Hg at screening.

Intervention Groups: Three single-ascending doses of Compound 1 delivered by IV infusion over 2 hours. Groups can consist of 8 healthy volunteers randomized 3:1 to Compound 1 or placebo. Proposed doses are 15 mg, 30 mg, and 45 mg. However, these doses can be modified based on tolerability/safety or PK in the non-clinical studies or the tolerability or PK in the previous dose cohort.

Study procedures: Key study procedures are outlined in the following steps:
1. Enrollment of subjects using the inclusion/exclusion criteria defined by the protocol including medical and medication history, vital signs, and laboratory analysis to assess the health status.

2. Subjects domiciled within the clinical site from the evening prior to the dose administration until the final study procedures are completed (a total of at least 24 hours).
3. Administration of IV infusion doses based on the randomization schedule.
4. Collection of PK samples at specified times during and after the dose administration.
5. Collection of safety parameters including vital signs, lab samples, and AE monitoring.
6. Subject discharge after all the study procedures are completed.

Primary outcome: Safety including adverse events, vital signs, and laboratory assessments.

Secondary outcomes include: Pharmacokinetic parameters of Compound 1 determined from individual subject plasma concentration-time profiles. The key parameters are listed in the analysis plan below.

Overview: A 60-patient, randomized, controlled trial is developed to assess the safety and efficacy of Compound 1 administered by IV infusion to adults with moderate-to-severe ARDS for improving lung function. This treatment trial complements the prophylaxis trial outlined in EXAMPLE 6 by expanding trial data to an IV formulation of Compound 1 and to a more severely ill patient population with established moderate-to-severe ARDS. As described in EXAMPLE 6, SC Compound 1 for the prevention of severe lung injury among patients at high-risk for decompensation of lung function can be evaluated. Additionally, IV formulation of Compound 1 for the treatment of established moderate-to-severe ARDS is evaluated.

Dosage Form: Similar to EXAMPLE 6, the drug product active dosage form is Compound 1 solubilized at 20 mg/mL in 10% HPBCD and presented as a lyophilized product in a vial. Product is reconstituted aseptically on site with a sterile solution containing 5% dextrose (D5 or equivalent) to the 20 mg/mL Compound 1 concentration for IV infusion. The dosage form permits dose escalation (e.g., 10 mg, 30 mg, and 45 mg) based on amount of reconstituted 20 mg/mL drug product material infused. The placebo dosage form is a vial containing a lyophilized aliquot of 10% HPβCD, equivalent to the amount of active product lyophilized. The placebo is reconstituted aseptically on site with a sterile solution containing 5% dextrose (D5 or equivalent) to the original 10% HPBCD concentration for IV infusion.

Rationale for IV dosing: The rationale for IV infusion in this treatment trial includes maintenance of a consistent serum level in patients potentially most vulnerable to toxicities at high serum levels and loss of efficacy at lower serum levels.

Trial Design: A multicenter, two-arm, parallel group, blinded RCT with 1:1 allocation of Compound 1 versus placebo administered by IV infusion every 8 hours for 72 hours (9 doses).

Population: Adults on invasive mechanical ventilation with moderate-to-severe ARDS by the Berlin Criteria. Patients can be enrolled within 48 hours of meeting criteria for moderate-to-severe ARDS. Eligibility criteria are listed below.

Inclusion Criteria:
1. Age ≥18 years
2. Invasive mechanical ventilation, defined as positive pressure ventilation through an endotracheal tube or tracheostomy
3. Bilateral pulmonary opacities on chest radiograph or computed tomography not fully explained by effusions, lobar/lung collapse or nodules
4. Respiratory failure not fully explained by cardiac failure or fluid overload; an objective assessment (e.g., echocardiography) is needed to exclude hydrostatic edema if none of the following ARDS risk factors occurred in the prior 7 days: pneumonia, aspiration of gastric contents, inhalational injury, drowning, non-pulmonary sepsis, trauma, pancreatitis, burn, non-cardiogenic shock, drug overdose, multiple blood product transfusions
5. $PaO_2/FiO_2$ ratio ≤200 mm Hg with PEEP ≥5 cm $H_2O$. A $PaO_2/FiO_2$ ratio ≤200 mm Hg must be confirmed within 4 hours of initiating study medication.

Exclusion Criteria:
1. Lack of informed consent for trial participation
2. Inability to initiate study medication within 48 hours of meeting inclusion criteria
3. Pregnant
4. Breast feeding
5. Prisoner
6. Norepinephrine infusion ≥50 µg/min (or equivalent dosing of alternative vasopressors)
7. Lung transplant recipient
8. Cystic fibrosis
9. WHO Class III or IV pulmonary hypertension
10. Currently receiving extracorporeal therapy
11. Chronic respiratory failure, defined as home oxygen use or $PaCO_2$>60 mm Hg in the outpatient setting
12. Chronic invasive mechanical ventilation prior to hospital admission
13. Severe chronic liver disease defined as a Child-Pugh score ≥12
14. Decision to withhold life-sustaining treatment (decision to withhold CPR only in event of a cardiac arrest does not fulfill this exclusion criterion)
15. Moribund patient not expected to survive 24 hours in the opinion of the treating clinical team
16. Unwillingness of treating clinicians to utilize low tidal volume ventilation of approximately 6 mL/kg of ideal body weight
17. Enrollment in another trial with an IND in the previous 30 days
18. Previous allergic reaction to Compound 1
19. Previous enrollment in this trial or the prior Compound 1 prevention trial Intervention Groups: Patients randomized to the intervention arm receive Compound 1 by IV infusion for 72 hours. Dosing is determined from results described in EXAMPLE 6. Administration occurs every 8 hours (9 doses over 72 hours). Patients randomized to the control arm receive placebo fluid (plasmalyte-A) by IV infusion. Vital signs and clinical status are closely monitored in an ICU setting during treatment. Blood pressure is recorded hourly. Subsequent doses can be withheld if the patient exhibits worsening hypotension (a decline in systolic blood pressure >10 mm Hg or an increase in norepinephrine infusion by >5 µg/min) after study medication administration.

Biological sample collection: Plasma and urine samples are collected from enrolled patients who are alive and in the hospital at the following time points: baseline, 24 hours, 48 hours, 72 hours, and 7 days. The samples are banked at enrolling sites and later shipped to the central study laboratory for measurement of: Ang-1, Ang-2, IL-6, IL-8, TNFα, soluble Tie2, CRP, and D-dimer.

Study procedures: After written informed consent for trial participation, patients are randomized in a 1:1 ratio to IV Compound 1 or matching placebo. Randomization is completed using the REDCap electronic randomization tool and is performed in permuted blocks of 2 and 4, stratified by enrolling site. Study group assignment is blinded to patients, clinicians, and investigators. Study pharmacists at each site can be unblinded. Data to calculate oxygenation index, $PaO_2/FiO_2$ ratio, acute lung injury score, and SOFA score are collected at baseline (between randomization and initiation of study medication), 24 hours, 48 hours, 72 hours, and 7 days. Administration of the first dose of study drug (Compound 1 vs placebo) begins as soon as possible after randomization, and must begin within 48 hours of the patient first meeting inclusion criteria and within 4 hours of a confirmed $PaO_2/FiO_2$ ratio of <200 mm Hg. Patients are assessed daily for adverse events through hospital discharge. Patients are contacted at 28 days (in-person if still in the hospital or by phone if discharged). During the 28-day assessment, investigators collect data on vital status, return hospital visits, and recurrence of invasive mechanical ventilation.

Outcome: Similar to the prophylaxis trial described in EXAMPLE 6, the primary outcome in this treatment trial is change in oxygenation index between baseline and 72 hours. Secondary outcomes include: (1) change in oxygenation index between baseline and 7 days; (2) change in $PaO_2/FiO_2$ ratio between baseline and 72 hours and between baseline and 7 days; (3) change in acute lung injury score between baseline and 72 hours and between baseline and 7 days; (4) change in SOFA score between baseline and 72 hours and between baseline and 7 days; (5) ventilator-free days to Day 28; (6) ICU-free days to Day 28; (7) mortality within 72 hours, 7 days, and 28 days; (8) liberation from mechanical ventilation within 72 hours, 7 days, and 28 days; (9) change in plasma Ang-2 concentration between baseline and 72 hours and between baseline and 7 days; (10) change in plasma Ang-2/Ang-1 ratio between baseline and 72 hours and between baseline and 7 days; and (11) change in plasma concentrations of markers of systemic inflammation, including IL-6, IL-8, and TNFα.

Analytical Approach: The interaction between biomarker level and treatment (predictive enrichment), change in biomarker over time (response to therapy), and relationship between initial/final biomarker level (prognostic accuracy) are each modeled. Each biomarker domain—Ang-1, Ang-2, and Ang-2/Ang-1 ratio—individually, and as part of the more complex mathematical models that adjust for factors including demographics, comorbidities, illness type, and severity, are measured. The multi-marker models are examined to determine whether the models hold enrichment, response to therapy, or prognostic potential.

Additional biosample analyses is conducted to: (a) compare angiopoietin measurements against cytokines linked to ARDS pathogenesis: TNFα, IL-1, and IL-6; (b) comparing angiopoietin measurements against a larger set of endothelial markers that are also linked to critical illness: soluble ectodomain of E-selectin (sE-selectin), sVCAM-1, and sVE-cadherin, which are associated with vascular manifestations of critical illness; (c) applying SomaScan proteomics to identify novel protein signatures associated with Compound 1 responsiveness—a technology successfully deployed in the ICU by our team; and (d) conducting pharmacokinetic analyses of SQ and IV Compound 1 in target populations.

Analysis Plan

Tables, listings, and descriptive statistics are used to assess safety data including clinical chemistry/hematology and adverse events. PK concentration-time data can be used to determine the PK parameters using non-compartmental methods and can be listed for individual subjects. Actual dosing and sampling time can be used for all calculations. The reasons for excluding any sample from the analyses can be provided. Individual subject and mean concentration-time data can be tabulated and presented graphically. The following PK parameters can be determined and summarized for each treatment using descriptive statistics:

$C_{max}$—Concentration at the end of infusion
$AUC_{last}$—Area under the curve from time zero to the last quantifiable concentration
$AUC_{inf}$—Area under the curve from time zero to infinity.
CL—Clearance
$V_d$—Volume of distribution The dose proportionality analysis can be addressed in terms of point estimates and CIs of statistical model parameters (slopes). The power model has the general equation:

$$y = \beta 0 \times \text{dose } \beta 1$$

where y represents the dependent variables, e.g., AUC and $C_{max}$. The exponent in the model can be assessed by regressing the natural log-transformed PK parameter on the natural log-transformed dose:

$$\log y = \log \beta + \beta 1 \log (\text{dose})$$

In addition, the relationship between the changes in hemodynamic variables (BP and HR) and exposure parameters can be explored using appropriate analysis.

Analysis Plan for Treatment Trial: The goal of this study is to determine whether Compound 1 has potential for improving lung function in patients with moderate-to-severe ARDS. As with the prophylaxis trial (EXAMPLE 6), the primary outcome measure is the change in oxygenation index between baseline and 72 hours (ΔOI). This measure is a sensitive indicator of improving lung function in this treatment trial (EXAMPLE 7). Analysis can then proceed as before, beginning with descriptive statistics, then characterization of safety, and finally analysis of the primary physiologic endpoint (oxygenation index).

Example 8. Trial of SQ Compound 1 for the Treatment of Moderate-to-Severe COVID-19

A Phase 2, randomized, double-blind, placebo-controlled, multi-center study can be conducted to assess the safety and efficacy of Compound 1 at doses of 15 mg or 30 mg three times daily (q8 hours) for up to 7 days in hospitalized subjects with moderate-to-severe COVID-19. The study can explore the effects of Compound 1 on biomarkers of inflammation and coagulopathy (e.g., CRP and D-dimer) in plasma of subjects with moderate-to-severe COVID-19. The study can also explore the effects of Compound 1 on biomarkers of vascular leakage and inflammation in plasma of subjects with moderate-to-severe COVID-19. (e.g., Ang-2, IL-6, IL-8, TNFα, and HMGB-1).

Primary efficacy outcomes at Day 7, or at discharge if earlier can include:

1. Mean change from baseline and proportion of subjects with clinical status ≥7 at Day 7 on the COVID-19 Ordinal Scale consisting of the following categories:
    1 is asymptomatic
    2 is "symptomatic; independent",
    3 is "symptomatic; assistance needed",
    4 is "hospitalized; no oxygen therapy", 5 is "hospitalized; oxygen by mask or nasal prongs",
6 is "oxygen by non-invasive ventilation or high flow",
7 is "intubation and mechanical ventilation, SpO2:FiO$_2$ ratio ≥200",
8 is "mechanical ventilation, SpO2:FiO$_2$ ratio <200 or vasopressors",
9 is "mechanical ventilation, SpO2:FiO$_2$ ratio <200 and vasopressors, dialysis or ECMO", and
10 is "death".
2. Days alive and ventilator free; and
3. Change from baseline in SpO2:FiO$_2$ ratio at Days 3 and 7.

Secondary outcomes can include:
1. Days alive and ventilator free at Day 28 (or discharge)
2. Mortality
3. Length of hospitalization
4. Proportion of subjects discharged without going to mechanical ventilation prior to Day 7
5. Temporal change in clinical status on the COVID-19 Ordinal Scale through Day 7 (or discharge)
6. Number of subjects at each category on the COVID-19 Ordinal Scale at Day 7
7. Mean change from baseline in clinical status on the COVID-19 Ordinal Scale at Day 7
8. Proportion of subjects who improve by ≥2 categories on the COVID-19 Ordinal Scale at Day 7
9. Proportion of subjects who worsen by ≥2 categories on the COVID-19 Ordinal Scale at Day 7
10. Number of subjects with any serious adverse events
11. Number of subjects with any treatment emergent adverse events
12. Change from baseline in CRP and D-dimer Exploratory endpoints include a change from baseline in systemic biomarkers of vascular leakage and inflammation (Ang-1, Ang-2, IL-6, IL-8, TNFα, and HMGB-1).

The study population are subjects who are at least 18 to 75 years of age with documented infection with SARS-COV-2 infection who are hospitalized and receiving standard-of-care for COVID-19. Eligible subjects must require supplemental oxygen at screening; subjects requiring mechanical ventilation at screening are not eligible.

Figure 13:
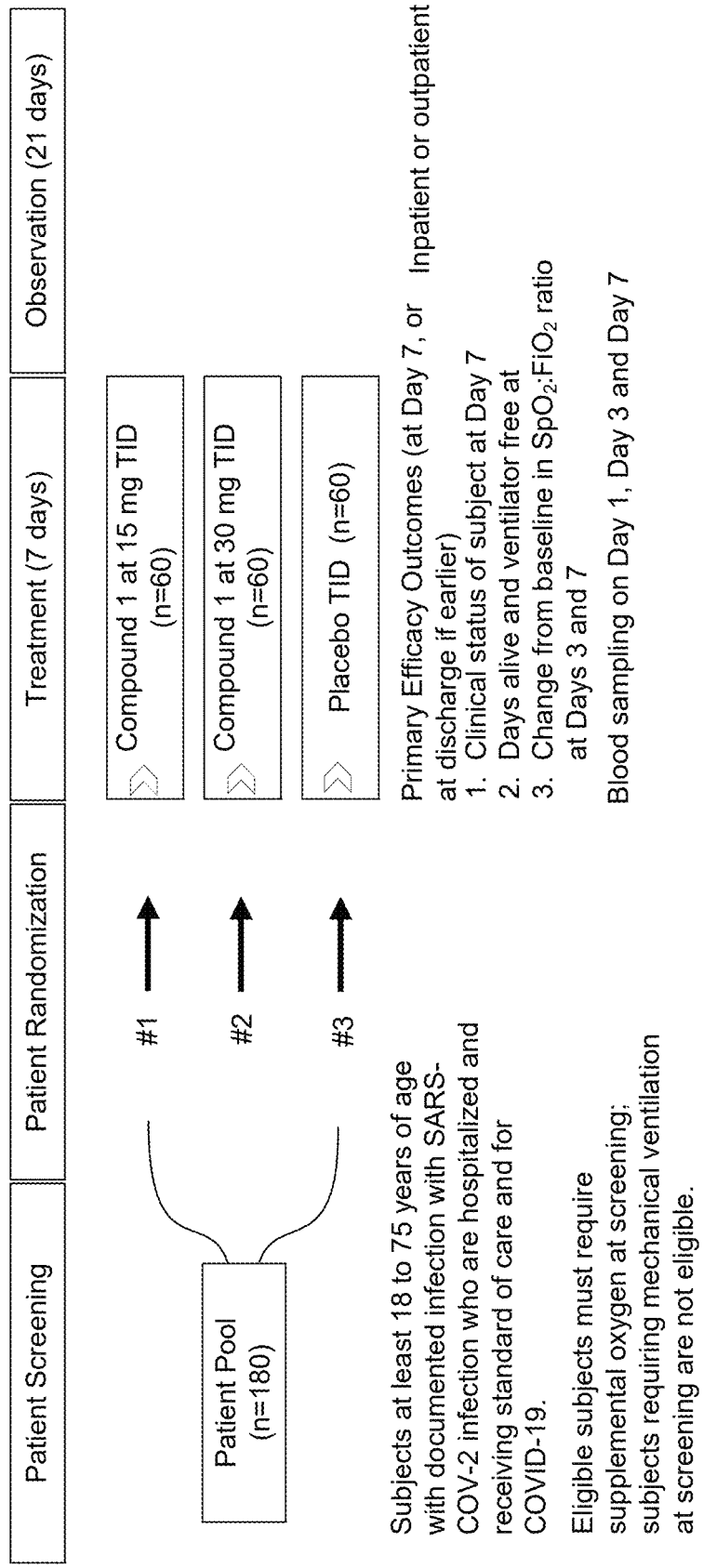
FIG. 13 shows a study design that assesses safety and efficacy of Compound 1 in subjects with moderate-to-severe COVID-19.

This study can evaluate the safety and efficacy of up to 7 days of subcutaneous Compound 1 administered either 15 mg or 30 mg three times daily (TID; q8) in subjects with moderate-to-severe COVID-19 receiving standard-of-care therapy. At Screening, subjects must require supplemental oxygen; subjects requiring mechanical ventilation at screening are not eligible. After consent for trial participation is obtained and eligibility is determined, subjects can be randomized to one of 3 treatment arms (Compound 1 at 15 mg TID, Compound 1 at 30 mg TID, or placebo TID) in a 1:1:1 ratio according to a computer generated-randomization list and stratified by site. Treatment group assignment is blinded to patients, clinicians, and investigators. Subjects are dosed in the abdomen TID for 7 days, or until discharge from hospital (or death), whichever comes first. In addition to routine clinical monitoring and laboratory assessments which are part of standard-of-care, the following can be conducted: supine BP and HR can be assessed on Day 1 prior to and following the first dose of study medication at 30 and 90 minutes, data on subject's oxygen-support requirements and adverse events can be collected through Day 7, clinical status can be assessed daily through Day 28 (or hospital discharge), and blood sampling for biomarkers associated with coagulation, inflammation, and vascular leakage (CRP and D-dimer required; optional biomarkers include Ang-1, Ang-2, IL-6, IL-8, TNFα) will occur on Day 1, Day 3, and Day 7, and once for subjects remaining hospitalized ≥Day 14. For these subjects, blood sampling for biomarkers occurs on Day 28 or day of hospital discharge whichever occurs earlier. A safety review team can conduct masked reviews of available safety data after the first 15 subjects have completed treatment (Day 7) and thereafter at increments of 25% of subjects completing treatment (Day 7). The study design is summarized in FIG. 13.

Approximately 180 subjects can be randomized (60 per treatment group) from approximately 10 sites across the United States. The duration of participation can be approximately 29 days: Screening (up to approximately 1 day), Treatment Period (7 days), Post-Treatment Observation on Day 28.

Inclusion Criteria:
1. Must have the ability to understand and provide informed consent
2. Males and non-pregnant females between 18 to 75 years of age, inclusive
3. Laboratory-confirmed SARS-COV-2 infection as determined by polymerase chain reaction (PCR) or other commercial or public health assay in any specimen, as documented by either or the following: PCR positive in sample collected <72 hours prior to randomization; OR PCR positive in sample collected ≥72 hours prior to randomization, documented inability to obtain a repeat sample (e.g. due to lack of testing supplies, limited testing capacity, results taking >24 hours, etc.) AND progressive disease suggestive of ongoing SARS-COV-2 infection
4. Currently hospitalized and receiving standard-of-care (SOC) for COVID-19
5. Requiring supplemental oxygen
6. SpO2:FiO$_2$ ratio >100 and <300
7. D-dimer >500 ng/ml Exclusion Criteria:
1. Inability to initiate study medication within 12 hours of meeting inclusion criteria
2. Females of childbearing potential who are unable or unwilling to use birth control or to forego breastfeeding through Day 28
3. Systolic blood pressure <100 mm Hg
4. Mechanically ventilated or receiving ECMO
5. In shock or requiring pressor support
6. Receiving inhaled nitric oxide or epoprostenol or similar intervention
7. Alanine Transaminase (ALT) or Aspartate Transaminase (AST) >3 times the upper limit of normal
8. Estimated glomerular filtration rate (eGFR) <30 ml/min or receiving hemodialysis or hemofiltration
9. Moribund patient not expected to survive 24 hours in the opinion of the treating clinical team
10. Have any concurrent serious medical condition (e.g. active malignancies on chemotherapy, post organ transplant, end stage congestive heart failure) or not likely to respond to treatment
11. Decision to withhold life-sustaining treatment (e.g. decision to withhold CPR only in event of a cardiac arrest does not fulfill this exclusion criterion)
12. Concurrent treatment with other agents with actual or possible direct acting antiviral activity against SARS-COV-2 is prohibited <24 hours prior to study drug dosing
13. Participation in another investigational study during the present study through the last visit (Day 28)
14. Previous enrollment in this trial For the Primary Outcomes:

Clinical Status at Day 7

Change from baseline: 60 subjects per group provides 80% power to demonstrate superiority of Active to Placebo assuming a true mean difference of 1.4, an SD of 3.0, and a 2-sided alpha=0.10.

Proportion of subjects with clinical status ≥7 (intubated): 60 subjects per group provides 80% power to demonstrate superiority of Active to Placebo in the proportion of subjects intubated assuming a true proportion of 0.098 and 0.30 in Active and Placebo respectively and a 2-sided alpha=0.05.

Days alive and ventilator free: 60 subjects per group provides 80% power to demonstrate superiority of Active to Placebo in the mean ventilator free days and alive assuming a true mean difference of 1.2 days, an SD of 2.25, and a 2-sided alpha=0.05

$SpO_2:FiO_2$ ratio: 60 subjects per group provides 80% power to demonstrate superiority of Active to Placebo in the mean CFB P/F ratio assuming a true mean difference of 41.3, an SD of 80, and a 2-sided alpha=0.05.

Study Medication: Compound 1 Ready-to-Dose Sterile Solutions for Subcutaneous Injection:

20 mg/mL sterile solution provided ready to dose—0.75 mL dose to deliver 15 mg Compound 1

40 mg/mL sterile solution provided ready to dose—0.75 mL dose to deliver 30 mg Compound 1

Placebo for Compound 1 Ready-to-Dose Sterile Solution for Subcutaneous Injection:

Placebo for Compound 1 is (sterile normal saline) sourced locally ready to dose—a 0.75 mL dose of placebo solution is administered.

Volume of Blood Drawn: Biomarker Samples collected on Screening/Day 1, Day 3, and Day 7 and once during post treatment for subjects who remain hospitalized ≥Day 14 4×6 mL). Total volume blood drawn as specified per protocol including optional biomarkers: Up to 24 mL per subject.

TABLE 4 summarizes a protocol specific schedule of assessments.

TABLE 4

Protocol Specific Schedule of Assessments

| Protocol Activities | Screening/ Baseline Day 0 | Day 1 | Day 2 | Day 3 | Day 4 | Day 5 | Day 6 | Day 7 | Post-Treatment Period Day 28 |
|---|---|---|---|---|---|---|---|---|---|
| Informed Consent | x | | | | | | | | |
| Eligibility Criteria | x | | | | | | | | |
| Demographics | x | | | | | | | | |
| Medical History | x | | | | | | | | |
| Prior and Concomitant Medications | x | x | x | x | x | x | x | x | |
| Urine Pregnancy Test [B] | x | | | | | | | | |
| SARS-CoV-2 Test | | | | | | | | | |
| Randomization | x | | | | | | | | |
| Dosing TID (Q8h) | | x | x | x | x | x | x | x | |
| BP and HR [C] | x | x | | | | | | | |
| $SpO_2:FiO_2$ [D] | x | x | x | x | x | x | x | x | |
| Clinical Status [E] | x | x | x | x | x | x | x | x | x |
| Blood sampling for CRP and D-Dimer [G] | x | | | x | | | | x | |
| Blood sampling for Optional Biomarkers [F][G] | x | | | x | | | | x | x |
| Adverse Events | | x | x | x | x | x | x | x | |
| Exit Study | | | | | | | | | x |

BP: blood pressure; HR: Heart rate
[A] Does not include routine clinical and laboratory assessments that are part of standard-of-care.
[B] In women of child-bearing potential
[C] On Day 1, BP and HR are assessed at pre-dose and 30 and 90-minutes after the first dose of study medication
[D] During Treatment Period, $SpO_2:FiO_2$ is assessed TID prior to each dose of study medication
[E] During Treatment Period, clinical status is assessed TID prior to each dose of study medication using the COVID-19 Ordinal Scale. During the Post-Treatment Period, unless discharged, clinical status is assessed once daily until Day 28. If subjects are discharged alive prior to Day 28 clinical status is assessed by a phone call
[F] Optional biomarkers include Angpt-1, Angpt-2, IL-6, IL-8, TNFα
[G] For subjects remaining hospitalized ≥Day 14, blood sampling for biomarkers will occur on Day 28 or day of hospital discharge whichever occurs earlier.

Example 9. Pharmaceutical Formulations of Compound 1

Compound 1 as the sodium salt form can be formulated in a hydroxypropyl betadex (hydroxypropyl-beta-cyclodextrin; HPBCD) solution. The solubility of Compound 1 in water is approximately 15 mg/mL. A solution of 10% HPBCD can improve the solubility of Compound 1 to approximately 48 mg/mL. A concentration of 20 mg/mL Compound 1 in 10% HPBCD can maintain a stable formulation.

A pharmaceutical composition of Compound 1 is formulated and lyophilized as described below. A composition can be prepared with 20 mg/mL Compound 1 in a vehicle containing 10.0% w/v (100 mg/mL) HPBCD. Once in solution, an aliquot is placed into a 20-mL vial and lyophilized. The lyophilized Compound 1 plus HPBCD is reconstituted utilizing commercially-available sterile fluid (i.e., sterile D5 5% Dextrose in sterile water for injection) to modify tonicity. The volume of diluent is added to achieve a 20 mg/mL solution of Compound 1. The vial is fitted with a cap of rubber septum design and crimp seal that permits aseptic reconstitution and subsequent preparation and administration of the SC injection or IV infusion dose using readily available 1-mL sterile stake needle syringes fitted with a 27-gauge to 29-gauge ½" (13 mm) needle or standard infusion apparatus. The volume of 20 mg/mL Compound 1 drawn from the vial can dictate the dose administered. The placebo is an equal portion (to match the active vial fill volume) of 10% HPBCD, which is lyophilized and sealed in the same way. Reconstitution and dose administration is conducted as specified for the active material.

The formulation is 20 mg/mL Compound 1 in a vehicle containing 10.0% w/v (100 mg/mL) HPBCD and 2.5% w/v (25 mg/mL) dextrose in sterile water for injection adjusted to pH 5 to 8.5 with hydrochloric acid or sodium hydroxide.

The dosing solutions is supplied in 0.75-mL doses as a prefilled syringe including the following primary packaging components:

Syringe: 1-mL, long, colorless Type 1 borosilicate glass syringe, staked with a 27-gauge ½" (13 mm) needle;
Plunger: Gray FluroTec® plunger to match syringe; and
Plunger Rod: Polypropylene plunger rod to match plunger and syringe.

Example 10. Combination of a Tie-2 Activator with Remdesivir for the Treatment of COVID-19

A Tie-2 activator described herein can be used in combination with remdesivir for the treatment of COVID-19, ARDS, or other respiratory failure conditions. For example, Compound 1 and remdesivir can be co-formulated and simultaneously administered as an IV infusion in a single dosage form to a subject having COVID-19. In some embodiments, Compound 1 and remdesivir can be administered consecutively in separate dosage forms. Compound 1 can be formulated as described herein, for example, with HPBCD. Remdesivir can be formulated with sulfo-butyl ether cyclodextrin.

Embodiments

Embodiment 1. A method of treating a lung condition in a subject in need thereof, the method comprising administering to the subject a therapeutically-effective amount of a Tie-2 activator, wherein the administration increases an oxygenation index in the subject by about 1 to about 20 as compared to absence of administration.

Embodiment 2. The method of Embodiment 1, wherein the administration increases an oxygenation index in the subject by about 1 to about 10.

Embodiment 3. The method of Embodiment 1, wherein the administration increases an oxygenation index in the subject by about 1 to about 20 within 72 hours after administration.

Embodiment 4. The method of Embodiment 1, wherein the administration increases an oxygenation index in the subject by about 1 to about 20 within 48 hours after administration.

Embodiment 5. The method of Embodiment 1, wherein the administration increases an oxygenation index in the subject by about 1 to about 20 within 24 hours after administration.

Embodiment 6. The method of any one of Embodiments 1-5, wherein the administration reduces a mean airway pressure required to be applied by a ventilator to the subject by about 1 cm $H_2O$ to about 30 cm $H_2O$ as compared to absence of administration.

Embodiment 7. The method of any one of Embodiments 1-5, wherein the administration reduces a mean airway pressure required to be applied by a ventilator to the subject by about 1 cm $H_2O$ to about 30 cm $H_2O$ within 72 hours after administration.

Embodiment 8. The method of any one of Embodiments 1-5, wherein the administration reduces a mean airway pressure required to be applied by a ventilator to the subject by about 1 cm $H_2O$ to about 30 cm $H_2O$ within 48 hours after administration.

Embodiment 9. The method of any one of Embodiments 1-5, wherein the administration reduces a mean airway pressure required to be applied by a ventilator to the subject by about 1 cm $H_2O$ to about 30 cm $H_2O$ within 24 hours after administration.

Embodiment 10. The method of any one of Embodiments 1-9, wherein the administration increases a $PaO_2/FiO_2$ ratio in the subject by about 1 to about 100 as compared to absence of administration.

Embodiment 11. The method of any one of Embodiments 1-9, wherein the administration increases a $PaO_2/FiO_2$ ratio in the subject by about 1 to about 100 within 72 hours after administration.

Embodiment 12. The method of any one of Embodiments 1-9, wherein the administration increases a $PaO_2/FiO_2$ ratio in the subject by about 1 to about 100 within 48 hours after administration.

Embodiment 13. The method of any one of Embodiments 1-9, wherein the administration increases a $PaO_2/FiO_2$ ratio in the subject by about 1 to about 100 within 24 hours after administration.

Embodiment 14. The method of any one of Embodiments 1-13, wherein the administration reduces an acute lung injury score in the subject by 1 to 4 as compared to absence of administration.

Embodiment 15. The method of any one of Embodiments 1-13, wherein the administration reduces an acute lung injury score in the subject by 1 to 4 within 72 hours after administration.

Embodiment 16. The method of any one of Embodiments 1-13, wherein the administration reduces an acute lung injury score in the subject by 1 to 4 within 48 hours after administration.

Embodiment 17. The method of any one of Embodiments 1-13, wherein the administration reduces an acute lung injury score in the subject by 1 to 4 within 24 hours after administration.

Embodiment 18. The method of any one of Embodiments 1-17, wherein the administration modulates a sequential organ failure assessment (SOFA) score in the subject by 1 to 24 as compared to absence of administration.

Embodiment 19. The method of any one of Embodiments 1-17, wherein the administration modulates a sequential organ failure assessment (SOFA) score in the subject by 1 to 24 within 72 hours after administration.

Embodiment 20. The method of any one of Embodiments 1-17, wherein the administration modulates a sequential organ failure assessment (SOFA) score in the subject by 1 to 24 within 48 hours after administration.

Embodiment 21. The method of any one of Embodiments 1-17, wherein the administration modulates a sequential organ failure assessment (SOFA) score in the subject by 1 to 24 within 24 hours after administration.

Embodiment 22. The method of any one of Embodiments 1-21, wherein the administration modulates a change in a level of plasma Ang-2 concentration in the subject after administration.

Embodiment 23. The method of any one of Embodiments 1-22, wherein the administration modulates a change in a level of plasma Ang-2/Ang-1 ratio in the subject after administration.

Embodiment 24. The method of any one of Embodiments 1-23, wherein the administration modulates a change in a level of plasma IL-6 concentration in the subject after administration.

Embodiment 25. The method of any one of Embodiments 1-24, wherein the administration modulates a change in a level of plasma IL-8 concentration in the subject after administration.

Embodiment 26. The method of any one of Embodiments 1-25, wherein the administration modulates a change in a level of plasma TNFα concentration in the subject after administration.

Embodiment 27. The method of any one of Embodiments 1-26, wherein the administration modulates a change in a level of plasma D-dimer concentration in the subject after administration.

Embodiment 28. The method of any one of Embodiments 1-27, wherein the administration modulates a change in a level of plasma CRP concentration in the subject after administration.

Embodiment 29. The method of any one of Embodiments 1-28, wherein the administration reduces systemic inflammation in the subject after administration.

Embodiment 30. The method of any one of Embodiments 1-29, wherein the administration activates endothelial nitric oxide synthase (eNOS) in the subject after administration.

Embodiment 31. The method of any one of Embodiments 1-30, wherein the administration increases production of the nitric oxide (NO) in the subject after administration.

Embodiment 32. The method of any one of Embodiments 1-31, wherein the Tie-2 activator is administered to the subject as a unit dosage form.

Embodiment 33. The method of Embodiment 32, wherein the unit dosage form further comprises a pharmaceutically-acceptable excipient.

Embodiment 34. The method of Embodiment 33, wherein the pharmaceutically-acceptable excipient is a cyclodextrin.

Embodiment 35. The method of Embodiment 33, wherein the pharmaceutically-acceptable excipient is HPBCD.

Embodiment 36. The method of Embodiment 33, wherein the pharmaceutically-acceptable excipient is D-mannitol.

Embodiment 37. The method of Embodiment 33, wherein the pharmaceutically-acceptable excipient is dextrose.

Embodiment 38. The method of Embodiment 32, wherein the unit dosage form further comprises HPBCD in an amount of about 10% of the unit dosage form by mass.

Embodiment 39. The method of Embodiment 32, wherein the unit dosage form further comprises D-mannitol in an amount of about 4.5% of the unit dosage form by mass.

Embodiment 40. The method of Embodiment 32, wherein the unit dosage form further comprises dextrose in an amount of about 5% of the unit dosage form by mass.

Embodiment 41. The method of any one of Embodiments 1-40, wherein the administration is a 1-hour continuous infusion.

Embodiment 42. The method of any one of Embodiments 1-40, wherein the administration is a 2-hour continuous infusion.

Embodiment 43. The method of any one of Embodiments 1-40, wherein the administration is a 2-hour to 2.5-hour continuous infusion.

Embodiment 44. The method of any one of Embodiments 1-43, wherein the administration is twice daily.

Embodiment 45. The method of any one of Embodiments 1-43, wherein the administration is three times daily.

Embodiment 46. The method of any one of Embodiments 1-43, wherein the administration is three times daily for 7 days.

Embodiment 47. The method of any one of Embodiments 1-43, wherein the administration is every 8 hours for 72 hours.

Embodiment 48. The method of any one of Embodiments 1-47, wherein the therapeutically-effective amount is about 0.1 mg/kg to about 30 mg/kg of the subject per dose.

Embodiment 49. The method of any one of Embodiments 1-47, wherein the therapeutically-effective amount is about 0.1 mg/kg to about 20 mg/kg of the subject per dose.

Embodiment 50. The method of any one of Embodiments 1-49, wherein the therapeutically-effective amount is about 750 ng·hr/mL/day.

Embodiment 51. The method of any one of Embodiments 1-50, wherein the therapeutically-effective amount is about 510.2 ng·hr/mL/day.

Embodiment 52. The method of any one of Embodiments 1-51, wherein the therapeutically-effective amount of the Tie-2 activator is about 10 mg.

Embodiment 53. The method of any one of Embodiments 1-51, wherein the therapeutically-effective amount of the Tie-2 activator is about 15 mg.

Embodiment 54. The method of any one of Embodiments 1-51, wherein the therapeutically-effective amount of the Tie-2 activator is about 30 mg.

Embodiment 55. The method of any one of Embodiments 1-51, wherein the therapeutically-effective amount of the Tie-2 activator is about 45 mg.

Embodiment 56. The method of any one of Embodiments 1-55, wherein the Tie-2 activator is administered as a formulation having a concentration of about 20 mg/mL.

Embodiment 57. The method of any one of Embodiments 1-56, wherein the administration is subcutaneous.

Embodiment 58. The method of any one of Embodiments 1-56, wherein the administration is intravenous.

Embodiment 59. The method of any one of Embodiments 1-56, wherein the administration is bolus intravenous injection.

Embodiment 60. The method of any one of Embodiments 1-56, wherein the administration is continuous intravenous infusion.

Embodiment 61. The method of any one of Embodiments 1-60, wherein the lung condition is acute lung injury.

Embodiment 62. The method of any one of Embodiments 1-60, wherein the lung condition is acute hypoxemic respiratory failure.

Embodiment 63. The method of any one of Embodiments 1-60, wherein the lung condition is acute respiratory distress syndrome (ARDS).

Embodiment 64. The method of Embodiment 63, wherein the ARDS is mild ARDS.

Embodiment 65. The method of Embodiment 63, wherein the ARDS is moderate ARDS.

Embodiment 66. The method of Embodiment 63, wherein the ARDS is severe ARDS.

Embodiment 67. The method of any one of Embodiments 1-66, wherein the lung condition is COVID-19.

Embodiment 68. The method of any one of Embodiments 1-67, wherein the subject has a $PaO_2/FiO_2$ ratio of less than about 300 as determined from arterial blood of the subject.

Embodiment 69. The method of any one of Embodiments 1-67, wherein the subject has a PaO$_2$/FiO$_2$ ratio of about 200 to about 300 as determined from arterial blood of the subject.

Embodiment 70. The method of any one of Embodiments 1-67, wherein the subject has a PaO$_2$/FiO$_2$ ratio of about 100 to about 200 as determined from arterial blood of the subject.

Embodiment 71. The method of any one of Embodiments 1-67, wherein the subject has a PaO$_2$/FiO$_2$ ratio of less than about 100 as determined from arterial blood of the subject.

Embodiment 72. The method of any one of Embodiments 1-71, wherein the subject has bilateral pulmonary infiltrates as determined by a chest X-ray.

Embodiment 73. The method of any one of Embodiments 1-71, wherein the subject does not have bilateral pulmonary infiltrates as determined by a chest X-ray.

Embodiment 74. The method of any one of Embodiments 1-73, wherein the subject has a viral infection.

Embodiment 75. The method of Embodiment 72, wherein the viral infection is coronavirus infection.

Embodiment 76. The method of Embodiment 72, wherein the viral infection is SARS-COV-2.

Embodiment 77. The method of any one of Embodiments 1-76, wherein the subject has hypertension.

Embodiment 78. The method of any one of Embodiments 1-77, wherein the subject has pulmonary hypertension.

Embodiment 79. The method of any one of Embodiments 1-78, wherein the subject is human.

Embodiment 80. The method of any one of Embodiments 1-79, wherein the Tie-2 activator is compound of the formula:

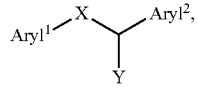

wherein:
Aryl$^1$ is an aryl group which is substituted or unsubstituted; Aryl$^2$ is an aryl group which is substituted or unsubstituted; X is alkylene, alkenylene, alkynylene, an ether linkage, an amine linkage, an amide linkage, an ester linkage, a thioether linkage, a carbamate linkage, a carbonate linkage, a sulfone linkage, any of which is substituted or unsubstituted, or a chemical bond; and Y is H, aryl, heteroaryl, NH(aryl), NH(heteroaryl), NHSO$_2$R$^g$, or NHCOR$^g$, any of which is substituted or unsubstituted, or

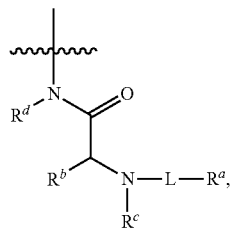

wherein:
L$^2$ is alkylene, alkenylene, or alkynylene, any of which is substituted or unsubstituted, or together with the nitrogen atom to which L$^2$ is bound forms an amide linkage, a carbamate linkage, or a sulfonamide linkage, or a chemical bond, or together with any of R$^a$, R$^b$, R$^c$, and R$^d$ forms a ring that is substituted or unsubstituted;

R$^a$ is H, alkyl, alkenyl, alkynyl, aryl, arylalkyl, heterocyclyl, heterocyclylalkyl, heteroaryl, or heteroarylalkyl, any of which is substituted or unsubstituted, or together with any of L$^2$, R$^b$, R$^c$, and R$^d$ forms a ring that is substituted or unsubstituted;

R$^b$ is H, alkyl, alkenyl, alkynyl, aryl, arylalkyl, heterocyclyl, heterocyclylalkyl, heteroaryl, or heteroarylalkyl, any of which is substituted or unsubstituted, or together with any of L$^2$, R$^a$, R$^c$, and R$^d$ forms a ring that is substituted or unsubstituted;

R$^c$ is H or alkyl which is substituted or unsubstituted, or together with any of L$^2$, R$^a$, R$^b$, and R$^d$ forms a ring that is substituted or unsubstituted;

R$^d$ is H or alkyl which is substituted or unsubstituted, or together with any of L$^2$, R$^a$, R$^b$, and R$^c$Forms a ring that is substituted or unsubstituted; and R$^g$ is H, alkyl, alkenyl, alkynyl, aryl, arylalkyl, heterocyclyl, heterocyclylalkyl, heteroaryl, or heteroarylalkyl, any of which is substituted or unsubstituted, or a pharmaceutically-acceptable salt thereof.

Embodiment 81. The method of Embodiment 80, wherein:
Aryl$^1$ is substituted or unsubstituted phenyl;
Aryl$^2$ is substituted or unsubstituted heteroaryl; and
X is alkylene.

Embodiment 82. The method of Embodiment 80 or 81, wherein:
Aryl$^1$ is substituted phenyl;
Aryl$^2$ is substituted heteroaryl; and
X is methylene.

Embodiment 83. The method of any one of Embodiments 80-82, wherein the compound that activates Tie-2 is a compound of the formula:

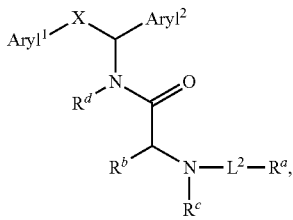

wherein
Aryl$^1$ is para-substituted phenyl;
Aryl$^2$ is substituted heteroaryl;
X is methylene;
L$^2$ is alkylene, alkenylene, or alkynylene, any of which is substituted or unsubstituted, or together with the nitrogen atom to which L$^2$ is bound forms an amide linkage, a carbamate linkage, or a sulfonamide linkage, or a chemical bond;
R$^a$ is H, alkyl, alkenyl, alkynyl, aryl, arylalkyl, heterocyclyl, heterocyclylalkyl, heteroaryl, or heteroarylalkyl, any of which is substituted or unsubstituted;
R$^b$ is H, alkyl, alkenyl, alkynyl, aryl, arylalkyl, heterocyclyl, heterocyclylalkyl, heteroaryl, or heteroarylalkyl, any of which is substituted or unsubstituted;
R$^c$ is H or alkyl which is substituted or unsubstituted; and
R$^d$ is H or alkyl which is substituted or unsubstituted.

Embodiment 84. The method of any one of Embodiments 81-83, wherein:
- Aryl$^1$ is para-substituted phenyl;
- Aryl$^2$ is a substituted thiazole moiety;
- X is methylene;
- L$^2$ together with the nitrogen atom to which L$^2$ is bound forms a carbamate linkage;
- R$^a$ is alkyl, which is substituted or unsubstituted;
- R$^b$ is arylalkyl, which is substituted or unsubstituted;
- R$^c$ is H; and
- R$^d$ is H.

Embodiment 85. The method of Embodiment 84, wherein Aryl$^2$ is:

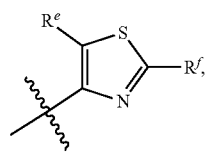

wherein:
- R$^e$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted; and
- R$^f$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted.

Embodiment 86. The method of Embodiment 85, wherein:
- R$^e$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted; and
- R$^f$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted.

Embodiment 87. The method of Embodiment 85, wherein:
- R$^e$ is H, OH, F, Cl, Br, I, alkyl, or an alkoxy group, any of which is substituted or unsubstituted; and
- R$^f$ is alkyl, aryl, heterocyclyl, or heteroaryl, any of which is substituted or unsubstituted.

Embodiment 88. The method of Embodiment 85, wherein:
- Aryl$^1$ is 4-phenylsulfamic acid;
- R$^a$ is alkyl, which is substituted or unsubstituted;
- R$^b$ is arylalkyl, which is substituted or unsubstituted;
- R$^e$ is H; and
- R$^f$ is heteroaryl.

Embodiment 89. The method of Embodiment 80, wherein the compound is:

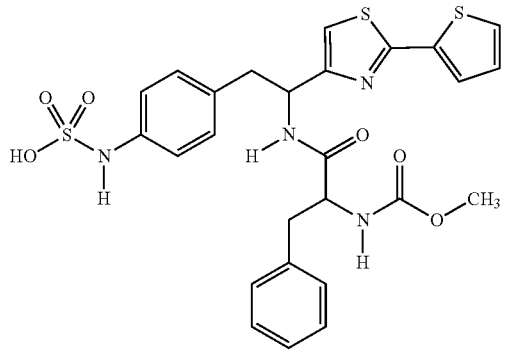

Embodiment 90. The method of Embodiment 80, wherein the compound is:

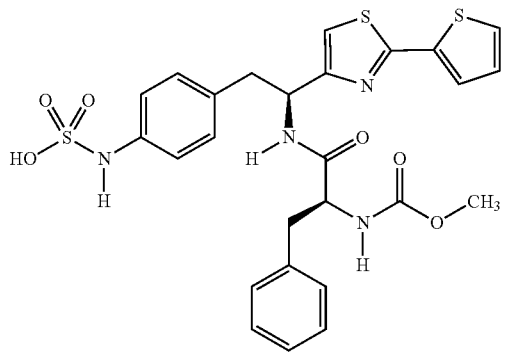

Embodiment 91. The method of Embodiment 85, wherein:
- Aryl$^1$ is 4-phenylsulfamic acid;
- R$^a$ is alkyl, which is substituted or unsubstituted;
- R$^b$ is arylalkyl, which is substituted or unsubstituted;
- R$^e$ is H; and
- R$^f$ is alkyl.

Embodiment 92. The method of Embodiment 80, wherein the compound is:

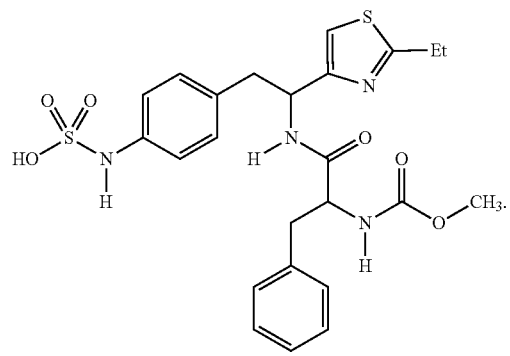 [SMILES: CCc1nc(C(Cc2ccc(NS(=O)(=O)O)cc2)NC(=O)C(Cc2ccccc2)NC(=O)OC)cs1]

Embodiment 93. The method of Embodiment 80, wherein the compound is:

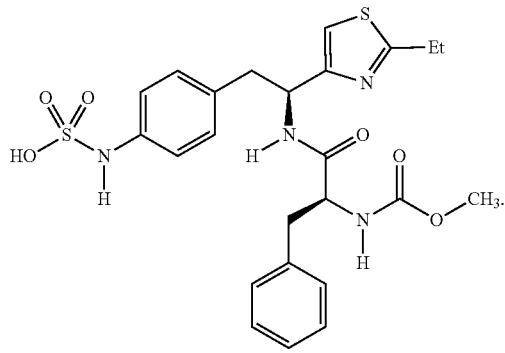 [SMILES: CCc1nc([C@H](Cc2ccc(NS(=O)(=O)O)cc2)NC(=O)[C@H](Cc2ccccc2)NC(=O)OC)cs1]

Embodiment 94. The method of Embodiment 84, wherein Aryl² is:

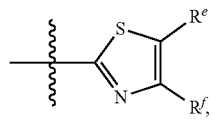

wherein:
R$^e$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted; and
R$^f$ is H, OH, F, Cl, Br, I, CN, alkyl, alkenyl, alkynyl, an alkoxy group, an ether group, a carboxylic acid group, a carboxaldehyde group, an ester group, an amine group, an amide group, a carbonate group, a carbamate group, a thioether group, a thioester group, a thioacid group, aryl, arylalkyl, heterocyclyl, heterocyclylalkyl, heteroaryl, or heteroarylalkyl, any of which is substituted or unsubstituted.

Embodiment 95. The method of Embodiment 94, wherein:
R$^e$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted; and
R$^f$ is H, OH, F, Cl, Br, I, alkyl, an alkoxy group, aryl, arylalkyl, heterocyclyl, heterocyclylalkyl, heteroaryl, or heteroarylalkyl, any of which is substituted or unsubstituted.

Embodiment 96. The method of Embodiment 94, wherein:
R$^e$ is H, OH, F, Cl, Br, I, alkyl, or an alkoxy group, any of which is substituted or unsubstituted; and
R$^f$ is alkyl, aryl, heterocyclyl, or heteroaryl, any of which is substituted or unsubstituted.

Embodiment 97. The method of Embodiment 94, wherein:
Aryl¹ is 4-phenylsulfamic acid;
R$^a$ is alkyl, which is substituted or unsubstituted;
R$^b$ is arylalkyl, which is substituted or unsubstituted;
R$^e$ is H; and
R$^f$ is heteroaryl.

Embodiment 98. The method of Embodiment 80, wherein the compound is:

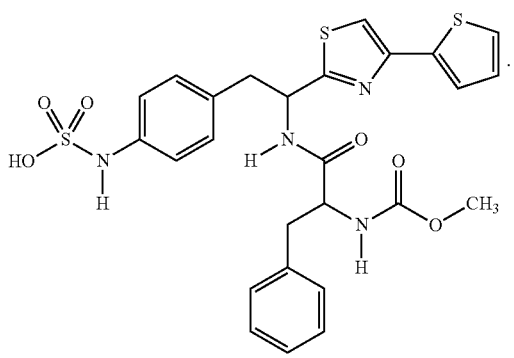 [SMILES: COC(=O)NC(Cc1ccccc1)C(=O)NC(Cc1ccc(NS(=O)(=O)O)cc1)c1nc(-c2cccs2)cs1]

Embodiment 99. The method of Embodiment 80, wherein the compound is:

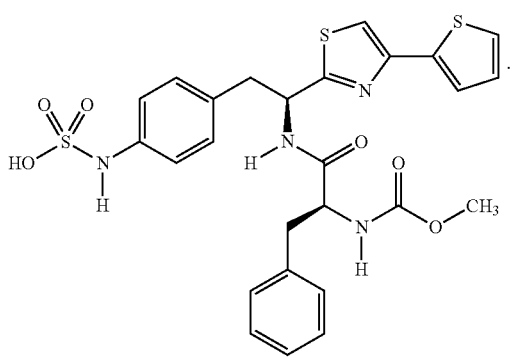

Embodiment 100. The method of Embodiment 94, wherein:
Aryl¹ is 4-phenylsulfamic acid;
R$^a$ is alkyl, which is substituted or unsubstituted;
R$^b$ is arylalkyl, which is substituted or unsubstituted;
R$^e$ is H; and
R$^f$ is alkyl.

Embodiment 101. The method of Embodiment 80, wherein the compound is:

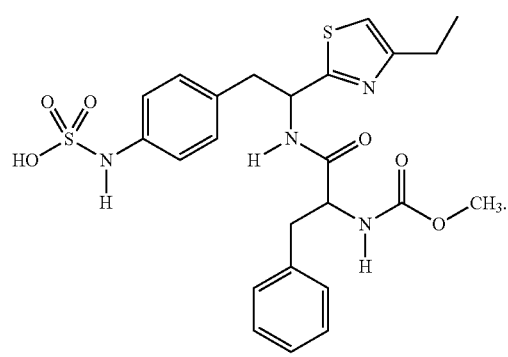 [SMILES: CCc1csc(C(Cc2ccc(NS(=O)(=O)O)cc2)NC(=O)C(Cc2ccccc2)NC(=O)OC)n1]

Embodiment 102. The method of Embodiment 80, wherein the compound is:

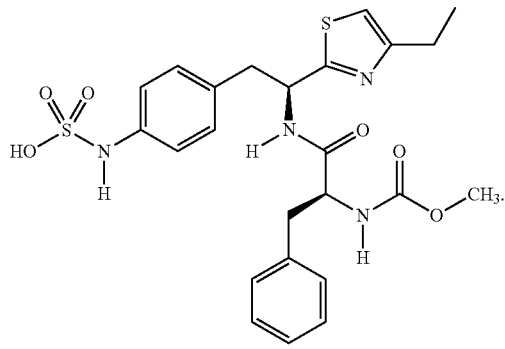 [SMILES: CCc1csc([C@H](Cc2ccc(NS(=O)(=O)O)cc2)NC(=O)[C@H](Cc2ccccc2)NC(=O)OC)n1]

Embodiment 103. A method of treating acute respiratory distress syndrome in a subject in need thereof, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-COV-2, wherein the administration treats acute respiratory distress syndrome in the subject.

Embodiment 104. A method of treating a COVID-19 in a subject in need thereof, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-COV-2, wherein the administration treats acute respiratory distress syndrome in the subject.

Embodiment 105. A method of treating acute respiratory distress syndrome in a subject having COVID-19, the method comprising administering to the subject a therapeutically-effective amount of a Tie-2 activator in a unit dosage form, wherein the administration increases an oxygenation index in the subject by about 1 to about 20 as compared to absence of administration within 7 days after administration, wherein the therapeutically-effective amount is about 0.1 mg/kg to about 30 mg/kg of the subject per dose, wherein the therapeutically-effective amount is about 10 mg to about 40 mg, wherein the Tie-2 activator is present in the unit dosage form at a concentration of about 20 mg/mL, wherein the subject is infected with SARS-COV-2, wherein the administration treats acute respiratory distress syndrome in the subject.

Embodiment 106. The method of any one of Embodiments 103-105, wherein the administration is subcutaneous.

Embodiment 107. The method of any one of Embodiments 103-105, wherein the administration is intravenous.

Embodiment 108. The method of any one of Embodiments 103-105, wherein the administration is inhalation.

Embodiment 109. The method of any one of Embodiments 103-108, wherein the Tie-2 activator is:

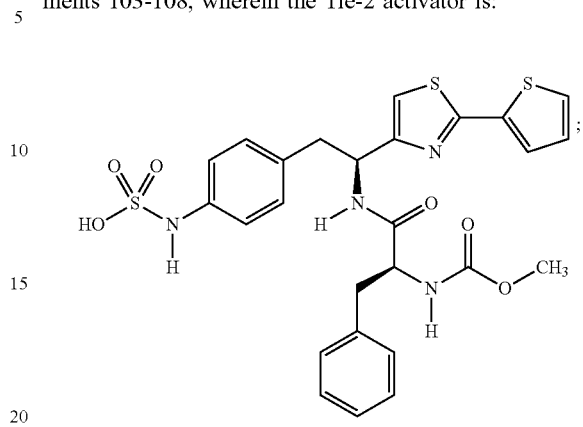

or a pharmaceutically-acceptable salt thereof.

Embodiment 110. The method of any one of Embodiments 103-108, wherein the Tie-2 activator is:

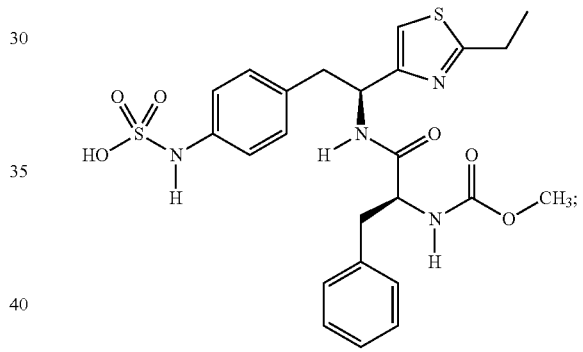

or a pharmaceutically-acceptable salt thereof.

Embodiment 111. The method of any one of Embodiments 103-108, wherein the Tie-2 activator is:

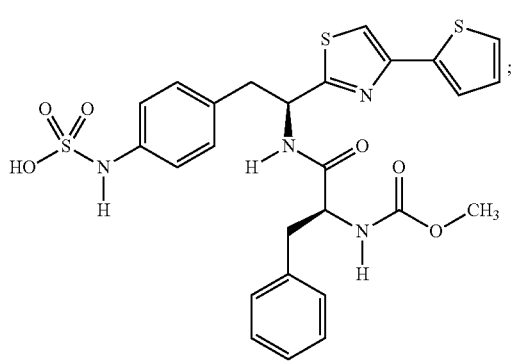 [SMILES: COC(=O)N[C@@H](Cc1ccccc1)C(=O)N[C@@H](Cc1ccc(NS(=O)(=O)O)cc1)c1nc(-c2cccs2)cs1]

or a pharmaceutically-acceptable salt thereof.

Embodiment 112. The method of any one of Embodiments 103-108, wherein the Tie-2 activator is:

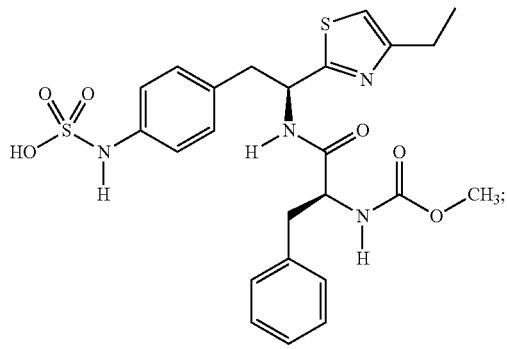 [SMILES: CCc1csc([C@H](Cc2ccc(NS(=O)(=O)O)cc2)NC(=O)[C@H](Cc2ccccc2)NC(=O)OC)n1]

or
a pharmaceutically-acceptable salt thereof.

What is claimed is:
1. A method of treating a lung condition selected from the group consisting of acute lung injury, acute hypoxemic respiratory failure, acute respiratory distress syndrome, and COVID-19 in a subject in need thereof, the method comprising administering to the subject a therapeutically-effective amount of a Tie-2 activator;
wherein the Tie-2 activator is a compound of the formula:

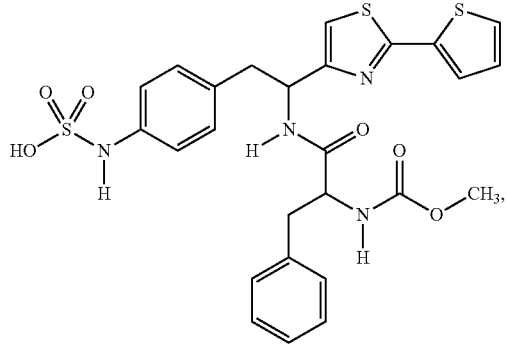 [SMILES: COC(=O)NC(Cc1ccccc1)C(=O)NC(Cc1ccc(NS(=O)(=O)O)cc1)c1csc(-c2cccs2)n1]

or a pharmaceutically-acceptable salt, tautomer, or zwitterion thereof, wherein the administration increases an oxygenation index in the subject by about 1 to about 20 as compared to absence of administration.

2. The method of claim 1, wherein the compound is:

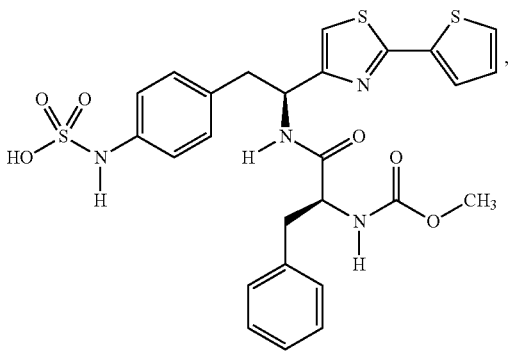

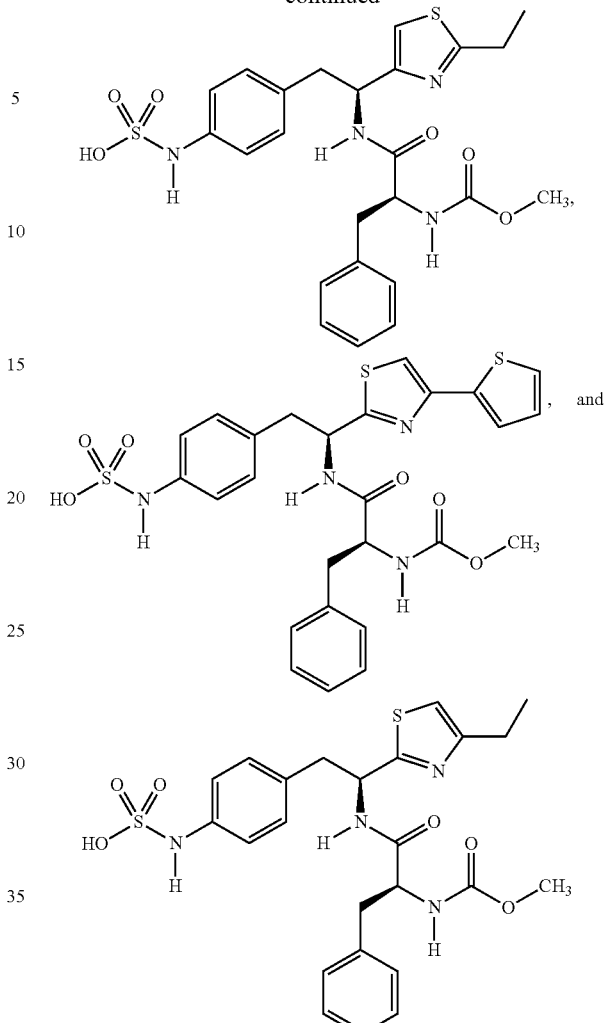

or a pharmaceutically-acceptable salt or zwitterion thereof.

3. The method of claim 1, wherein the administration increases an oxygenation index in the subject by about 1 to about 20 within 72 hours after administration.

4. The method of claim 1, wherein the administration reduces a mean airway pressure required to be applied by a ventilator to the subject by about 1 cm $H_2O$ to about 30 cm $H_2O$ as compared to absence of administration.

5. The method of claim 1, wherein the administration increases a $PaO_2/FiO_2$ ratio in the subject by about 1 to about 100 as compared to absence of administration.

6. The method of claim 1, wherein the administration reduces an acute lung injury score in the subject by 1 to 4 as compared to absence of administration.

7. The method of claim 1, wherein the administration modulates a sequential organ failure assessment (SOFA) score in the subject by 1 to 24 as compared to absence of administration.

8. The method of claim 1, wherein the administration modulates a change in a level of a plasma concentration in the subject after administration, wherein the plasma concentration is selected from the group consisting of plasma Ang-2 concentration, plasma Ang-2/Ang-1 ratio, plasma IL-6 concentration, plasma IL-8 concentration, plasma TNFα concentration, plasma D-dimer concentration, and plasma CRP concentration.

9. The method of claim 1, wherein the Tie-2 activator is administered to the subject as a unit dosage form comprising a pharmaceutically-acceptable excipient.

10. The method of claim 1, wherein the administration is a continuous infusion, wherein the continuous infusion lasts for about 1 hour to about 2.5 hours.

11. The method of claim 1, wherein the administration is selected from the group consisting of subcutaneous, intravenous, bolus intravenous injection, and continuous intravenous infusion.

12. The method of claim 1, wherein the lung condition is selected from the group consisting of acute respiratory distress syndrome (ARDS), and COVID-19.

13. A method of treating acute respiratory distress syndrome in a subject in need thereof, the method comprising administering to the subject a therapeutically-effective amount of a Tie-2 activator in a unit dosage form, wherein the Tie-2 activator is a compound of the formula:

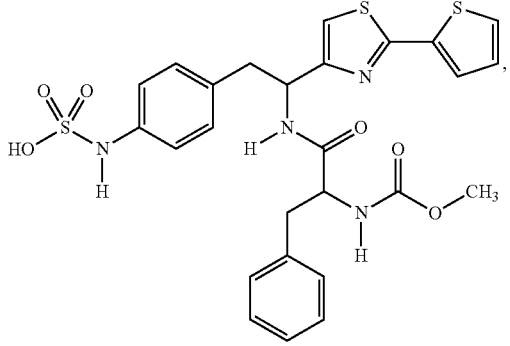

wherein the administration increases an oxygenation index in the subject by about 1 to about 20 as compared to absence of administration within 7 days after administration, wherein the therapeutically-effective amount is about 10 mg to about 40 mg, wherein the subject is infected with SARS-COV-2, and wherein the administration treats acute respiratory distress syndrome in the subject.

14. A method of treating a COVID-19 in a subject in need thereof, the method comprising administering to the subject a therapeutically-effective amount of a Tie-2 activator in a unit dosage form, wherein the Tie-2 activator is a compound of the formula:

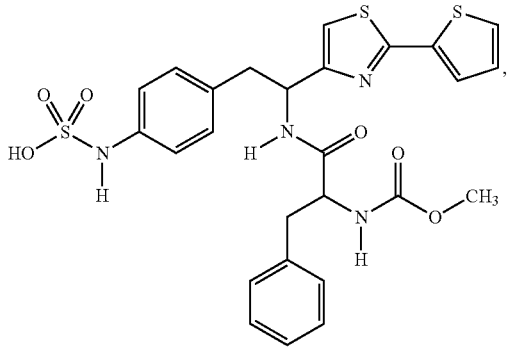

wherein the administration increases an oxygenation index in the subject by about 1 to about 20 as compared to absence of administration within 7 days after administration, wherein the therapeutically-effective amount is about 10 mg to about 40 mg, wherein the subject is infected with SARS-COV-2, and wherein the administration treats COVID-19 in the subject.

15. The method of claim 13, wherein the administration is subcutaneous, intravenous, or inhalation.

16. The method of claim 14, wherein the administration is subcutaneous, intravenous, or inhalation.

17. The method of claim 13, wherein the Tie-2 activator is:

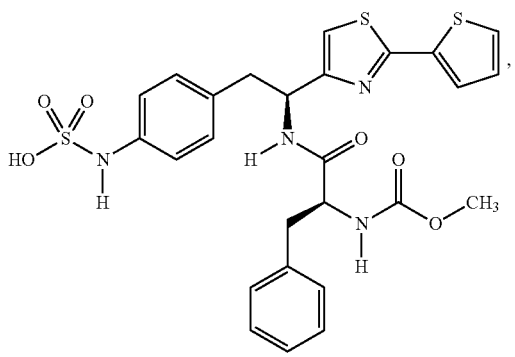

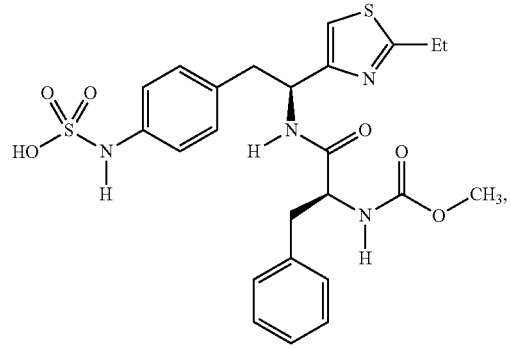

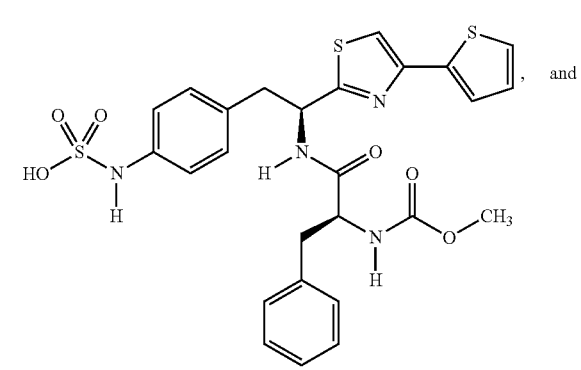

-continued
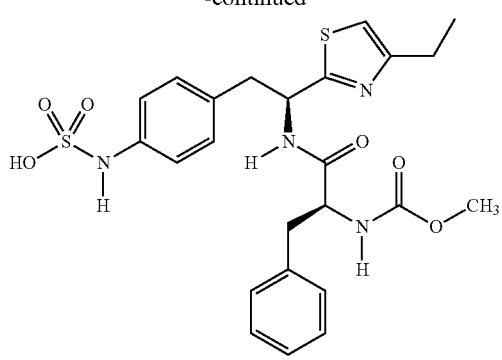
or a pharmaceutically-acceptable salt or zwitterion thereof.
18. The method of claim 14, wherein the Tie-2 activator is:
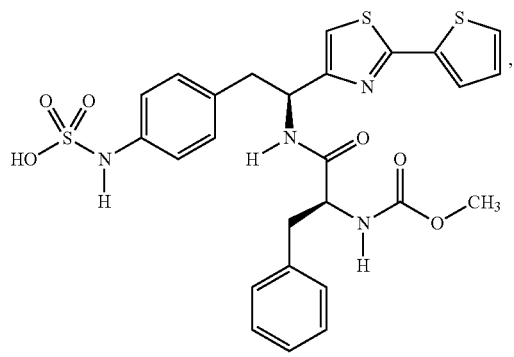
-continued
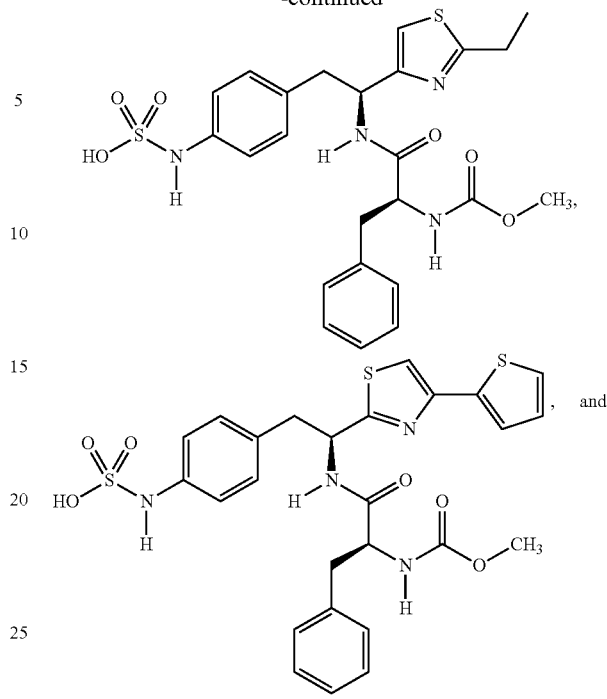
or a pharmaceutically-acceptable salt or zwitterion thereof.
* * * * *